Oct. 19, 1926.
T. MIDGLEY
1,603,858
CORD TIRE BUILDING
Filed March 27, 1922    20 Sheets-Sheet 2
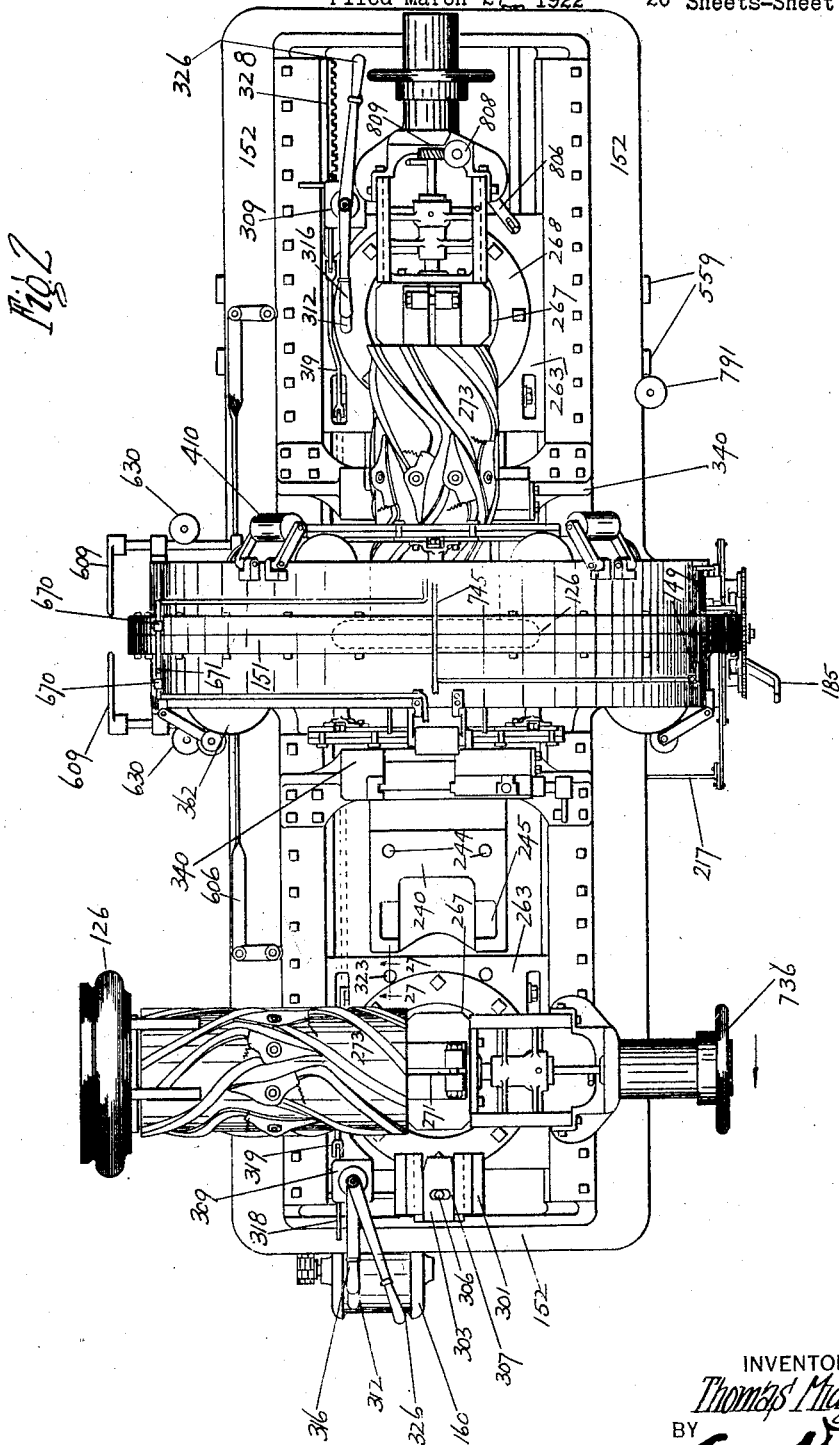
INVENTOR
Thomas Midgley
BY
Edward C. Taylor
ATTORNEY

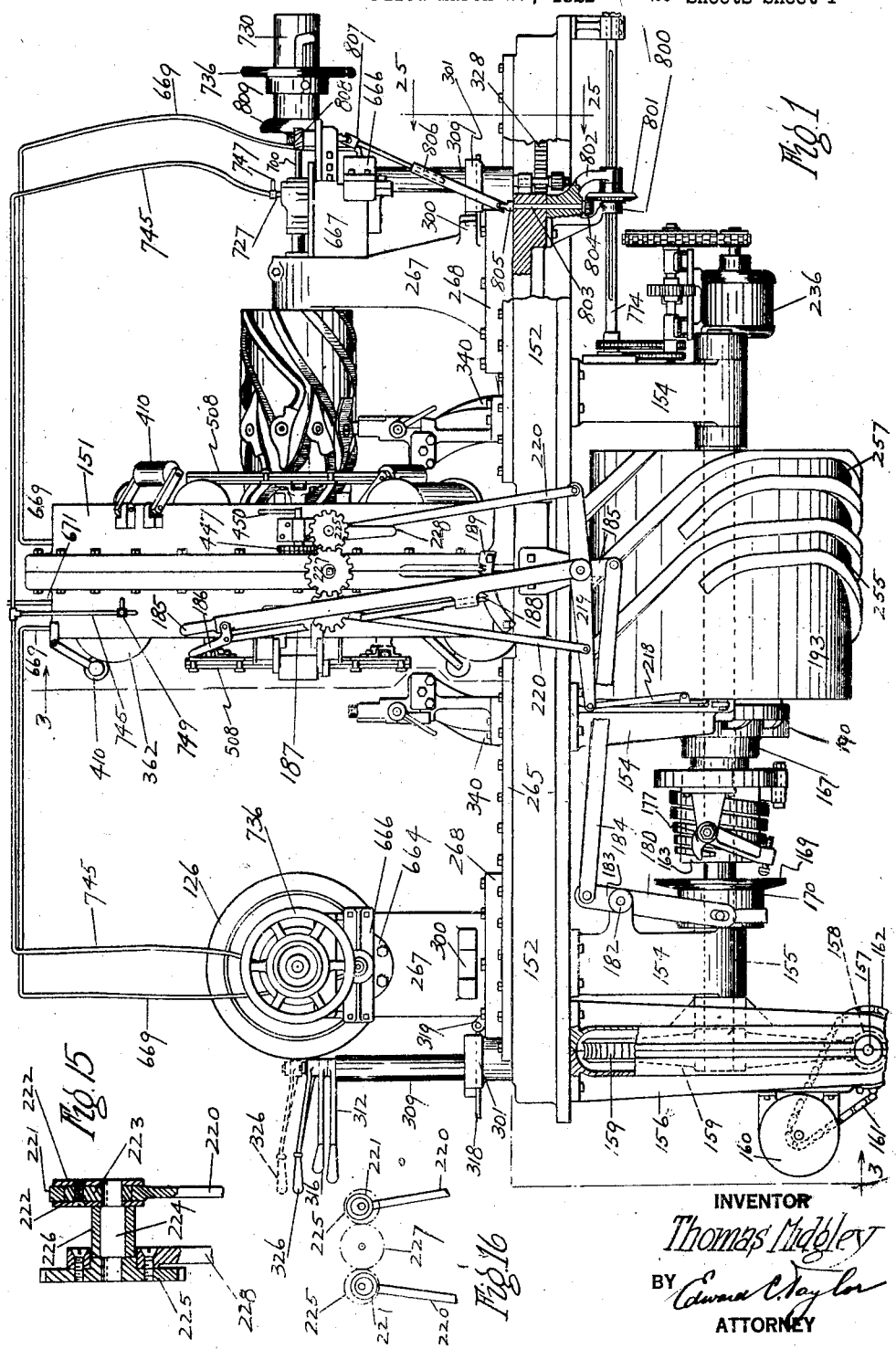

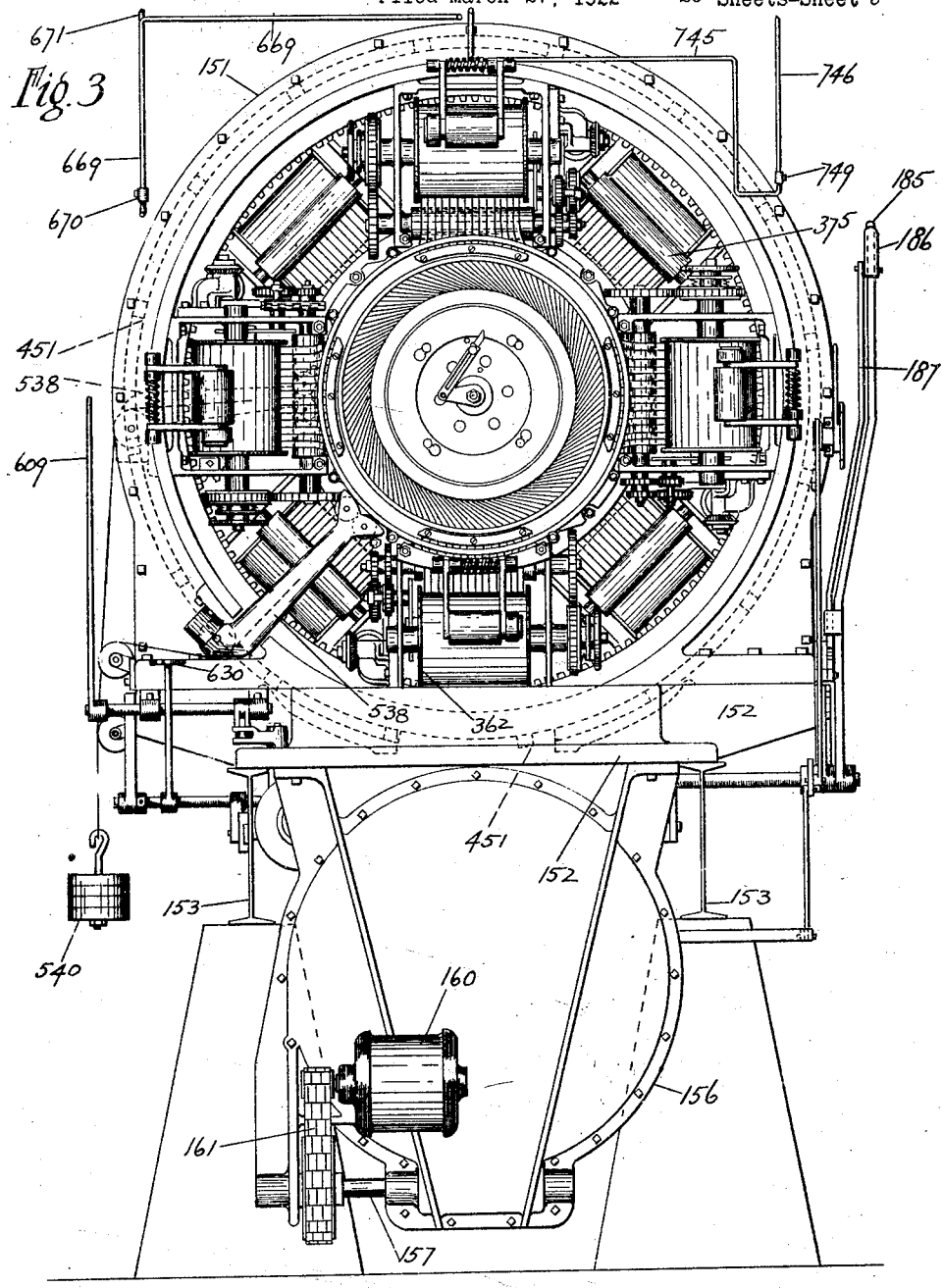

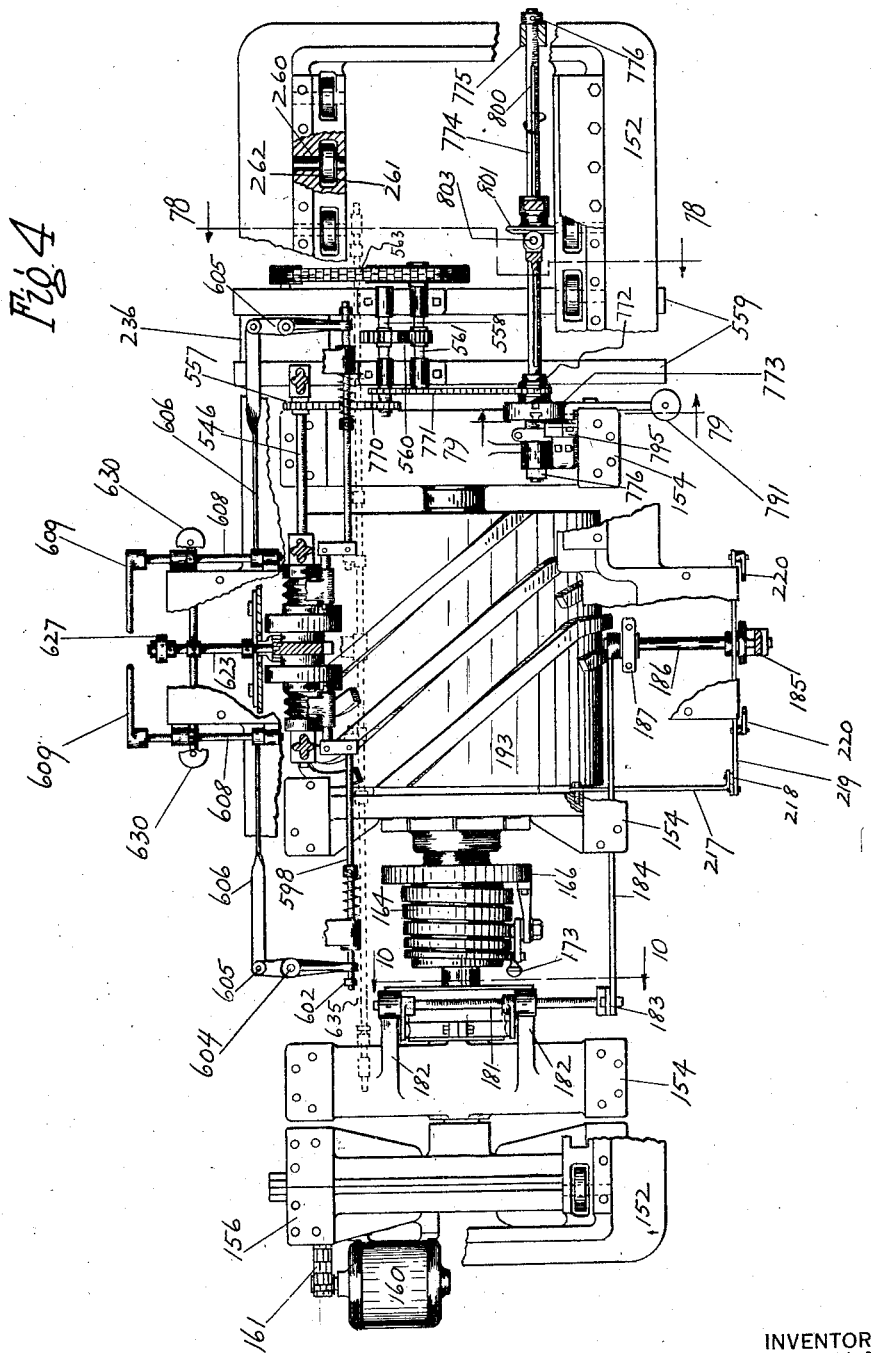

Oct. 19, 1926.
T. MIDGLEY
1,603,858
CORD TIRE BUILDING
Filed March 27, 1922   20 Sheets-Sheet 5
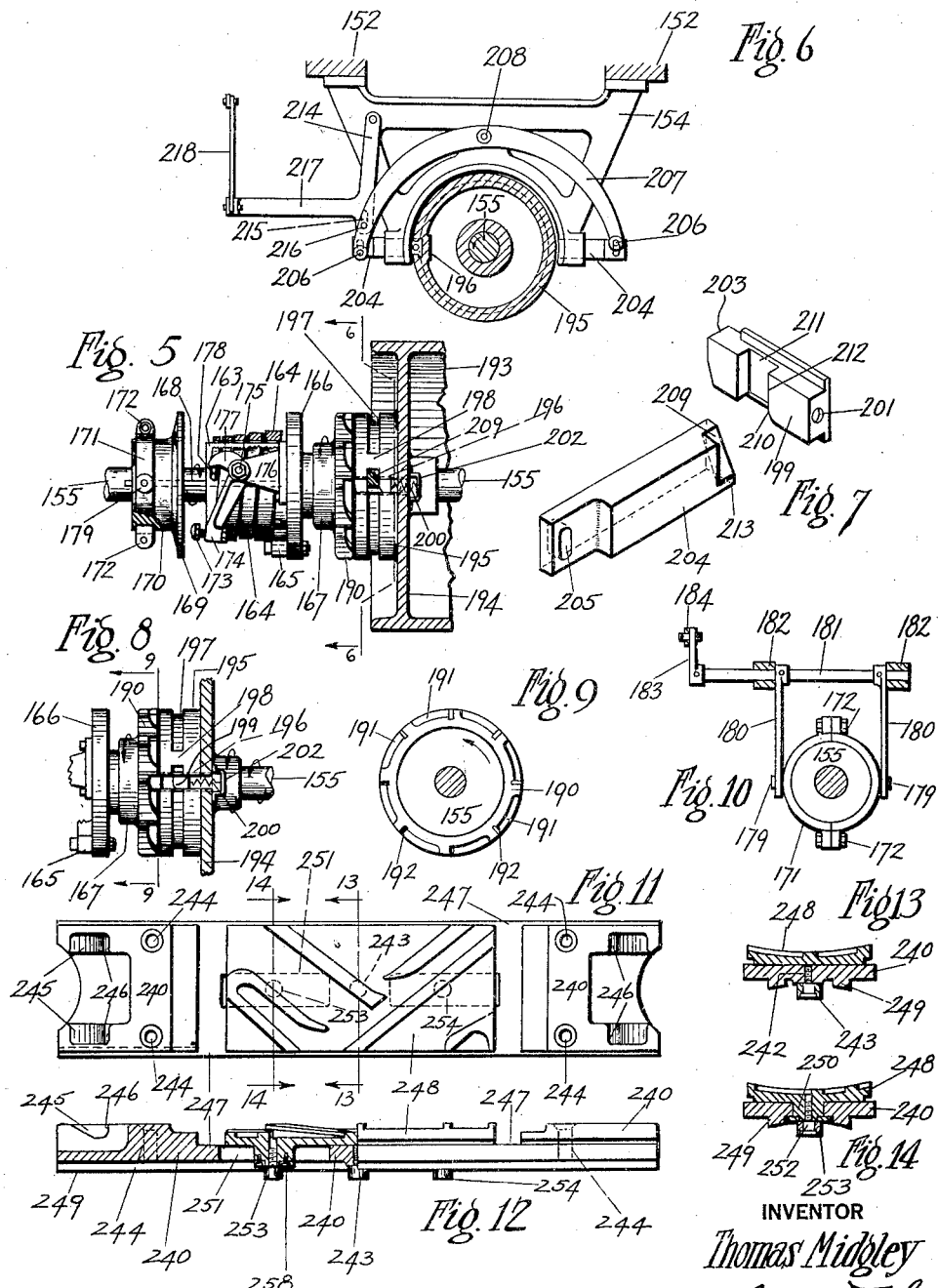
INVENTOR
Thomas Midgley
BY
Edward C Taylor
ATTORNEY

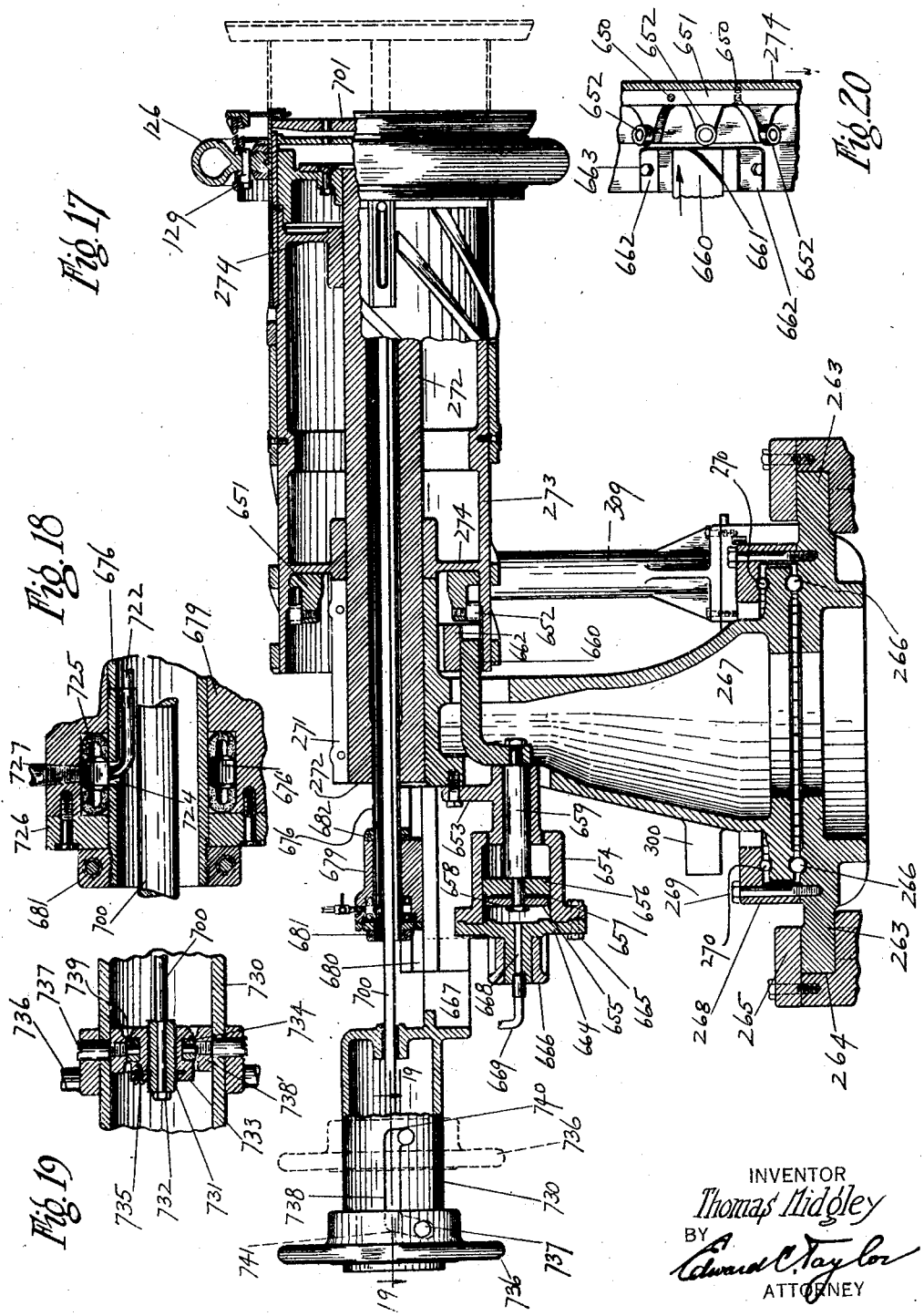

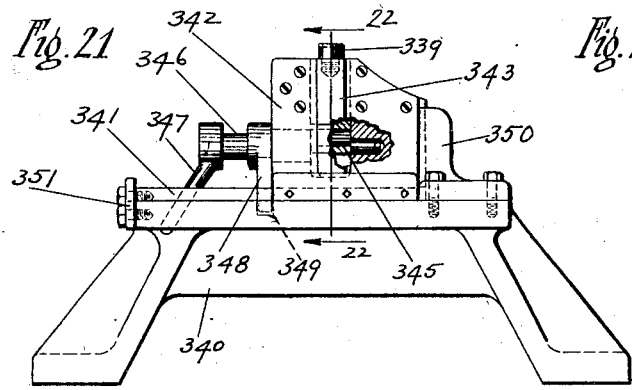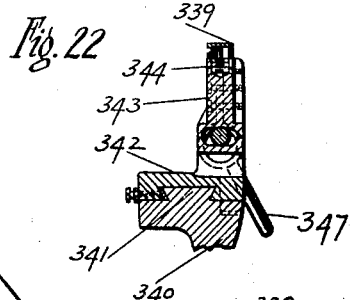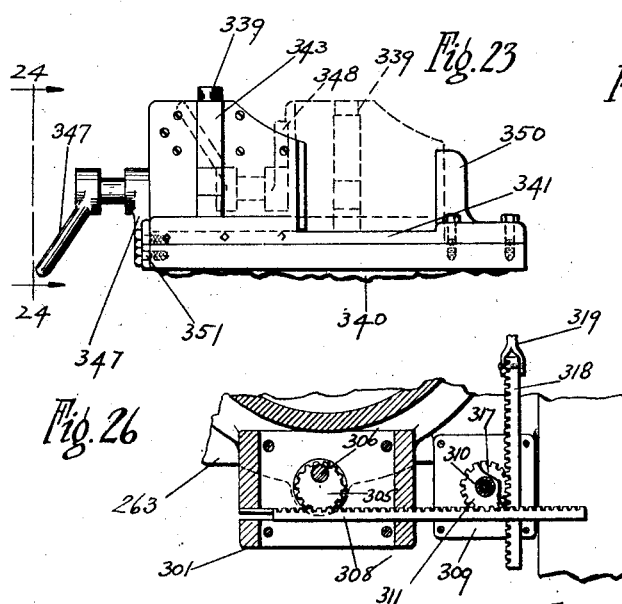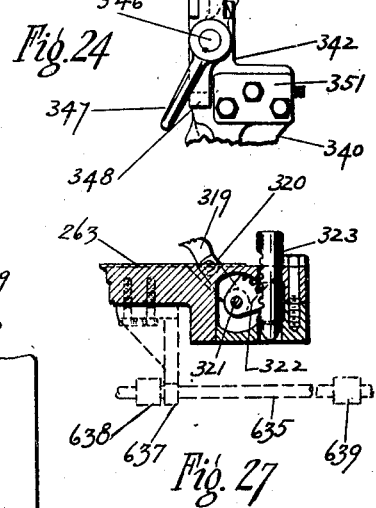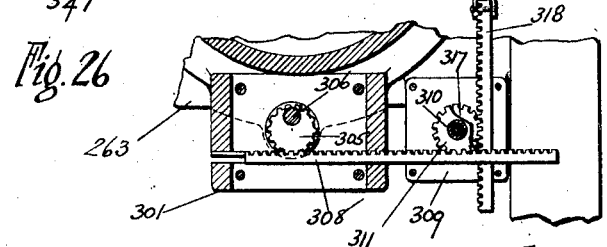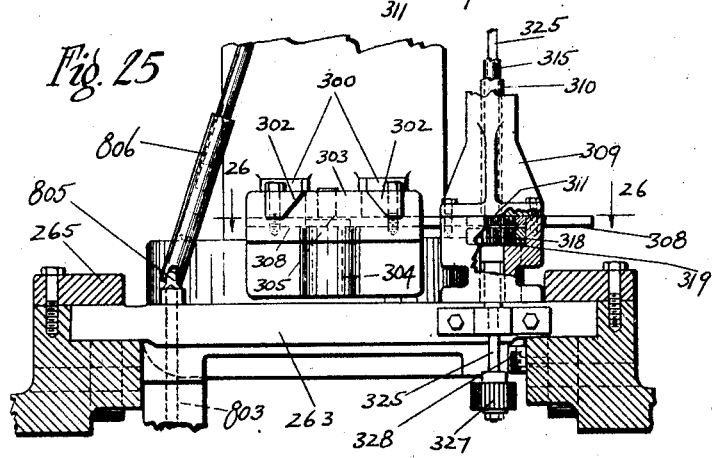

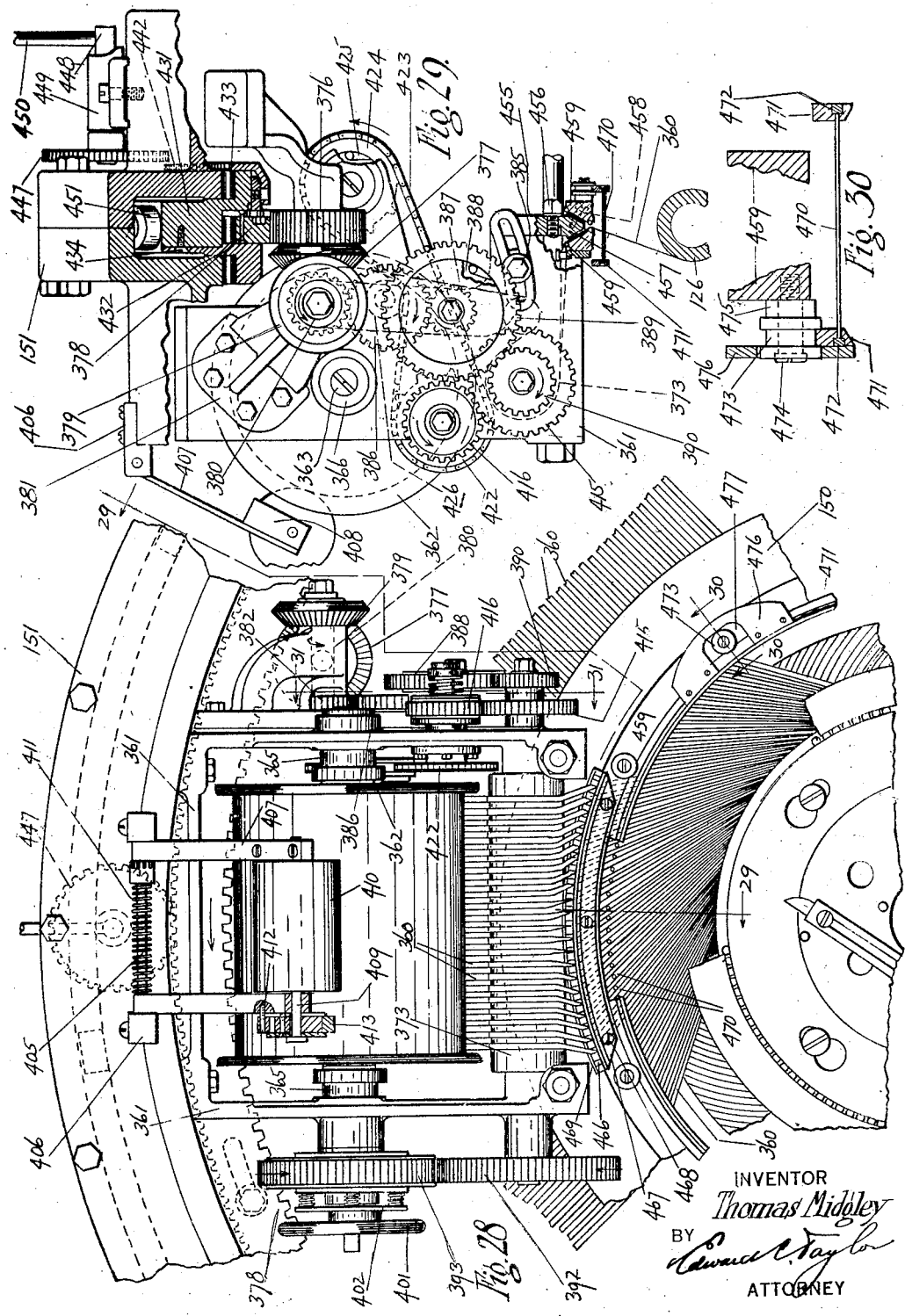

Oct. 19, 1926.
T. MIDGLEY
1,603,858
CORD TIRE BUILDING
Filed March 27, 1922   20 Sheets-Sheet 9
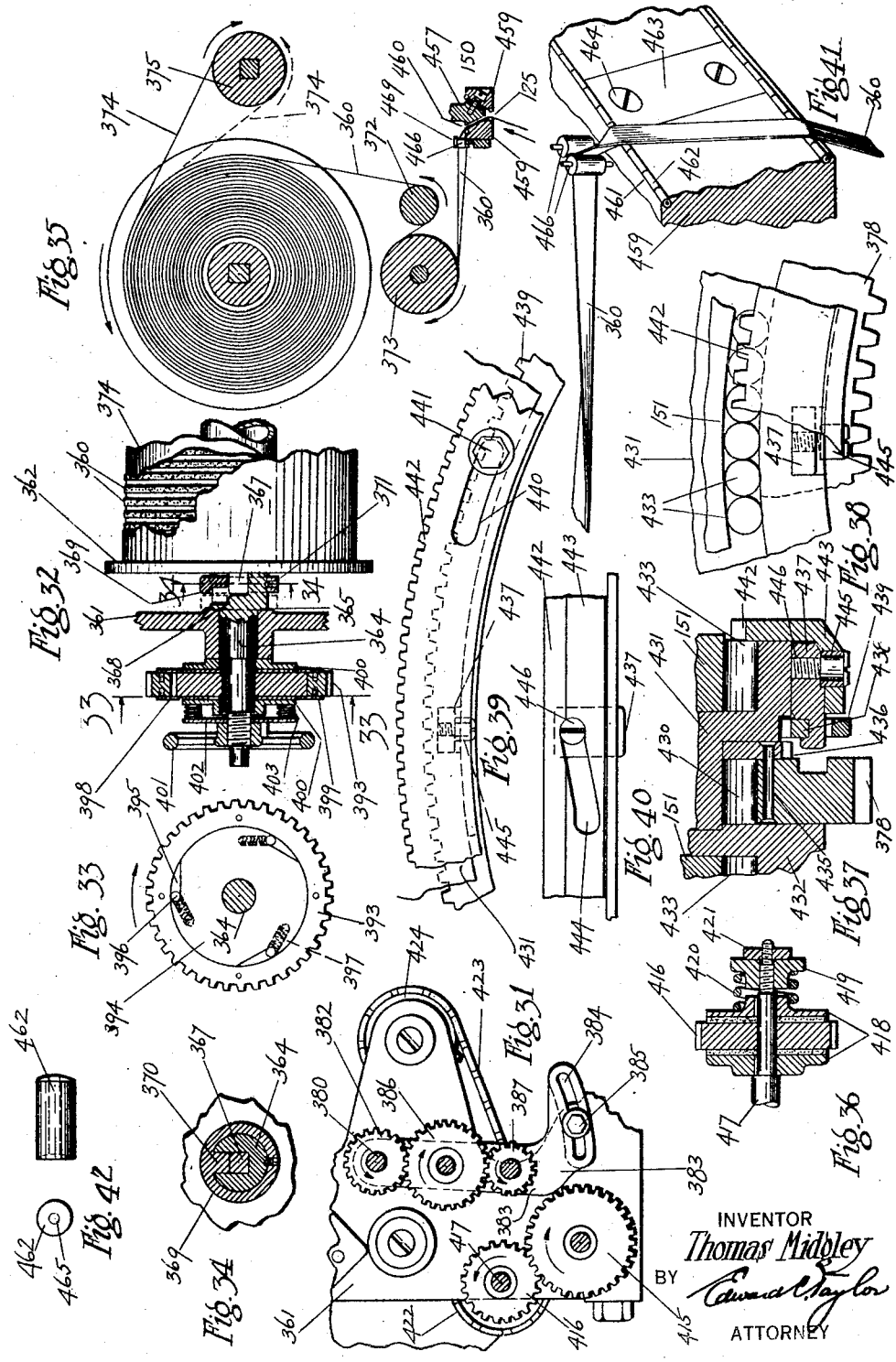
INVENTOR
Thomas Midgley
BY
Edward C. Taylor
ATTORNEY

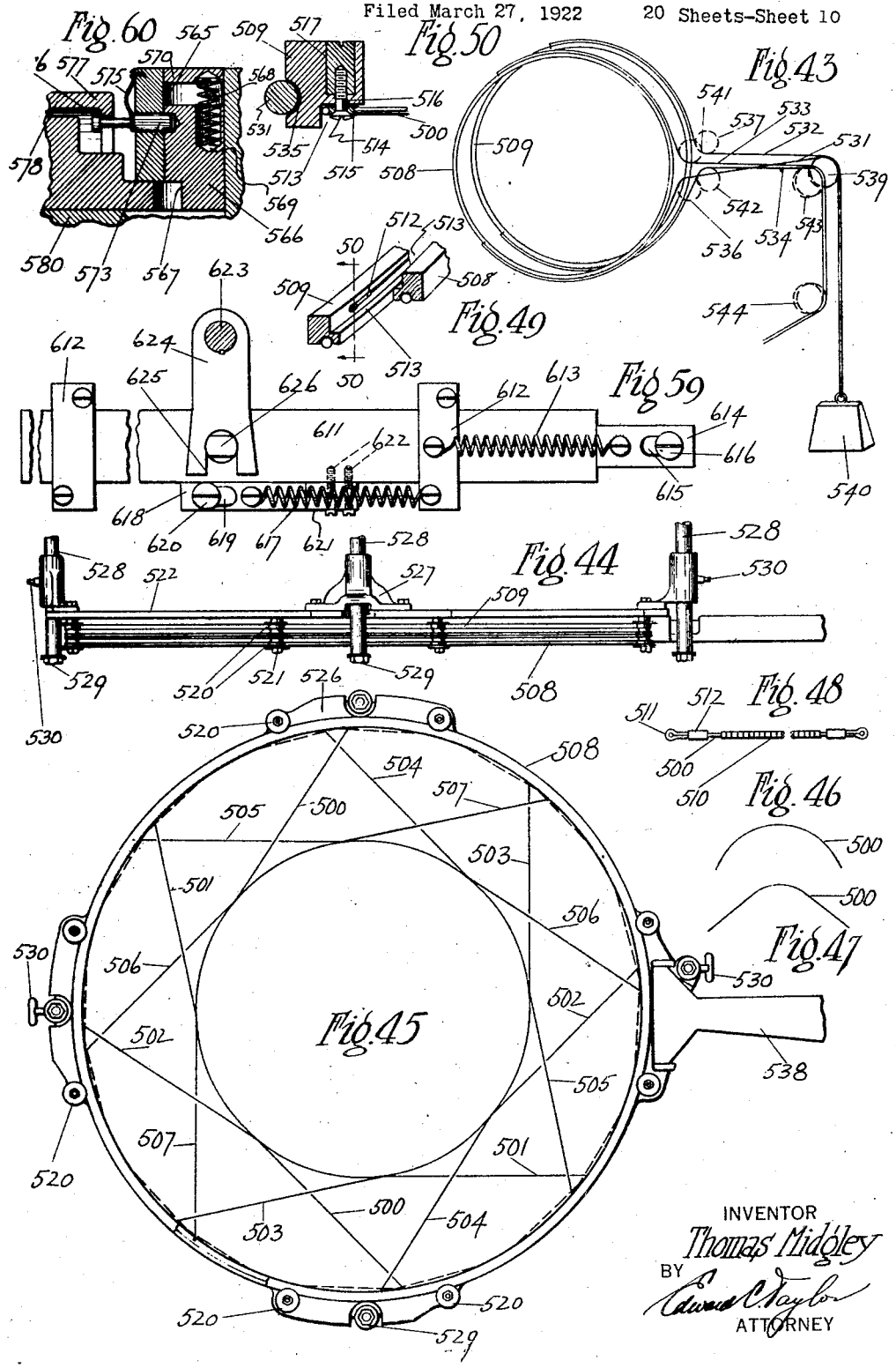

Oct. 19, 1926. 1,603,858
T. MIDGLEY
CORD TIRE BUILDING
Filed March 27, 1922 20 Sheets-Sheet 11
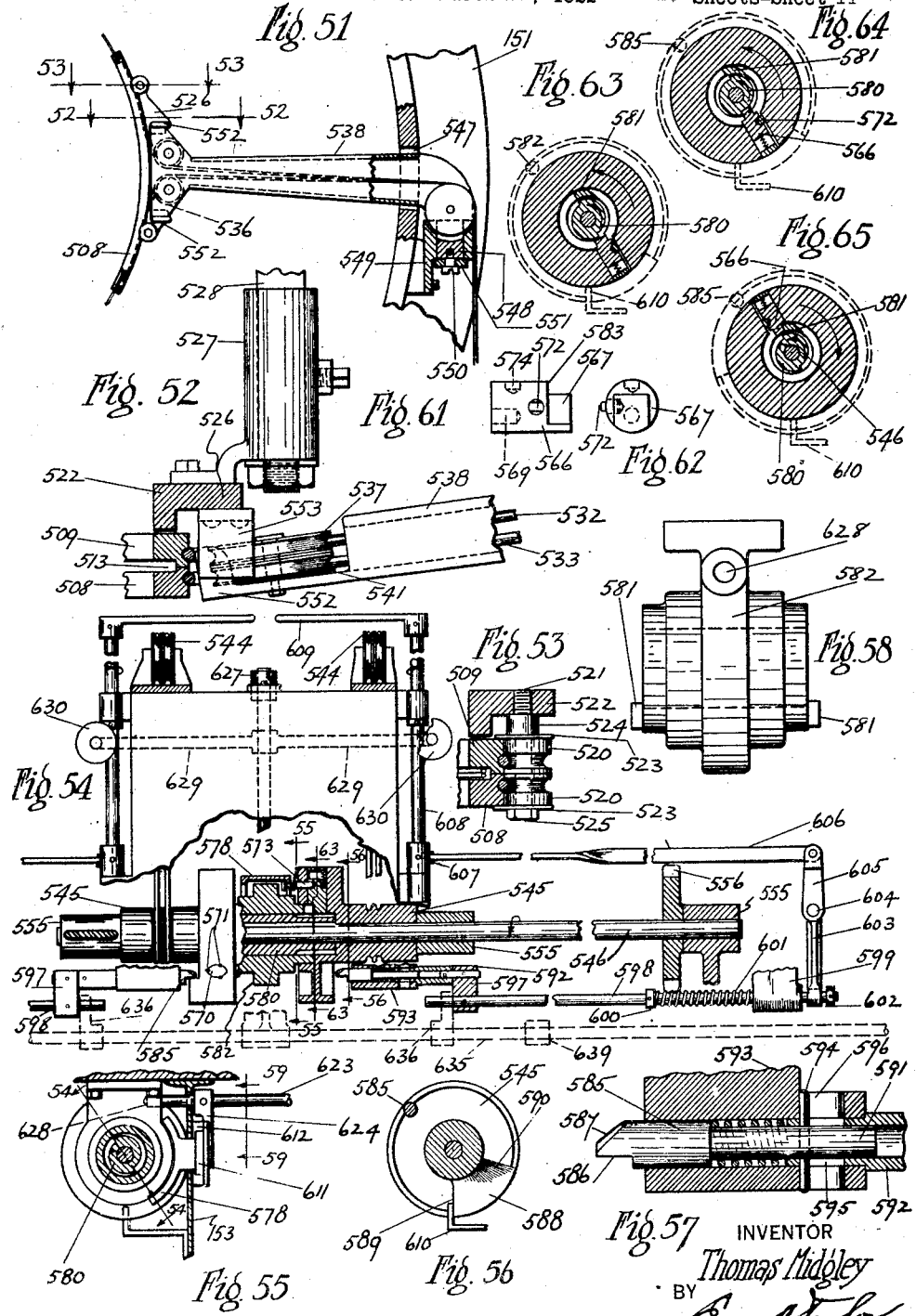

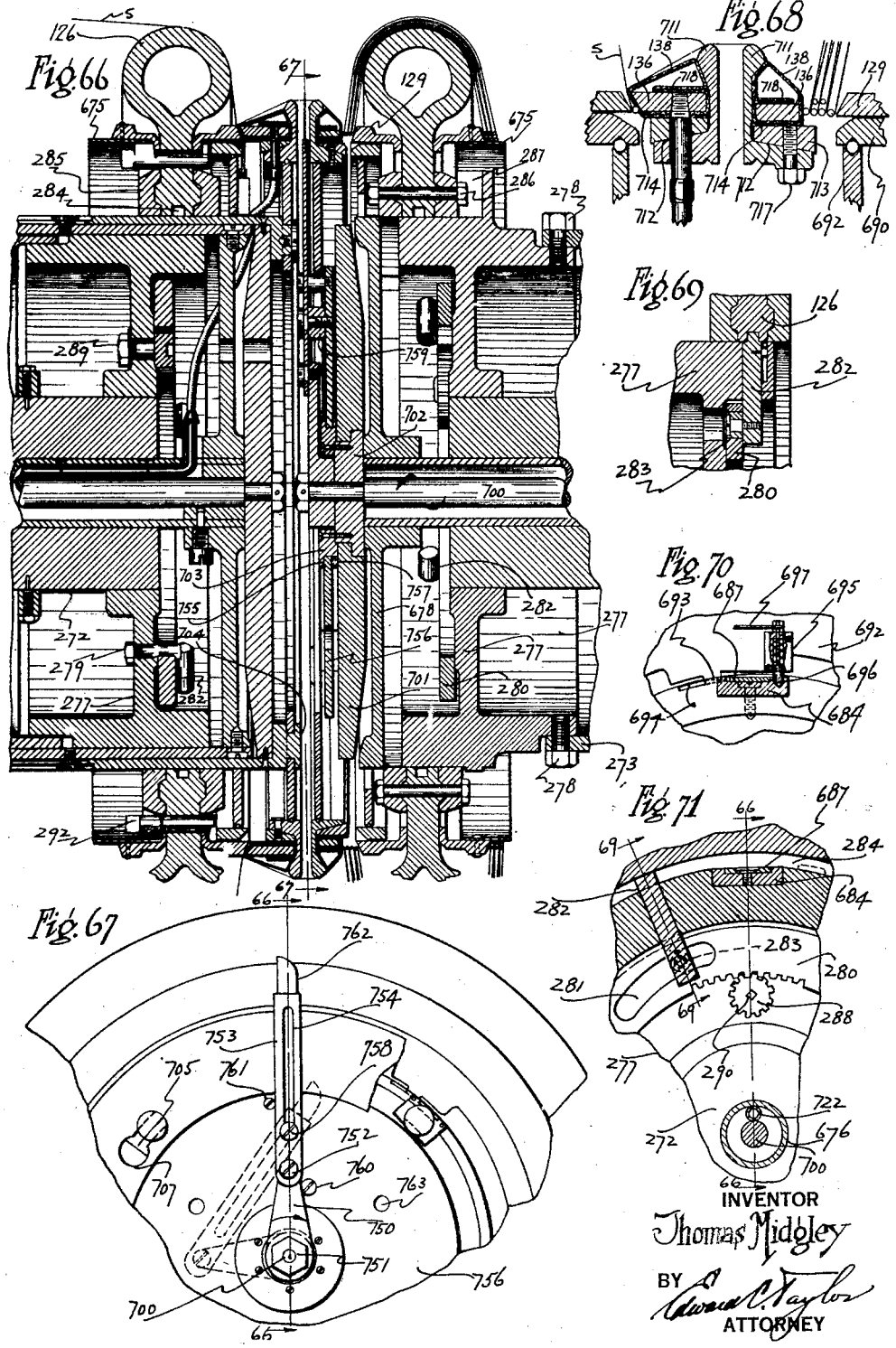

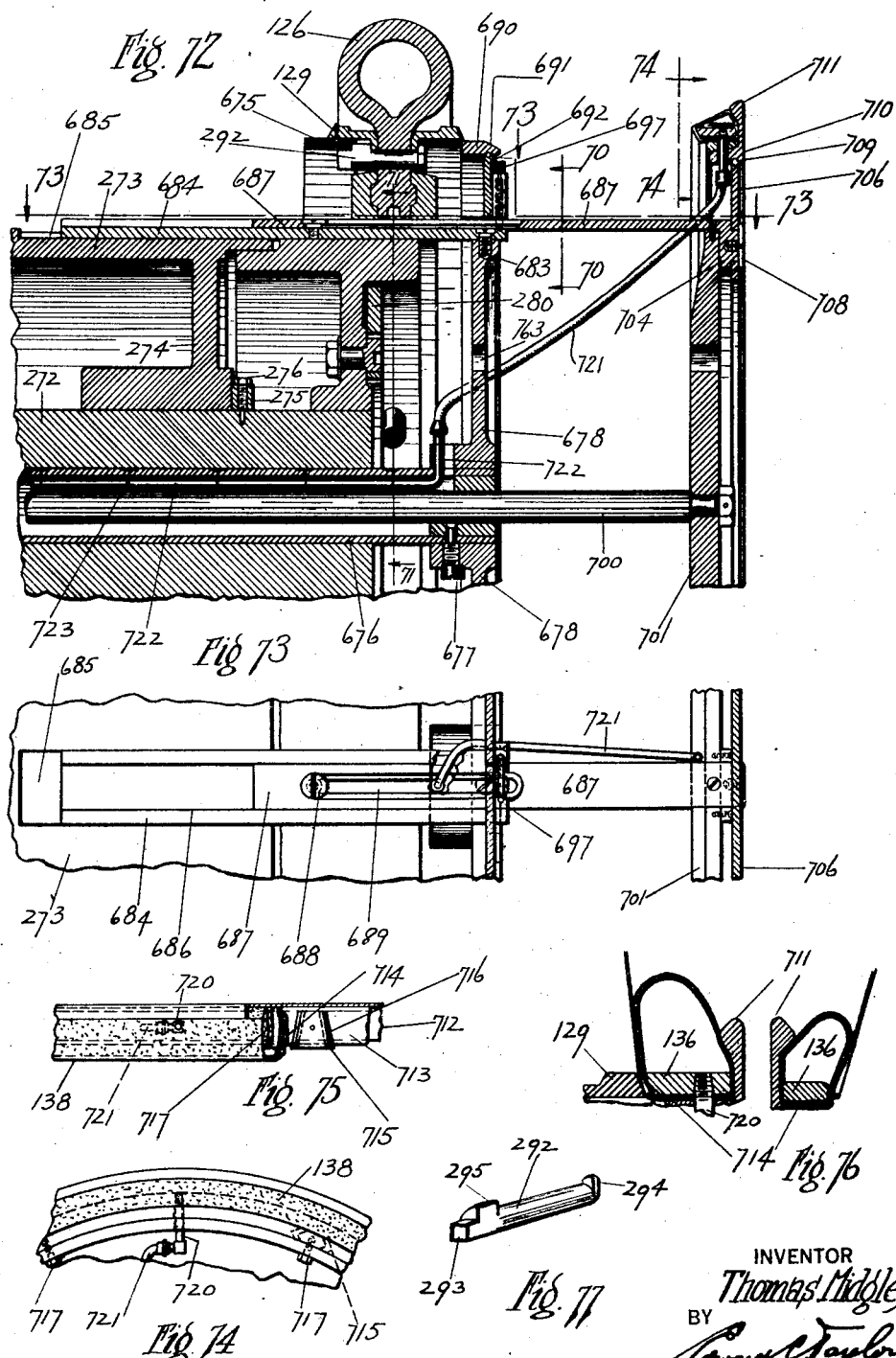

Oct. 19, 1926. 1,603,858
T. MIDGLEY
CORD TIRE BUILDING
Filed March 27, 1922 20 Sheets-Sheet 14
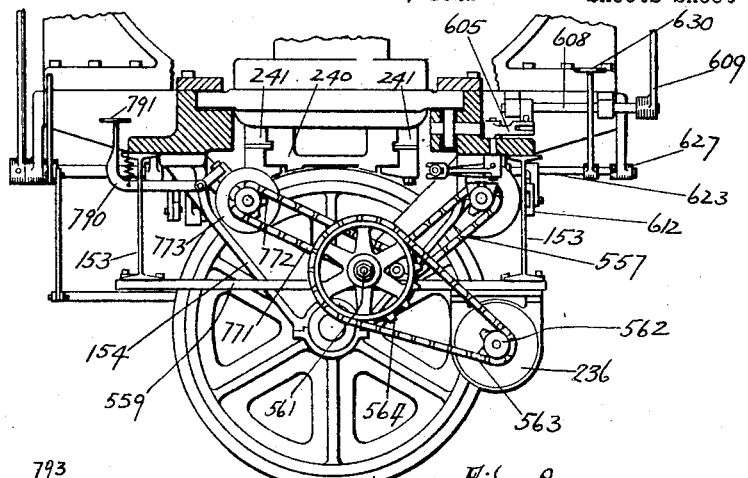
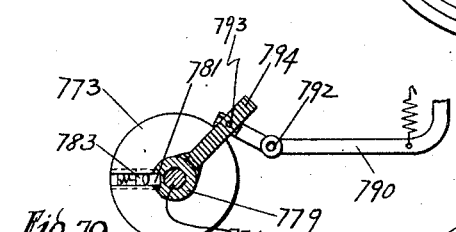
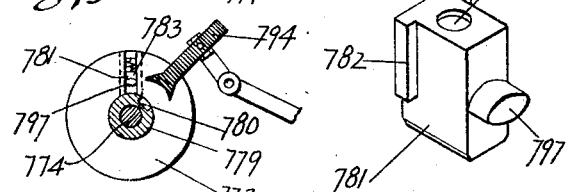
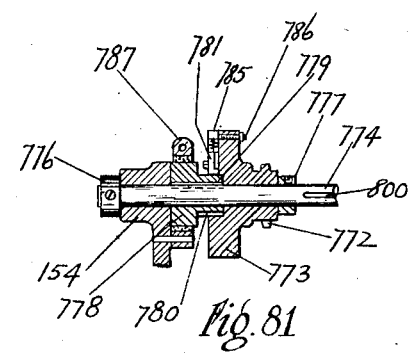
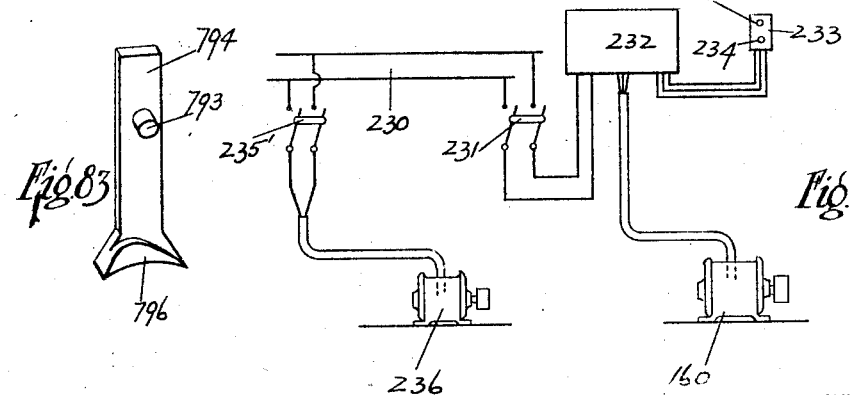
INVENTOR
Thomas Midgley
BY
Edward Taylor
ATTORNEY Oct. 19, 1926.
T. MIDGLEY
1,603,858
CORD TIRE BUILDING
Filed March 27, 1922   20 Sheets-Sheet 15
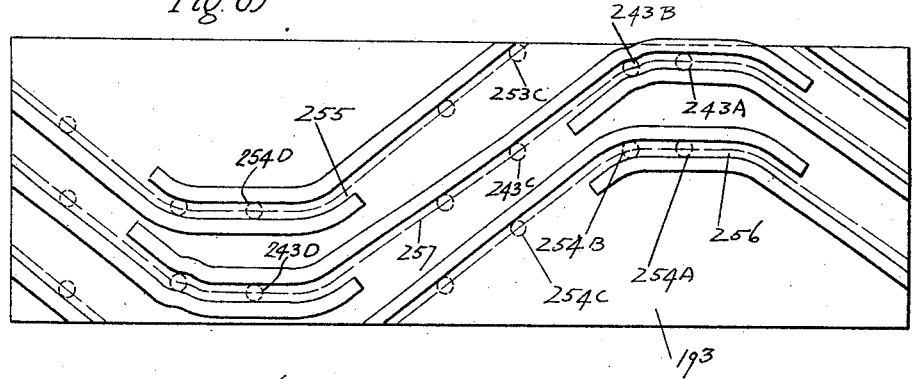
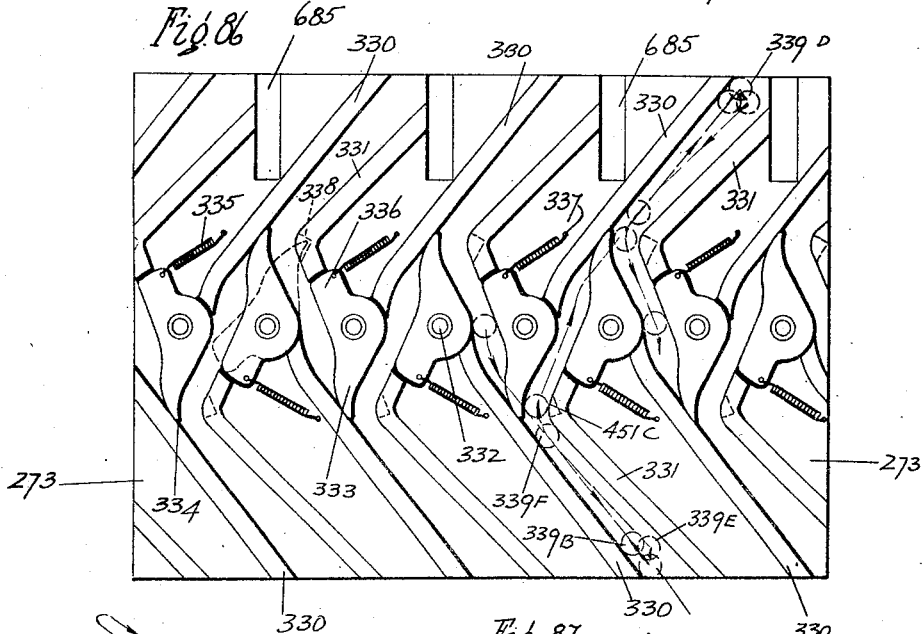
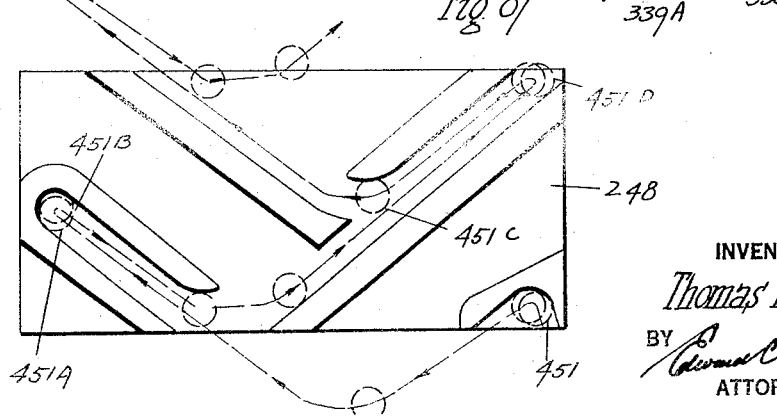
INVENTOR
Thomas Midgley
BY
ATTORNEY Oct. 19, 1926. 1,603,858
T. MIDGLEY
CORD TIRE BUILDING
Filed March 27, 1922  20 Sheets-Sheet 16

INVENTOR
Thomas Midgley
BY
ATTORNEY

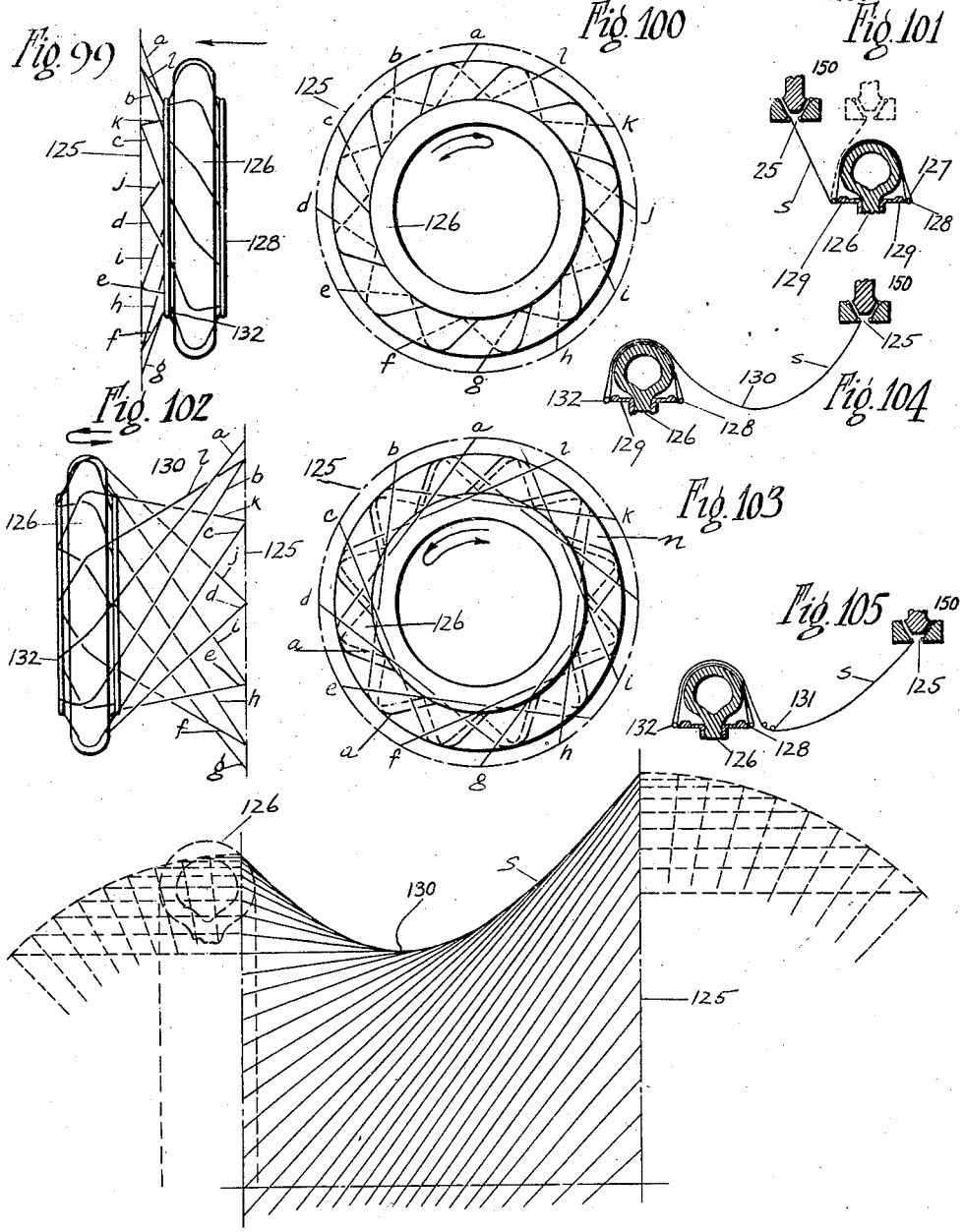

Oct. 19, 1926. 1,603,858
T. MIDGLEY
CORD TIRE BUILDING
Filed March 27, 1922 20 Sheets-Sheet 18
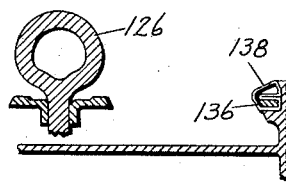
Fig. 107
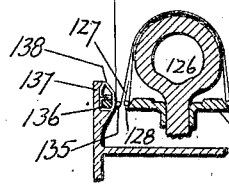
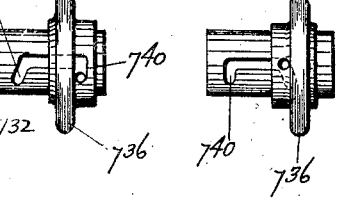
Fig. 109
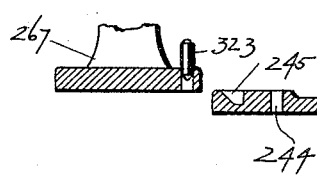
Fig. 108
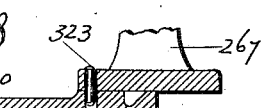
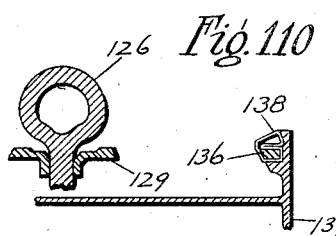
Fig. 110
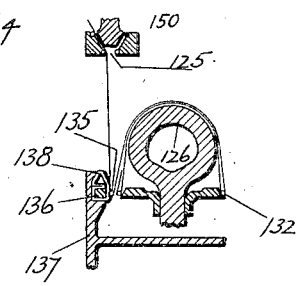
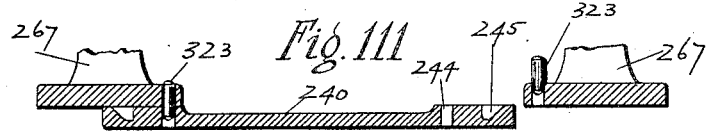
Fig. 111
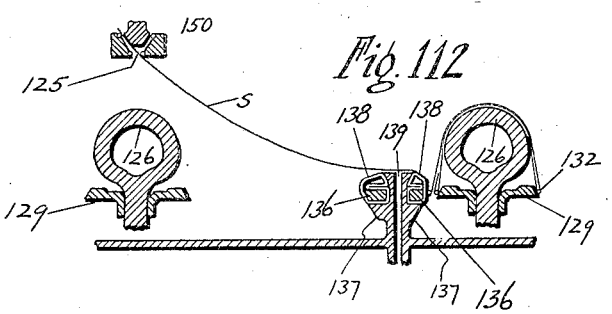
Fig. 112
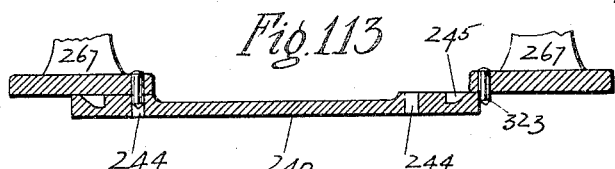
Fig. 113
INVENTOR
Thomas Midgley
BY
ATTORNEY Oct. 19, 1926.
T. MIDGLEY
1,603,858
CORD TIRE BUILDING
Filed March 27, 1922   20 Sheets-Sheet 19
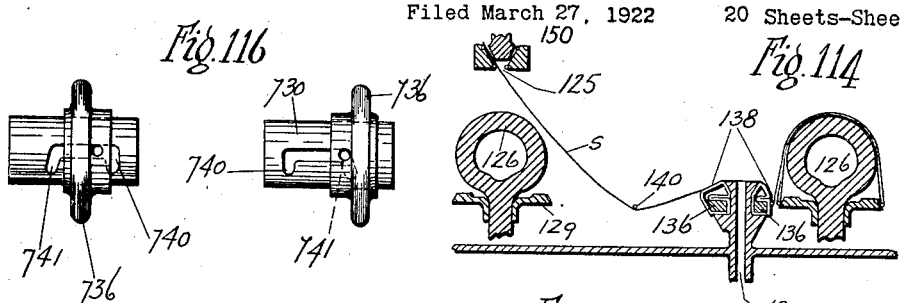
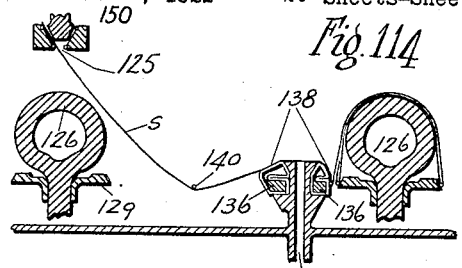
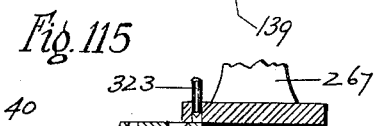
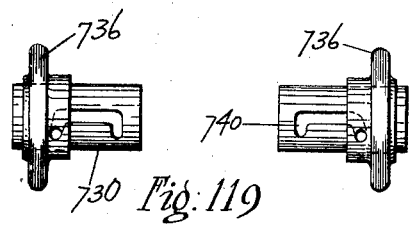
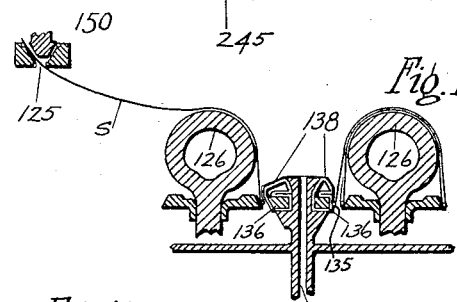
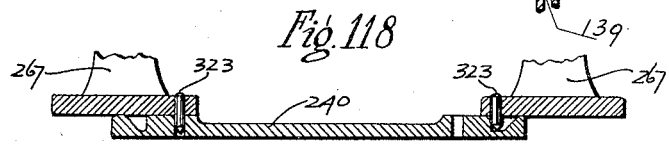
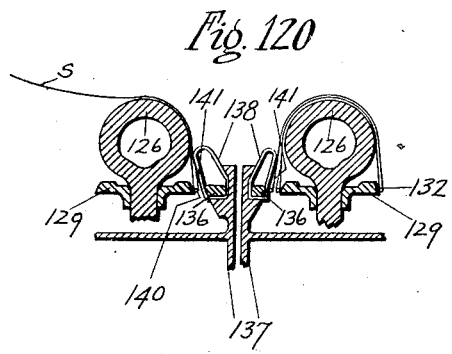
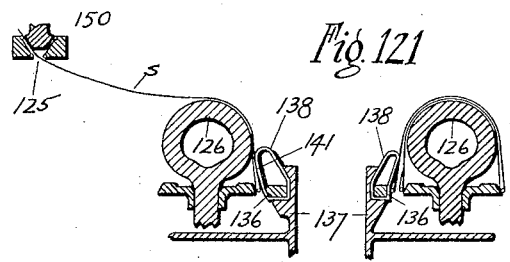
INVENTOR
Thomas Midgley
BY
ATTORNEY Oct. 19, 1926.

T. MIDGLEY 1,603,858

CORD TIRE BUILDING

Filed March 27, 1922  20 Sheets-Sheet 20

INVENTOR
Thomas Midgley.
BY
ATTORNEY

Patented Oct. 19, 1926.

1,603,858

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

CORD-TIRE BUILDING.

Application filed March 27, 1922. Serial No. 547,081.

My invention relates to the manufacture of what are customarily referred to as cord tires, both as to improvements in methods of constructing them and as to a machine by which they may be produced. The present application is a continuation in part of my application Serial No. 283,879, filed March 20, 1919, for machines for making cord tires; and contains matter divided from my application Serial No. 519,583, filed December 3, 1921, for method for building a succession of laminated articles.

By the term "cord tire" I refer to that type of outer casing for automobile tires and the like in which the strain-resisting members in any one ply or layer all lie substantially parallel without being interwoven with each other. Various methods and machines for producing such tires have been proposed. It is the object of my present invention to improve upon these prior methods and to depart from them in the particulars which will be described, and to provide a machine by which tire casings can be rapidly and accurately constructed. In one aspect of my invention I provide a method and an apparatus by which the carcass portion of a casing can be built up more accurately and with the expenditure of much less time, labor, and material than was formerly possible. In another aspect of my invention I provide a method and an apparatus by which the cord members forming the carcass portion of the tire casing can be laid under improved conditions of tension and position. In another aspect of my invention I provide a method and an apparatus by which a succession of tire carcasses may be constructed rapidly and accurately from separated cord members without waste and without disturbing the conditions of tension and location of the members in transferring from the building of one carcass to that of another, and without the necessity of handling the cord members individually. In other aspects in my invention I provide various novel devices and combinations for operation separately or conjointly in the manufacture of a tire carcass, the purposes and uses of which will more fully appear from the following description and the appended claims.

I will now proceed to describe my invention with particular reference to the accompanying drawings, in which:

Fig. 1 is a side elevation of a machine for building tires according to my invention, partly broken away as indicated;

Fig. 2 is a top plan view thereof, some of the piping being broken away;

Fig. 3 is an end elevation of the machine with certain portions removed, taken upon line 3—3 of Fig. 1;

Fig. 4 is a plan view illustrating some of the driving mechanism, the mechanism above the main frame being removed and portions of the frame being broken away;

Fig. 5 is a side elevation, partly in section, of certain main clutch mechanism;

Fig. 6 is a section taken upon line 6—6 of Fig. 5;

Fig. 7 is a perspective view of cooperating elements of the half-revolution clutch mechanism, the parts being shown for clearness in abnormally separated positions;

Fig. 8 is a view similar to a portion of Fig. 5, showing the parts in a different operative position;

Fig. 9 is a section on line 9—9 of Fig. 8;

Fig. 10 is a section on line 10—10 of Fig. 4;

Fig. 11 is a plan of certain shuttles used for operating other elements;

Fig. 12 is a side elevation thereof, partly broken along the longitudinal median line;

Fig. 13 is a section on line 13—13 of Fig. 11;

Fig. 14 is a section on line 14—14 of Fig. 11;

Fig. 15 (Sheet 1) is a sectional view of certain control mechanism for operating the half-revolution clutch;

Fig. 16 (Sheet 1) is a diagrammatic view illustrating the arrangement of the gears and eccentrics therefor;

Fig. 17 (Sheet 6) is a side elevation, partly in median section, of the core support shown at the left in Fig. 1 looking from the center of the machine;

Fig. 18 is an enlarged detail of parts shown in Fig. 17;

Fig. 19 is a sectional detail of mechanism contained within the handwheel shown at the left of Fig. 17;

Fig. 20 is a bottom plan of certain air tension mechanism located within the cam drum shown in Fig. 17;

Fig. 21 is an enlarged side elevation of the core rotating cam roll support shown at the left in Fig. 1, looking from the center of the machine, and partly broken away;

Fig. 22 is a section on line 22—22 of Fig. 21;

Fig. 23 is a detail corresponding to a portion of Fig. 21, illustrating one operating position in dotted lines and another position in full lines;

Fig. 24 is an end elevation of the parts shown in Fig. 23, looking from the line 24—24 of that figure;

Fig. 25 is an enlarged detail taken along line 25—25 of Fig. 1;

Fig. 26 is a section on line 26—26 of Fig. 25;

Fig. 27 is a fragmentary section taken on line 27—27 of Fig. 2;

Fig. 28 is an enlarged detail of that cord feeding unit shown at the right center of Fig. 3, the unit being shown vertical instead of horizontal for purposes of space;

Fig. 29 is an end view thereof, partly in section and taken approximately on line 29—29 of Fig. 28;

Fig. 30 is a fragmentary section on line 30—30 of Fig. 28;

Fig. 31 is a section on line 31—31 of Fig. 28;

Fig. 32 is a detail, partly broken away and partly in median section, of the stock roll and supporting mechanism shown in Fig. 28;

Fig. 33 is a section on line 33—33 of Fig. 32;

Fig. 34 is a section on line 34—34 of Fig. 32;

Fig. 35 is a diagrammatic view illustrating the path of the cord and liner material;

Fig. 36 is a median section of certain elements shown in Figs. 28 and 29;

Fig. 37 is a section corresponding to a portion of Fig. 29 illustrating the locking device for the cord feeding drive, on an enlarged scale and illustrating the parts in different positions;

Fig. 38 is a fragmentary view from the right of Fig. 37 partly broken away;

Fig. 39 is a fragmentary side view of certain gearing illustrated in section in Fig. 37;

Fig. 40 is a bottom plan of the parts shown in Fig. 39;

Fig. 41 is a perspective view illustrating the use of a flat cord band and also certain features of construction of the circular cord guide;

Fig. 42 is an end and side view of certain rollers illustrated in Fig. 41;

Fig. 43 is a diagrammatic view illustrating the manner of operating the constricting means;

Fig. 44 is a top plan of the constricting means;

Fig. 45 is a side elevation thereof;

Fig. 46 is a diagram indicating the position of one of the wires of the constricting means in its outer or expanded position;

Fig. 47 is a similar diagram indicating the wire in its contracted position;

Fig. 48 is a fragmentary detail illustrating one form of the wires for the constricting means;

Fig. 49 is a perspective detail illustrating the manner of attachment of the wires to their controlling rings;

Fig. 50 is a section on line 50—50 of Fig. 49;

Fig. 51 is a detail, partly broken away, showing the connections for operating the constricting wires;

Fig. 52 is a section on line 52—52 of Fig. 51;

Fig. 53 is a section on line 53—53 of Fig. 51;

Fig. 54 is a plan view, partly broken away along line 54—54 of Fig. 55, of the clutch mechanism for operating the constricting means;

Fig. 55 is a section on line 55—55 of Fig. 54;

Fig. 56 is a section on line 56—56 of Fig. 54;

Fig. 57 is an enlarged view of parts shown in Fig. 54;

Fig. 58 is a detail of a bracket shown in Figs. 54 and 55;

Fig. 59 (Sheet 10) is a section on line 59—59 of Fig. 55;

Fig. 60 (Sheet 10) is an enlarged detail of mechanism shown in Fig. 54;

Fig. 61 (Sheet 11) is a side view of a clutch dog shown in section in Fig. 60;

Fig. 62 is an end view thereof;

Figs. 63, 64 and 65 are sections taken on line 63—63 of Fig. 54, illustrating successive stages in the operation of the clutch mechanism, certain parts being shown out of their proper scale in dotted lines;

Figure 90:
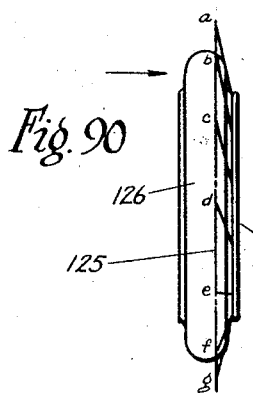
Figure 91:
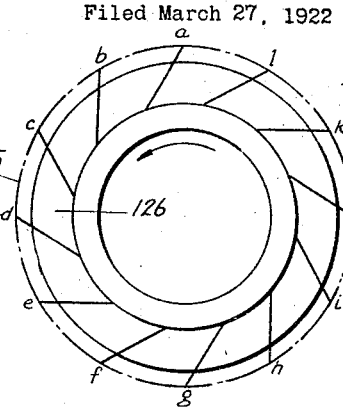
Figure 92:
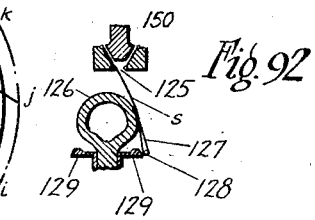
Figure 93:
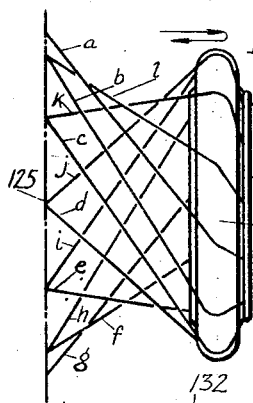
Figure 94:
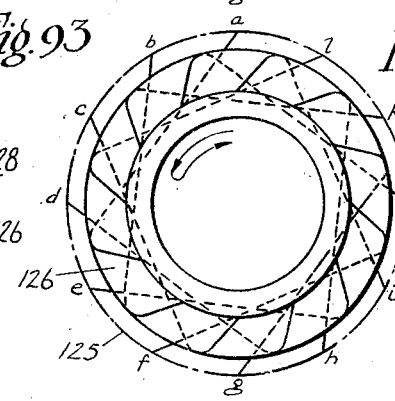
Figure 95:
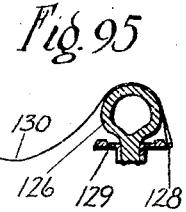
Figure 96:
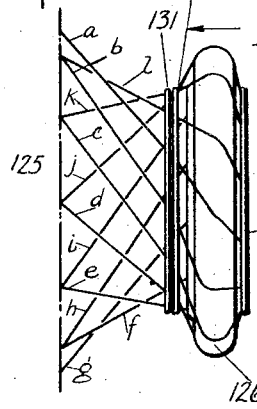
Figure 97:
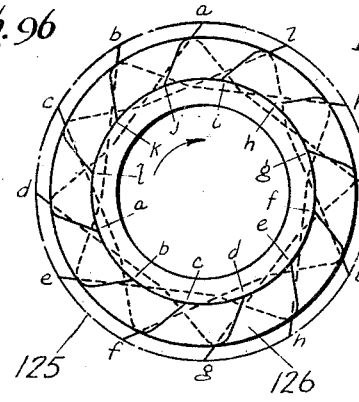
Figure 98:
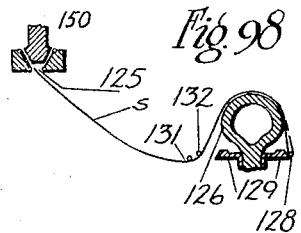
Figure 88:
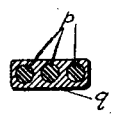
Figure 89:
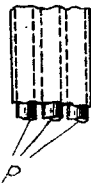

Fig. 66 is a median section through the two core supports positioned for the completion of a tire carcass on one core and the starting of a carcass on another, the sections on the two supports being taken at different angular positions to better illustrate the construction—the section of the right hand core being taken on line 66—66 of Fig. 67 and that of the left hand core on line 66—66 of Fig. 71;

Fig. 67 is a partial section taken on line 67—67 of Fig. 66;

Fig. 68 is an enlarged view of certain devices shown in Fig. 66;

Fig. 69 is a section taken on line 69—69 of Fig. 71;

Fig. 70 is a section taken on line 70—70 of Fig. 72;

Fig. 71 is a section on line 71—71 of Fig. 72;

Fig. 72 is a section corresponding to Fig. 66 showing the left hand core in that figure with the parts in their extended positions;

Fig. 73 is a section on line 73—73 of Fig. 72;

Fig. 74 is a view taken from line 74—74 of Fig. 72;

Fig. 75 is a top view of the parts shown in Fig. 74, progressively broken away to show their construction;

Fig. 76 is a detail corresponding to a portion of Fig. 68 but showing the air bags in their expanded positions;

Fig. 77 is a perspective detail of a pin for holding the building flanges to the core;

Fig. 78 is a section on line 78—78 of Fig. 4;

Fig. 79 is a section on line 79—79 of Fig. 4, illustrating the clutch for the knife drive;

Fig. 80 is a view corresponding to Fig. 79 showing a different position of the parts;

Fig. 81 is a median section through the clutch for the knife drive;

Fig. 82 is a perspective view of a clutch dog;

Fig. 83 is a perspective view of a tripping cam;

Fig. 84 is a diagrammatic view of electrical control connections;

Fig. 85 is a development of the main cam;

Fig. 86 is a development of the core rotating cam;

Fig. 87 is a development of the cord feeding shuttle cam;

Fig. 88 is a section of one form of flat cord band which may be used in practicing my invention;

Fig. 89 is a fragmentary plan view thereof;

Fig. 90 is a diagrammatic view illustrating the initial step in constructing a carcass according to my invention, showing only twelve cords;

Fig. 91 is a diagrammatic view from the right in Fig. 90;

Fig. 92 is a diagrammatic view on a slightly larger scale, indicating the form of surface which would be defined by a complete series of cords;

Figs. 93, 94, and 95 are similar views showing the core and guiding circumference in one position of furthest separation;

Figs. 96, 97, and 98 are similar views showing the application of a bead anchorage.

Figure 122:
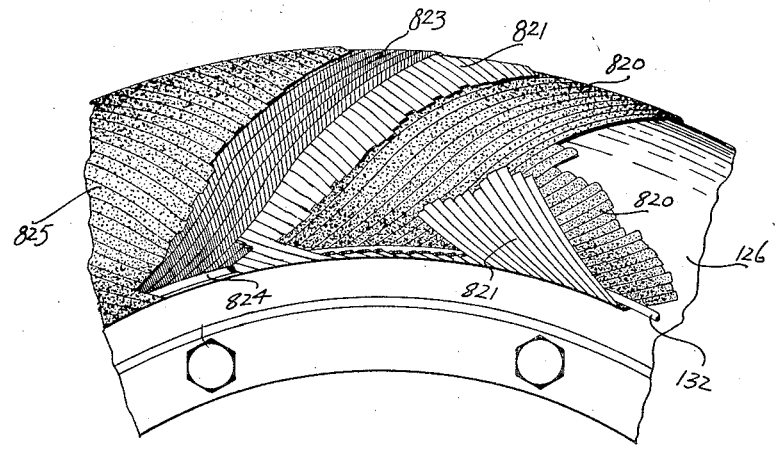
Figure 123:
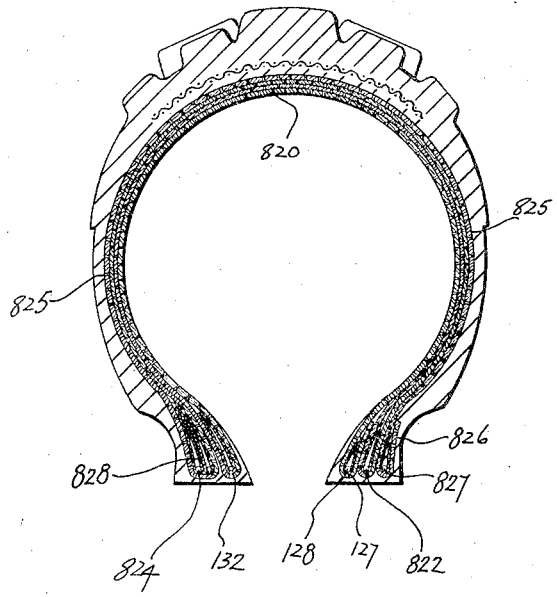

Figs. 99, 100, and 101 are similar views showing the relative position of the core and guiding circumference when the direction of rotation of the core is changed;

Figs. 102, 103, and 104 are similar views showing the core and guiding circumference in their position of furthest separation opposite from that shown in Figs. 93, 94, and 95;

Fig. 105 is a view corresponding to Fig. 104 showing the application of a bead anchorage;

Fig. 106 is a diagrammatic view illustrating the nature of the surface defined by the cicumferential series of separate cords;

Fig. 107 is a diagrammatic view showing the relative positions of the two cores, the guiding circumference, and the transfer mechanism after a carcass has been built upon one core;

Fig. 108 is a diagrammatic view upon a much smaller scale showing the relative positions of the core shuttle and core supports corresponding to the position of the parts shown in Fig. 107;

Fig. 109 is a diagrammatic view showing the relative positions of the two clamping cams at a time corresponding to Figs. 107 and 108;

Figs. 110 and 111 are views corresponding to Figs. 107 and 108 respectively but indicating a later stage;

Figs. 112 and 113 are similar views indicating a still later stage;

Figs. 114 and 115 are similar views illustrating the application of a bead anchorage;

Fig. 116 is a view corresponding to Fig. 109 but at a time corresponding to Figs. 114 and 115;

Figs. 117 and 118 are views corresponding to Figs. 114 and 115 indicating a later stage;

Fig. 119 is a view corresponding to Fig. 116 but at a time corresponding to Fig. 117;

Fig. 120 is a view corresponding to Fig. 117 illustrating the stage immediately following the severing of the material between the cores, and also illustrating the folding of the cut ends;

Fig. 121 is a similar view indicating the final stage in the transfer;

Fig. 122 is a fragmentary side view of a tire carcass constructed according to my invention, the covering rubber being removed and the plies partially broken away to show the structure; and Fig. 123 is a cross-section of a completed casing, the carcass of which is constructed according to my invention.

*Method of building carcasses.*

In the method of building tire carcasses which forms one aspect of my invention a circumferential series of separate cord members are employed, preferably sufficient in number to form a complete layer or ply. These members may be round, or flat, or of any other desired cross-section, and are preferably rubberized. In many cases it is desirable to form the cord members as flat strips such as shown in Figs. 88 and 89 by uniting a plurality of round cords *p* in a matrix *q* of rubber, and the machine which will be hereinafter described is designed to handle cord members or strips of this type. In this specification the term "cord" will be used as a convenient name for including round, flat, or other shaped members.

In Figs. 90 to 105 I have illustrated diagrammatically several stages in the building of a tire carcass, only twelve of the circumferential series of cords being shown for purposes of clearness. Before referring more particularly to these figures it may be stated that in this method of building a carcass a circumferential series of separate cords are laid back and forth in reverse folds from bead to bead until the required number of plies have been built up. By a circumferential series of cords I refer to a series extending entirely around the major circumference of the tire. This series is preferably circumferentially complete so that all the cords desired in a ply will be laid at one time, but certain features of my invention also find applicability where a series not complete circumferentially is used. Whether the series is circumferentially complete or not, however, it is preferably balanced throughout the circumference so that conditions circumferentially of the carcass will be uniform. The cords may be spaced from each other sufficiently to provide gaps between them, to be filled by other cords, or by rubber supplied in excess on the sides of the flat cords as fully described and claimed in a copending application filed by me June 17, 1921, Serial No. 478,303. The spacing of the cords may also be such that they are in contact edge to edge at the bead line and are slightly separated at the tread, the spaces between them being preferably filled with rubber as described in said copending application. Or, if spaces are not desired, the cords may be arranged edge to edge at the tread and allowed to overlap at the bead.

By using separate cords I am enabled to supply the material in as great length as desired, and at the same time avoid any necessity for folding or working a cumbersome sheet of material. The great length of material which may be supplied by this method has especial utility where a succession of carcasses are to be built, and the material is to be handled in passing from the building of one carcass to that of a succeeding carcass by the transfer method which will be described later. The plies of cords may be held in the bead portions of the carcasses in any desired way, suited to the type of tire to be made. If tires of the inextensible bead type are to be made the preferred manner of securing the cords at the bead edges of the carcass comprises enclosing an inextensible annular anchorage such as one or more wire hoops in each reverse fold of the material. It is this type of construction which will be more particularly described.

According to my invention the cords are laid back and forth to build up a carcass by guiding them inwardly in constantly taut condition and under any desired tension from a circle of constant circumference, indicated at 125 in the drawings, securing their inner portions adjacent a circular building support such as a flat drum or a convex core indicated at 126, and causing relative reciprocation and rotation between the support and the guiding circumference so that the support passes back and forth through the guiding circumference. The position of the core and guiding circumference at the start of the cord laying operation is shown in Figs. 90, 91, and 92, the twelve cords shown being lettered from *a* to *l* in Figs. 90 and 91, and the surface formed by the complete circumferential series of cords being indicated at *s* in Fig. 92. The surface *s* (Fig. 92) defined by the series of cords is substantially frusto-conical in this position. The motions between the core and the guiding circumference which will be described may be imparted to the core or to the guide or to both, but for convenience in description all motion will be considered as being given to the core only.

With the core and guide in the initial position of Figs. 90, 91, and 92, the cords may be secured to the core in any suitable way, as by folding them at 127 around an annular anchorage or hoop 128. The core has been shown as provided with bead flanges or abutments 129, which serve to support the cords and anchorages out from the side of the core in a position where they may be easily operated upon. The flanges preferably extend far enough out so that no undue strain will be imposed on the cords in shifting the anchorage from the building position into adjacency with the undercut sides of the core. If, as is usually the case, the cords are to extend diagonally across the carcass, they are anchored to the core initially at the angle desired.

The core is now moved axially from the position of Fig. 90 to that of Fig. 93 as indicated by the arrow in Fig. 90 and the cords fed in taut condition from their supply through the guiding circumference. Simultaneously with this axial motion the core is given a rotation in the direction of the arrow in Fig. 91, so that the initial angular position of the cords will be maintained as they are drawn across the core. By the relation of this rotation to the axial movement of the core the angle of the cords may be controlled, the rotation given during the reciprocation being steady or variable as required to lay the cords upon the core in the angular positions desired. If the cords are to be laid straight across the core instead of diagonally this motion of rotation may be omitted. The combined effect of the axial and rotary motions is to cause the series of cords to depart from a conical surface and assume a form which would be referred to by mathematicians as a warped or ruled surface of revolution. The contour of this surface is approximately represented by the line *s* in Fig. 95, representing the contour of the surface defined by all the cords, not the path of any individual cord. Each cord lies in a straight path between its guided portion in circumference 125 and the core, and it is the angular position of all the cords that creates the curved surface. This can perhaps best be understood by analogy from a consideration of two axially separated disks having a large number of cords connecting their circumferences and extending parallel to their common axis. If now these disks be given a relative rotation it will be apparent that the surface formed by the cords will gradually decrease in circumference between the disks, and that if the rotation is carried far enough the cords will all tend to pass through the common axis, causing the surface to become a double cone (slightly distorted on account of the bunching of the cords near the axis). The surface shown in Fig. 95 is of this type, except that the rotation is carried only to an intermediate position and that the circumferences, represented by the peripheries of the disks in the analogy, are unequal.

This surface has been shown in Fig. 106 by the use of a slightly larger scale and a greater number of cords. In this figure the full lines represent cords, each cord extending in a straight but angularly disposed path from the guiding circumference 125 to a circumference representing the plane of tangency of the cords with the core. This figure does not show the path of the cords after they touch the core, as the purpose is merely to illustrate the character of the surface. The ends of the several cords are evenly spaced on the two circumferences as shown by the partial end elevations in dotted construction lines. The curve *s* in this figure is formed by the surface enveloping the straight cords, and is not due to any curve in the cords themselves.

The surface *s* formed by the series of cords presents, by reason of its curved character described above, a region of reduced circumference 130, which, if the separation and relative rotation of the core and guide are carried far enough, will permit of the restriction of the series of cords to the bead diameter by an anchorage which is later moved adjacent the bead flange 129 as will be described. It will be noted, however, that in the specific form illustrated the minimum circumference 130 of the surface is spaced a relatively great distance from the bead flange 129 and consequently the bead anchorage if applied to the surface in its natural condition would require considerable shifting along the cords to reach its final position adjacent the flange. If cords impregnated or coated with sticky rubber are used this may result in bunching, misplacement, or abrasion of the cords, and for this reason I prefer, in one embodiment, to constrict the surface artificially so as to shift the region of reduced circumference nearer to the core. For this purpose I may employ an encircling means 131 similar in operation to an iris diaphragm. This means is indicated diagrammatically only in Figs. 90 to 105, but a suitable mechanism for the purpose will be described later. If the cords are to be laid straight across the core instead of diagonally the curved surface will not be formed, the cords defining a frusto-conical surface tapering from the guide to the core, and artificial constriction of the surface must be resorted to.

The artificial constriction of the surface will bend the cords out of their normal straight line path between the guiding circumference and the core, and therefore tends to increase their length. To meet this condition additional lengths of cord may be paid out through the guiding circumference or the core may be moved a slight amount toward the guide, or vice versa. The latter method is indicated in the drawings by the difference in the relative positions of the core and guide in Figs. 93 and 96.

With the series of cords so constricted close to the side of the core the bead anchorage 132 may be applied, preferably by placing around the cords an encircling hoop of wire, as by splicing, welding, soldering, or clipping together the ends of a wire wound one or more times around the cord defined surface. A suitable manner of joining the ends of the wire by a clip which engages loops in the ends of the wire is shown in my Patents 1,329,792, Feb. 3, 1920, and 1,368,642, Feb. 15, 1921. The wire may be placed on either side of the constricting means, but preferably on the side nearest the core so as to avoid unnecessary shifting of the anchorage. The constricting device, if used, is now removed.

As the constriction of the series of cords is preferably carried far enough so that the circumference of the restricted portion of the surface formed by the series of cords is sufficiently small to render easy the application of the encircling bead anchorage, it follows that there would be slackness in the cords upon removal of the constricting device, if some means were not taken to prevent it. Slackness, as previously stated, is undesirable, as it permits displacement and sticking together of the cords and the loss of the cord tension which it is desirable to maintain throughout the building of the carcass and until the cords are finally anchored under tension in the carcass. To avoid relaxation of the tension of the cords while the constricting device is being removed they may be simultaneously drawn back in constantly taut condition through the guiding circumference. An equivalent result can be attained by increasing the length of path of the cords between the guide and the core as by rotating the core slightly in the direction of the arrow in Fig. 91, by moving it axially away from the guide, or by both. It may be pointed out in this connection that the control of the angular position of the cords upon the core depends more upon the rotation of the core while it is near the plane of the guiding circumference than when it is at a distance therefrom, and therefore the method just described of tensioning the cords by rotation of the core will not appreciably affect the angular positions of the cords.

With the cords so laid across the core and through the anchorage 132 the first ply is complete except that the anchorage must be positioned against the bead flange. The positioning of the anchorage and the starting of the second ply are preferably effected simultaneously. For this purpose the core is moved towards and through the guiding circumference in the direction of the arrow in Fig. 96 until it reaches the position of Fig. 102, the cords being drawn back or paid out through the guiding circumference so that they are taut at all times. During the first part of this motion the walls of the trough in which the anchorage 132 lies become gradually steeper (compare Figs. 98 and 101) and the trough is finally changed into a fold of the cords passing around the anchorage and back upon the first ply of cords already upon the core (see dotted lines in Fig. 101), thus drawing the anchorage to a position contiguous to the bead flange. The individual cord members are preferably maintained under uniform tensions balanced throughout the circumference so that they will exert an equal outward pull on the anchorage throughout its circumference and will therefore center it without the necessity of any centering device being used.

In order to keep the cords in their proper angular position during this motion the core is rotated in the reverse direction from that given on the outward or cord-laying stroke until the core reaches substantially the position of Fig. 99. As represented in the drawings the direction of original rotation was counter-clockwise, and accordingly the direction of rotation during the travel from the position of Fig. 96 to that of Fig. 99 should be clockwise. This reversal of rotation is necessitated by the fact that the original travel from a position corresponding to Fig. 99 to that of Fig. 93 is primarily for the purpose of permitting easier application of a bead anchorage. If desired the axial movement of the core from the initial position of Fig. 90 could have been stopped at about the position of Fig. 99 and the constricting of the cords down to the bead line accomplished at this point. The greater separation of the core and guide which has been set forth as the preferred method serves to provide more space in which the operator may work in applying an anchorage, and has the further advantage in case the cords are being laid on a convex core that the shape of the cord surface developed will to a large extent preform the cords to the core so that they are applied to it with the minimum displacement from their straight line positions. It will be apparent that as the travel from the position of Fig. 99 to that of Fig. 93 and back again is not a cord laying operation the angular position of the cords must be the same at the end of this travel as at its beginning, and that therefore the direction of rotation of the core must have the temporary reversal mentioned.

At the position of Fig. 99, or shortly thereafter, the cords begin their second traverse over the core, and if, as desirable, the second traverse is to extend in the opposite diagonal direction, or, expressed differently, if the direction of the cords laid on the core is to incline always in the same circumferential direction along the core, the core must resume its original counter-clockwise direction of rotation. This is indicated by the reversal of the arrow in Fig. 100. The point at which the original direction of rotation is resumed is so chosen that at the time when the cords contact with the side of the core at the beginning of the laying of the next succeeding ply (see dotted lines in Fig. 101), the cords will be in their proper angular position. As the core moves from the position of Fig. 99 it passes through the guiding circumference 125, the latter being larger than the maximum circumference of the core to permit of this, and continues moving towards the left in the figures with a counter-clockwise rotation until it reaches the position of Fig. 102. By this transposition of the planes of the core and the guided portions of the cords a second course or ply of the cords is laid diagonally across the first as will be apparent from a study of the cords in Fig. 102.

After the core has reached the position of Fig. 102, the cords may again be constricted for the application of a bead anchorage as described above and indicated by Fig. 105. This bead anchorage is then brought contiguous to the bead flange in a manner already described. Successive passages of the core through the guiding circumference, alternating with the restriction of the cords to the bead line of the core, may be continued until the desired number of plies have been built up on the core. This sequence of operations, which may be carried on rapidly and by shaping the material to the core as it is laid, provides a carcass structure composed of a plurality of reversely folded plies of material having an annular anchorage enclosed within each reverse fold, the material being continuous throughout the several plies and passing directly from one ply to that immediately adjacent. If the cords are to be angularly disposed across the carcass the core is given a rotation in one general direction (counter-clockwise in the drawings) with short interposed periods of rotation in the reverse direction for the purpose described above. The rotation of the core in this manner will cause the cords to lie diagonally across the core, and the individual cords to progress in a zig-zag path circumferentially of the casing as they pass through the successive plies.

The method of building tires described above is claimed in my copending application Serial No. 448,891, filed March 1, 1921.

The carcass so built up may be completed by severing the series of elements near the bead line and folding the cut ends around the final bead anchorage, the carcass being then ready for the application of suitable covering material such as the tread and sidewalls. I prefer, however, to start the building of a succeeding carcass before severing the cords, as will be described.

In case flat bands or cord members such as are shown for example in Figs. 88 and 89 are used, they are preferably guided so that at circumference 125 their flat sides lie parallel to the plane of core 126, as in this position they more readily and accurately fold around the bead anchorages. The use of flat strips of this nature is in many instances desirable as it reduces the number of individual cord members which must be handled, and permits of the use of a large number of small cords with equal facility to a smaller number of cords of larger diameter, thereby making it possible to construct a tire having a relatively large number of plies without undue thickness.

*Method of transferring.*

It is desirable in practicing the method described above to provide some way in which the circumferential series of cords may be transferred as a unit from a built up carcass into position for building a succeeding carcass. As stated above it is preferred to supply the cords in lengths sufficient to build a large number of carcasses, as this avoids the necessity of preliminarily trimming the cord members to lengths and, in combination with the transfer method now to be described, permits of a desirable maintenance of the tension in the cords during the entire building of a series of carcasses without any relaxation when a casing is being completed and a new one started. This transfer method also has marked advantages in saving time in passing from the building of one carcass to that of a succeeding one, especially when a circumferential series of cords are used, as the operation of individually arranging the separate cords in position for starting the building of a carcass consumes considerable time.

This method of passing from the building of one carcass to that of another may be briefly summarized by stating that the material is carried from the built up carcass, preferably in circumferentially complete form such as a circumferential series of cords, into position for starting the building of a succeeding carcass, and the material severed between the carcasses only after it has been so secured in each carcass that displacement will be prevented. This transfer of the material may conveniently be accomplished between and adjacent the bead edges of the carcass, as in that position the cut edges of the material may be incorporated in the bead construction of the carcass conveniently and without waste. The preferred method of transferring will now be described in connection with the carcass building method above.

I have illustrated in Figs. 107, 110, 112, 114, 117, 120, and 121, successive stages in the completion of the building of one carcass and the starting of a succeeding one. For this purpose I use two cores 126 arranged for the transfer in axial alignment with each other and with the guiding circumference 125. A tire carcass composed of two plies of cords is shown mounted on the right hand core 126. It will be noticed that the diagrams illustrating the method of building a carcass (Figs. 90 to 105) show the building of a carcass on a core corresponding to the left hand core. This change is made in order to show the position of the bead wires and the anchoring folds of the plies around the wires in the two cases, the building of a carcass on either core being exactly similar except as to the direction in which the core makes its initial passage through the guiding circumference. Throughout the series of views illustrating the transfer the cards are shown for clearness as a continuous surface $s$ as in Figs. 92, 95, 98, 101, 104, and 105. The carcass mounted on the right hand core 126 is shown as being composed of two plies only although I contemplate using a larger number in most instances, as this clarifies the illustration and as the addition of further plies would not change the method of procedure in the transfer operation. The material is initially anchored as by folding at 127 around an annular anchorage 128, laid across the core to form the first ply, folded back around an anchorage 132 and across the core to form a second ply, and is held restricted to the bead diameter at the first side of the cord by an anchorage 135. From this last named anchorage the cords extend to the guiding circumference 125, to which they are supplied in what may for present purposes be considered as continuous lengths. As in the building of individual carcasses, the cords are preferably kept continually in taut condition balanced throughout a circumference.

In Fig. 107 the core is shown in a position where the anchorage last applied has been positioned adjacent the bead support 129, the cords extending substantially parallel to the plane of the core. This position is convenient as it at once completes the positioning of the bead anchorage 135 and leaves the cords in such relation to the core as will permit the clamping adjacent the core of the bead anchorage 135 and the cords drawn around it. Various methods of holding the anchorage and cords may be used, but I have illustrated diagrammatically a type of clamp which will be more fully described in connection with the later description of the machine designed for mechanically carrying out the building and transferring methods. Illustration of this particular form of clamp is desirable as the figures now being considered are designed to illustrate both the method in its broader aspects and the manner in which the mechanism later to be described is operated in carrying out the method. Similar clamping means are provided for each core.

Clamping rings 136 are carried on disks 137, the outer peripheries of the rings serving to position the cords for cutting as will appear later. The clamping rings are of such diameter as to press the bead anchorages with the material folded around them against the bead flanges 129 as shown in Fig. 107. The clamping rings may be drawn towards the bead flange in any suitable way, mechanism for this purpose being described in connection with the machine. Located radially outwardly of the clamping rings are inflatable annular bags 138 suitably formed to expand on inflation in such a manner as to turn back upon the material on the cores the free ends of the cords formed by severing the series of cords between the cores. These bags may be dispensed with and this folding accomplished by hand or by the use of any other suitable device, but they have been shown to illustrate the operation of the later described machine and also as one form of device found satisfactory for the purpose. As shown, the clamping rings for the two cores are of slightly different widths to compensate for the difference in bead thickness between the built-up carcass and the carcass being started. This difference is not necessary, as the only effect of varying the width of the clamping ring is to change the width of the cut side portion of the material which is folded back around the anchorage, and to vary the place at which cutting of the cords takes place.

With the parts in the relation shown in Fig. 107 the first step in preparing to transfer the cords to a fresh core is clamping them around anchorage 135 in the bead of the built-up carcass, as by drawing the clamping ring towards the core. The clamping ring 136 associated with the left hand core is now positioned adjacent the clamping ring of the right hand core, so that the disks 137 associated with the rings will have a slight space 139 between them across which the cords may be bridged. The left hand core and the two clamping rings are now moved to substantially the position of Fig. 112, causing the cords to be drawn out through the guiding circumference and to lie across the disks 137. The series of cords are now constricted at a circumference between the disks and the guiding circumference to a diameter small enough to permit of the application of a bead anchorage 140, which is to constitute the initial anchorage of the carcass to be built on the left hand core. This core is now moved into the surface formed by the cords, causing the anchorage 140 to be moved towards the disks, and finally clamping the anchorage with the cords lying around it, between the clamping ring 136 and the bead flange 129 (Fig. 117). The cords now extend from the guiding circumference over the left hand core, across the space between the bead edges of the carcasses, and into the carcass on the right hand core, and are clamped against movement or loss of tension in the bead of each carcass. The cords may now be severed along the plane of space 139 (Fig. 117), leaving free ends of the series of cords adjacent each core which can be folded back as at 141 upon the material on the cores to form a loop about the anchorages. The cord material being preferably coated or impregnated with rubber, the folded part will adhere firmly, and upon vulcanization will become permanently bonded. Fig. 120 shows the folding back of the side edges of the cord material as being performed by inflation of the annular bags previously referred to. The right hand core, with the carcass thereon completely built up as far as relates to the present method, may now be removed for the addition of suitable covering materials such as a tread and sidewalls, and the method of building a carcass described above is carried out upon the left hand core. The clamping ring 136 associated with the latter core is preferably maintained in clamping position until the first ply is laid and the second ply sufficiently started so that the tension of the cords between the core and the guide will exert no appreciable tendency to disturb the fold around anchorage 140, a stage corresponding approximately to that shown in dotted lines in Fig. 101.

Another way in which the position of Fig. 117 can be reached from that of Fig. 114 is to bring the right hand core back towards the guiding circumference until the anchorage 140 has been drawn close to clamping ring 136 and lies substantially in the plane of the guiding circumference. The left hand core is then brought into adjacency with the right hand core, and the clamping ring clamped against bead flange 129. The cores may now be moved simultaneously to the position of Fig. 117 and the cutting and folding proceeded with as before. This method presents the advantage that the position of the cords is not liable to any distortion on account of the movement of the core against the cord surface, the cords being in this case laid across the core as in the carcass building operation.

The transfer method described serves to finish the building of one carcass and start the building of a succeeding one simultaneously and by the same series of operations. It permits the use of cord material supplied in great length and effectively utilizes the material in successively building a plurality of carcasses. It permits of the transferring from one core to another of a circumferential series of cords without danger of misplacing or tangling the cords, and without the necessity of separately handling individual cords. It also permits of holding the cord tension with the desired uniformity at the critical periods of beginning and ending the operations of laying the cords in the carcass.

This method of transition between the building of successive tire carcasses is claimed in my copending application Serial No. 519,583, filed Dec. 3, 1921.

*General description of machine.*

The embodiment of the machine concept of my invention which I have shown in the drawings, but which can be varied in arrangement and details without departing from the invention as defined in the appended claims, is designed to carry out by mechanical means the method previously described. Stripped of the mechanism used for facilitating the building operations and for improving the lay of the cords, the machine consists in a circular guide 150 (which determines the circumference 125 previously referred to) adapted to position in a circle of fixed circumference a circumferential series of cords, a core 126 somewhat smaller in diameter than the guide, and mechanism for causing relative motion between the core and the guide to pass the core through the guide. The machine as actually constructed and shown is more refined and elaborated than this elemental concept, and it will be convenient to consider it in several functional groups of mechanism and to thereafter show how the various groups coordinate in operating the machine in the preferred manner. Certain of the groups and mechanical details are capable of use outside the preferred combination shown. I will therefore in describing the several groups attempt to point out rather briefly some of their individual characteristics. As it is not possible to do this with thoroughness without great prolixity, I will take this opportunity to call attention to the general fact, and to point to the appended claims in which certain of these groups and details have been claimed separately.

Before passing to the detailed description, the whole machine may be briefly summarized. Extending transversely across the center of the machine is an annular frame or housing 151 supporting within it the circular guide 150. Arranged coaxially with the guide are two building supports or cores 126, shown as of the usual convex form shaped to the internal contour of the carcass. These cores are carried upon overhanging supports, each of which is engageable with a reciprocating shuttle mechanism operable to reciprocate either or both of the cores forward and back through the circular guide to cause cords to be laid upon them according to the method described above. During the reciprocation, mechanism causes the cores to rotate, in order that the cords may be laid angularly across the surface. A series of cord feeding units are located within the annular frame 151 and are operated, with relation to the movement of the cores, so that at all times during the building of a carcass the cords will be held taut and under the desired balanced tension. The mechanism for operating the above parts is provided with clutch and control devices by which the motion of the cores and the action of the cord feeding units may be controlled and so as to be automatically stopped at the end of a cycle of operations and yet to be constantly under the operator's control so that they may be halted at any desired point. Mechanism is provided for constricting the circumferential series of cords adjacent the bead line of the core, and for holding them in that position while a bead anchorage is being applied. Mechanism is also provided for assisting in the transfer of the cords from one support to the other as the building up of one carcass is completed and another carcass started, and for severing the series of cords between the carcasses. These various mechanisms will now be described, and subsequently their correlation in the manufacture of a tire carcass will be pointed out.

In order to thoroughly illustrate the mechanical aspects of the invention, a great number of details have been disclosed. The exact mechanical details illustrated are not essential to the invention, and applicant realizes that changes may be made without departing from the inventions claimed. Furthermore, the drawings are illustrative rather than minutely descriptive, and applicant relies upon the understanding of one skilled in the art to supply such additions, subtractions, or corrections in the detailed mechanism as may be found most expedient in the construction of machines according to the invention.

Framework and main drive.

The main frame 152 of the machine, comprising longitudinal and end pieces forming substantially a hollow rectangle, at the center of which rises the annular housing 151, is supported on any suitable foundation by I-beams 153 (Fig. 3). Depending from the frame are hangers 154 journaled to receive a main drive shaft 155 from which the core reciprocating means and the cord feed derive their motion. At one end of the frame is a hanger 156 journaled to receive a cross shaft 157 carrying a worm 158 meshing with a worm wheel 159 fast to the main shaft 155. Also supported by hanger 156 is a motor 160 serving as a source of driving power and connected to cross shaft 157 by a chain 161 operating over a sprocket fast on the shaft of the motor and a sprocket 162 fast to shaft 157. The hanger 156 may be formed as shown to serve as a housing for the worm wheel 159. The worm drive described has the advantage that it is normally irreversible, so that the tension given to the cords by the operation of the machine will be maintained if the motor is stopped whereas if a simple spur gear drive were used the tension would cause the motor to turn backwards a slight amount each time the driving current were shut off, thus releasing the tension of the cords.

Friction clutch.

The main shaft is preferably connected to the operating parts of the machine through a friction clutch which will slip in case the strain upon the machine becomes in any way too great, thus preventing breakage, and will also enable the operator to release the tension under which the machine normally operates in case he wishes to disconnect certain elements as will more fully appear below. I have shown this clutch as comprising a cylindrical portion 163 (Figs. 1 and 5) fast to main shaft 155 and encircled with a tapered spiral 164 of spring metal having one end secured as at 165 to a flange 166 on a sleeve 167 freely rotatable on shaft 155. Splined as at 168 to the main shaft is a clutch operating disk 169 having a hub portion 170 in which a shifting collar 171 is rotatably mounted. In order to permit of the assembly of the collar on the hub it is preferably formed in two parts secured to each other as at 172. As the disk 169 is moved along the shaft towards the body of the clutch it strikes against an adjustable contact piece 173 on a lever 174 pivoted at 175 on a bracket 176 secured to the flange 166 and having an arm 177 contacting with the turned up end 178 of the spiral 164.

In order to shift the collar 171 it is provided with pins 179 engaging in slots near the ends of bars 180 fast on a transverse shaft 181 journaled in bearings 182 in hanger 154. This shaft carries at one end an arm 183 pivoted to a link 184. The other end of link 184 is connected to one arm of a lever 185 pivoted to the main frame. The long arm of this lever has pivoted thereto a bent lever 186, to which is connected one end of a link 187 connected at its lower end to a pawl 188 operating on a ratchet 189 fixed to the main frame. Either the lever 186 or the pawl 188 may be spring pressed to maintain the pawl normally in contact with the ratchet, release of the pawl being secured by pressing lever 186 towards lever 185 as will be easily understood. By swinging lever 185 to the right as viewed in Fig. 1 the disk 169 can be forced towards the body of the friction clutch, causing lever 177 to engage with the end of the spiral 164 and draw it against the cylindrical portion 163. After the spiral has been drawn down the pawl 188 serves to hold it in position, the drag of the spiral on the cylinder 163 serving to clamp it even more firmly.

Half-revolution clutch.

I have also provided the machine with a clutch mechanism constructed to cause the parts operated through shaft 155 to run through a half revolution of that shaft and to then stop until again set in motion by the operator. This feature is not essential, but is convenient in stopping the machine at certain periods of the building cycle. Sleeve 167, which forms the driven part of the friction clutch, will rotate constantly as long as the friction clutch is maintained in engagement and the motor is operated. Secured to this sleeve is a head 190 serving as a driving means for the half revolution clutch now to be described. This head is formed on one side with a circumferential series of recesses 191. Each recess has one end formed as a driving surface 192, conveniently faced with a hard material to reduce wear. A cam drum 193 is freely rotatable about the main shaft 155 in journals formed in the webs 194 of the drum. One web carries a clutch drum 195 having a dovetailed cross groove 196 and a circumferential groove 197 continuous except for a short distance as at 198. Sliding in the cross groove (Figs. 5, 7, and 8) is a cam dog 199, normally pressed towards head 190 by a spring 200 positioned by a hole 201 in the end of the dog and held by a bridge piece 202 at the end of the cross slot. In the driving position of the dog its end 203 lies in one of the recesses 191. As the head rotates the surface 196 of that recess contacts with the dog, and consequently the rotation of the head is imparted to the clutch drum 195, which is a functionally integral part of the cam drum 193.

In order to withdraw the dog 199 at the end of a half revolution from that recess 191 in which it happens to be engaged, two slides 204 (Fig. 6) are fitted in bearings in one of the hangers 154 depending from the main frame. Each slide has near its outer end a slot 205 in which is engaged a pin 206 upon a yoke 207 pivoted at 208 to the hanger 154 and straddling the clutch. Rocking of the yoke will result in one slide being pushed into and the other drawn out of the circumferential groove 197 in the clutch drum 195. The inner end of each slide is formed into a generally triangular cam 209 adapted to cooperate with the rounded corner 210 of a transverse groove 211 in the dog 199. When the dog is in its retracted position with relation to the recesses this transverse groove in the dog is positioned as a continuation of the circumferential groove 197 in the clutch drum. When, however, the dog is in engagement in one of the recesses 191, the corner 210 is projected into the circumferential groove 197 in the path of the triangular end of whichever of slides 204 is in its inner position.

In Fig. 5 the parts are shown in the position they occupy after the revolution of the clutch drum has carried the dog 199 against that slide 204 at the left in Fig. 6. The motion of the clutch drum forces the corner 210 against the cammed end 209 of the slide, causing the dog to be drawn out into its inactive position where its end 203 no longer engages the driving surface of the recess. As this disconnects the clutch drum from head 190 further rotation of the clutch drum ceases, and the dog remains in its inactive position with the flat portion 212 of its transverse groove resting against the side 213 of the slide. If the machine is in normal operation the strain on the parts will prevent any over-travel of the clutch drum, but this resistance to motion is not present in case the machine is running idle. To prevent over-travel in this latter case the bridge 198 across the circumferential groove 197 in the clutch drum is provided. This contacts with slide 204 in case the parts do not stop in the position shown in Fig. 5, effectively stopping further rotation of the drum.

To again start the machine the yoke 207 is rocked, withdrawing from the groove that slide 204 previously in its inner position and simultaneously inserting the other slide 204 into the groove. The withdrawal of slide 204 releases the dog, which is pushed by its spring into that one of recesses 191 which is next to come by, and joins head 195 and the clutch drum for rotation together. This rotation continues for another half a revolution, when the dog encounters the other slide 204, and by a similar action to that described above the machine is again stopped. By this clutch mechanism I provide means for causing the main operating parts of the machine to operate through a full or partial cycle and to then come to rest automatically. The period at which this stoppage is desirable will appear later.

Yoke 207 is controllable by the operator through the following connecting mechanism. Pivoted to the hanger 154 is a lever 214 having at its lower end a slot 215 engaging pin 216 attached to the yoke. An arm 217 of the lever 214 has its end bent and coupled to a link 218 connected at its other end with a rocking lever 219 pivoted to the main frame. Lever 219 is rocked by means of links 220 having their ends formed as straps 221 (Figs. 15 and 16) and held between plates 222 in positions encircling eccentrics 223 on the shafts 224 of the gears 225 rotatably secured in bearings 226 on the annular housing 151. A gear 227 is mounted between gears 225 so as to connect them for rotation, and handles 228 attached as by screws to each of the gears serve to rotate them together as desired. By operating handles 228 the yoke 207 will be rocked through the train of mechanism described. Assuming the motor 160 in constant operation and the friction clutch engaged, successive half revolutions of the cam drum 193 will be caused by swinging handles 228 alternately one way and the other after each stoppage of the cam drum by the clutch mechanism described.

*Electric control.*

To assist the operator in starting and stopping the mechanism with ease and rapidity, I have shown diagrammatically in Fig. 84 an electrical system for actuating the motors. This controlling mechanism need not be considered in detail, as the various elements are of standard construction and their diagrammatic representation will be sufficient to enable any skilled electrician to properly install the apparatus. The main line 230 is connected through a main switch 231 to a control panel 232 also electrically connected to a push-button switch 233 and the main motor 160. The push-button switch is of the so-called "inching" type, well known in individual motor drive installations, by means of which the motor 160 can either be run continuously by pressing one button 234, the motor in this case being stopped by slightly depressing button 235, or "inched" along by fully depressing button 235 and holding it depressed as long as the operator desires the motor to run. The control panel contains suitable standard apparatus operating automatically to start and stop the motor under the influence of the switch 233.

Also connected to the main line 230 through a switch 235' is a motor 236. This motor drives the constricting means and the cutting mechanism to be described later, and will be referred to again in those connections.

*Shuttle drives.*

In the embodiment of the machine shown the cores are reciprocated and the cord feeding units operated by independently movable shuttles reciprocated centrally and longitudinally of the machine frame by suitable cam mechanism. The core shuttle is provided with means for connecting to it for reciprocation either or both of the cores. The cord feeding shuttle has a cam upon its surface which by its reciprocation imparts motion to a driving ring for the cord feeding units. Separate shuttles are provided for the core and the cord feed as I have found that this construction presents certain advantages in cam design and in compensating for backlash in the gears of the cord feeding units. In case the pneumatic tension subsequently to be described is employed, it is possible to combine the two shuttles, placing the cord feeding cam directly upon the upper surface of the core shuttle.

The core shuttle 240 is slidable in ways 241 in the main frame and has attached to the center of its bottom surface as by a stud 242 a cam roll 243. Near the ends of this shuttle are holes 244 into which pins associated with the core supports are adapted to be inserted to couple the core supports to the shuttle. Recesses 245, having pin-engaging shoulders 246, are also used at certain stages of the transfer operation in connection with these coupling pins, as will more fully appear in the description of the manner of operating the machine. Centrally of the shuttle there is a depression 247 upon which the cord feeding shuttle 248 slides. Strengthening ribs 249 give longitudinal stiffness to the core shuttle.

The cord feeding shuttle 248 moves generally in synchronism with the core shuttle in ways 241 in the main frame, but has a slight individual movement serving to maintain the cords taut at certain periods, as will more fully appear hereafter. It has bearing lugs 250 passing downwardly through longitudinal slots 251 in the core shuttle, attached to which, as by studs 252, are cam rolls 253 and 254 coacting with cam paths 255 and 256 respectively on cam drum 193. Two cam paths are provided in order to restrict the cam drum to a reasonable width approximately corresponding to the width necessary for the central cam path 257 with which the roll 243 of the core shuttle coacts. The cam paths 255 and 256 are located on opposite sides of the central path and each gives about half the travel of the cord feed shuttle. Plates 258, attached as by screws to the bottom of the lugs 250, may be used to maintain shuttle 248 always in contact with shuttle 240. The cam on the upper surface of the cord feeding shuttle will be described in detail in connection with the operation of the cord feeding units.

*Core supports.*

Journaled on pins 260 (Fig. 4) and lying in recesses 261 in the main frame 152 are longitudinal series of rollers 262, forming bearings for the under side of two core-supporting slides 263, one on either side of the central annular frame 151. The lateral edges of each slide run in ways formed jointly by shoulders 264 of the main frame and cap strips 265. The top of each slide is provided with a ball race adapted to hold a series of balls 266 engaging in a ball race in the bottom of a pedestal 267. A cap 268, secured to the slide as by studs 269, has a similar ball race positioning a second series of balls 270 engaging a ball race in the top of the lower portion of the pedestal 267. The pedestal is thus free to rotate but is restrained from tilting by the cap 268. The top of the pedestal is split at 271, and clamped together as by bolts to hold firmly a long hollow shaft 272. Free to rotate upon this shaft is a cam drum 273 formed with inwardly extending bearings 274. The drum is restrained from longitudinal movement in one direction by the contact of one of the bearings 274 with the top of the pedestal and in the other direction by the contact of the other bearing 274 (Fig. 72) with a collar 275 secured as by screws 276 to the tubular shaft 272.

The devices which directly support the core are made readily detachable from the remainder of the machine so that they may be replaced by similar parts to accommodate different styles of cores. These core supporting parts are arranged on a head 277, having an interior bearing fitting on the tubular shaft 272, and secured by bolts 278 to the cam drum 273 (see the core shown at the right in Fig. 66). Secured to the side of the web portion of head 277 by studs 279 having guiding grooves therein is a ring 280 having a plurality of cam slots 281 (Fig. 71). Fitting in bearings in the head 277 are core locking pins 282 (Fig. 69) having secured to their sides cam rolls 283 fitting in the cam slots 281. The outer end of each of these pins is formed to fit into a circumferential groove 284 in the inner periphery of the annular core to centralize the core and hold it firmly against axial motion. In the present case I have shown the cores as being of the segmental or collapsible type having the sections held assembled by binder rings 285 fitting over circumferential ribs on the core sections and drawn together by bolts 286. When this type of core is used it is convenient to utilize the head of one of the core bolts to secure the core against rotation on the head. For this purpose one or more lugs on the head 277 (see the right hand core in Fig. 66) may be provided, having recesses 287 to engage the heads of the bolts 286.

In order to rotate ring 280 to move the pins 282 outwardly or inwardly, a pinion 288 is secured to a flanged stud 289. A squared hole 290 in the stud permits the application of a suitably formed wrench to rotate the pinion and consequently ring 280, the cam slots 281 of which will move the pins 282. It will appear from the above description that after a core has been positioned upon the head 277, it may be quickly locked in place by rotating pinion 288, and equally readily unlocked by rotating the pinion in the reverse direction.

The bead flanges 129 (Fig. 72) referred to in considering the cores, are fastened in place by a pin 292 shown in perspective in Fig. 77. The end of this pin is squared as at 293 for receiving a suitable wrench, and has a lug 294 adapted to pass through an elongated hole in the core and then clamp the building flange in position when the pin is rotated. A wider lug 295 on the end of the pin adjacent the squared end serves to prevent the whole pin passing through the hole when it is being placed in position, and to clamp one of the building flanges in the same manner as lug 294 clamped the other. The inner surface of lug 295 may be formed as a cam so as to draw the building flanges against the core when the pin is rotated.

Core pedestal locks.

After a core has had a carcass completely built up upon it and the series of cords severed, it is preferably removed from the machine for the application of such covering material as may be desired and for vulcanization. In order to give as free access as possible to the mechanism for supporting the cores, the core supporting pedestals are arranged in the present embodiment of the machine so that they may be swung at right angles upon the ball bearings on the pedestal supports, as indicated by the position of the core at the left in Figs. 1 and 2.

Each core pedestal has at one side locking lugs 300 forming a locking recess between them. Upon the top of the core slide 263 at each end is a bracket 301 upon the top of which guide ways support for reciprocation towards and away from the pedestal a locking slide 303, the end of which is beveled to fit in the recess (Fig. 25). Journaled in bracket 301 is a shaft 304 having integral therewith a gear 305 and an eccentric pin 306. The pin engages a slot 307 in the locking slide (Fig. 2), and serves to move the slide back and forth in the guide ways when the gear 305 is rotated. Control of the rotation of this gear is obtained through a rack 308 sliding in bearings in bracket 301 and also in a standard 309 fixed to the core slide. This standard extends vertically a convenient distance and has journaled therein a sleeve 310. At the lower end of this sleeve is a gear 311 meshing with the rack 308 and at the upper end a handle 312. By swinging this handle the described train of mechanism is operated to move the locking slide into or out of engagement with the recess. In the drawings the parts have been shown so arranged that with handle 312 extending towards the center of the machine, the pedestal is locked against rotation, movement of the handle to an outwardly extending position releasing the pedestal so that it may be swung as shown at the left in Fig. 2 to permit of the removal of the core and the placing of a fresh core thereon.

Core slide lock.

The locking mechanism for coupling the core shuttle to either core slide for reciprocation are conveniently mounted in close association with that for holding the core pedestals against rotation in operative position, as the uncoupling of the slide from the shuttle and swinging of the pedestal to its angular position are in general performed at the same time. To the upper end of an inner sleeve 315 passing through the sleeve 310 of the pedestal locking means, is secured a handle 316, the locking and unlocking positions of which conveniently correspond to those of handle 312. At the bottom of this sleeve (Fig. 26) is secured a gear 317 meshing with a rack 318 sliding in the standard 309. To this rack is pivoted a link 319, coupled at its other end to an arm 320 (Fig. 27) on a rocking shaft 321 carrying segment gears 322. Pins 323, sliding in bearings in the core slide, are provided with gear teeth meshing with gears 322. By moving handle 316 the pins 323 can be moved to lower them into or raise them out of holes 244 or recesses 245 in the core shuttle (previously mentioned in connection with Fig. 11), thus connecting or disconnecting the shuttle to the slide.

Core slide racks.

I have also shown the machine as provided with means by which either core slide, when disconnected from the core shuttle, may be manually moved along its ways. This manual control is particularly useful in the transferring operations to be described later, and its functions in that connection will appear more fully when the general operation of the machine is considered. For operating this mechanism a shaft 325 (Fig. 25) passes through sleeves 315 and 310 and carries a handle 326 (Fig. 1) at its top end. A pinion 327 is secured to the lower end of the shaft. The shaft has a slight vertical motion, indicated by the dotted position of the handle in Fig. 1, which serves to bring the pinion into mesh with a rack 328 stationarily secured to the main frame. Normally the rack and pinion are out of mesh and do not interfere with the operation of the core shuttle. If the core shuttle is disconnected from the core slide and it is desired to shift the position of the slide, the handle 326 is raised, thus bringing the rack and pinion into mesh, and is then rotated to move the slide in the desired direction.

Core rotating cam.

Relative rotation between each core and the cord guide is obtained in the present machine by rotating the core during its reciprocation. Many mechanisms may be designed for this purpose, but the one which I have chosen for illustration comprises a cylindrical cam mounted to travel with the core, and a coacting stationary cam roll suitably supported on the frame. The cam is carried by the cam drum previously referred to, and is constructed with a plurality of cam tracks arranged with directing switches to cause the cam to travel over the cam roll (and the core to be rotated) intermittently in one general direction, with alternated briefer periods of rotation in the opposite direction. These interspersed periods of retrograde rotation are for the purpose of maintaining the cords in their proper angular positions during the taking up of the excess lengths of cords used for facilitating the application of bead anchorages, as fully pointed out above in the description of the method of building a tire carcass.

Cam drums 273 has attached to its cylindrical surface by any suitable means a plurality of cam straps 330 (Fig. 86) causing motion of the core in what may be called its normal direction, and a plurality of cam straps 331 causing rotation of the core in the retrograde direction. The cam is substantially symmetrical with respect to its median plane, as the travel of the core on each side of the circular cord guide is similar. Pivoted at 332 around the median plane of the drum are switches 333, pointing alternately in opposite directions. Each switch is normally spring pressed so that its point 334 lies against the adjacent cam strap 330 by a spring 335 attached to the heel 336 of the switch and to a pin 337 on the cam drum. Upon passage of the cam roll between the cam strap 330 and the point of a switch the latter rotates about its pivot 332 so that its point lies in a recess 338 in strap 331, returning to its normal position after the rotation of the cam has carried it past the cam roll. The path of the cam roll (remembering that the drum, not the roll, does the actual moving) is indicated by dash lines in Fig. 86. The nature of this path will appear more clearly after some of the attending mechanism is described and the general operation of the machine is being considered.

If it were not desired to swing a core out of the way after a tire carcass has been built upon it the cam roll could be permanently fixed to the frame. As it is more convenient, however, to shift the core in order to facilitate its removal from the machine rather than to remove it while it still is in axial alignment with the guide, the cam roll 339 in the present instance has been mounted so that it may be released from engagement with cam drum 273 to permit the core pedestal being swung at right angles to its normal position. The cam roll supporting mechanism for each core is carried on a bridge 340 which extends between the side frames 152. The top of this bridge (Fig. 21) is formed with ways 341 which guide a sliding carriage 342. Mounted to move vertically in this carriage is a slide 343 carrying at its top the cam roll 339, conveniently formed as a cup fitting freely upon a stud 344 secured to the slide. The lower portion of the slide is formed with a transverse bearing for an eccentric portion 345 of a shaft 346 journaled in the carriage and terminating in a handle 347. An arm 348 secured to the shaft 346 serves as a lock to hold the carriage in the position of Fig. 21, coacting with a slot 349 in the bridge for this purpose. Abutments 350 and 351 limit the sliding movement of the carriage in either direction.

In Fig. 21 the parts are shown in their positions holding the cam roll for engagement with the cam drum 273. The slide 343 upon which the cam roll is mounted is held elevated by eccentric 345, and the carriage is locked in position by the engagement of arm 348 with slot 349. To release the cam roll from the cam the handle 347 is swung roughly 180° from the position shown in full lines in Fig. 21, as indicated by dotted lines in Fig. 24. The cam is now disengaged and the core pedestal swung around at right angles. In order to remove the carriage 342 from a place where it might interfere with the operations upon the other core the carriage is preferably moved sideways of the machine upon guides 341 to the position indicated in full lines in Fig. 23. In this position the carriage can be locked by rotating the handle to its original position, bringing arm 348 over the end of the bridge; thus preventing accidental movement of the carriage to a position where it might interfere with the action of the remaining mechanism.

*Cord feeding units.*

Within the annular frame 151 are two sets of cord feeding units all delivering cords 360 to the circular guide 150. These units, which are shown as being eight in number, are supported mainly by the brackets 361 which serve to suspend the guide ring 150 within the annular frame and are arranged in staggered relation with half the units on one side and half on the other side of the center of the frame. The units are similar, and a description of one will suffice for all except as noted below.

Each unit has a stock spool 362 (Figs. 28 and 29) containing a sufficient number of cords to supply one eighth of the circumferential series, if eight units are used. This stock spool is detachably mounted between a freely rotatable stub shaft 363 and a shaft 364 the rotation of which is controlled as will be described. Shafts 363 and 364 are journaled in brackets 361, and have shoulders 365 preventing outward movement. Shaft 364 is held against inward movement by the driving parts to be described, while shaft 363 is held by a collar 366 secured to the end of the shaft by a screw. The inner end of each of shafts 363 and 364 has a central squared recess to receive the squared end 367 of the shaft of the stock spool, and a notch of the same width as the recess forming a passage into the recess from one side thereof and extending sufficiently back from the recess to provide a shoulder 368. Sliding over each of shafts 363 and 364 (Fig. 34) is a ring 369 having a projection 370 extending inwardly. When this ring is in the full line position of Fig. 32 the projection 370 forms the fourth side of the recess and thus holds in position the squared shaft 367. If the ring is moved to the dotted line position of that figure the projection 370 will be received over shoulder 368 and the central recess left with one open side through which the shaft 367 can be moved. This construction permits the ready removal and replenishment of the stock spool, it only being necessary to slide rings 369 axially a slight distance in order to lock or unlock the stock spool in place. A set screw 371 serves to hold the rings in position.

From the stock spool the cords pass around an idler roll 372, around a feed roller 373 which is preferably covered with friction material to give a grip on the cords, and from the feed roller to the annular guide 150. It is usually desirable to wind the cords tightly upon the stock roll between layers of a liner 374 such as Holland cloth in order to prevent sticking of the cords to each other and to prevent the cords of one layer getting between the cords of an adjacent layer. This liner 374 is wound upon a liner roll 375 detachably secured to stub shafts in the same manner as in the case of the stock roll. The driving means for these various rolls will now be described.

Journaled in a bracket on annular frame 151 are a spur gear 376 and a bevel gear 377 secured to each other for rotation together. The spur gear 376 meshes with an internal gear 378 which serves as the driving means for all the cord feeding units and is itself driven in a manner to be described later. Bevel gear 377 meshes with a second bevel gear 379 fast to one end of a short shaft 380 journaled in a bracket 381 attached to bracket 361. On the other end of the shaft 380 is secured a spur gear 382. This latter gear serves as a driving gear for an adjustable train serving to vary the operation of the cord feed to accommodate different sizes of tires or different degrees of tension. Journaled upon shaft 380 is a swinging arm 383. The end of this arm is slotted at 384 and may be held in any adjusted position by a stud 385 secured to bracket 361. Journaled on shafts mounted on this arm are gears 386 and 387, preferably held by nuts so that they can readily be replaced by gears of other sizes. Secured to the shaft of gear 387 is the hub 388 of a roller ratchet of a usual type, another one of which is illustrated in Fig. 33 and later described, serving to couple the gear 387 in one direction of rotation to a gear 389 forming the outer part of the ratchet, but disconnecting them in the other direction. Meshing with gear 389 is a pinion 390 on the shaft of the feed roller 373.

By this train of mechanism the feed roller is positively rotated during the operation of drawing cords back into the feeding unit, but rotates without interference from its driving mechanism when the cords are being drawn out by the motion of the core.

The stock spool 362 upon which the cords are supplied to the machine is positively driven by feed roll 373 through a friction connection during the drawing back operation, and permitted to turn freely during the paying out of the cords although under the influence of a brake to be described. A gear 392 on the end of the shaft of feed roll 373 remote from gear 390 meshes with a gear 393 forming the outer part of a ratchet illustrated in Fig. 33. The inner part 394 of the ratchet has in its outer periphery a series of wedge shaped slots 395 in which lie rollers 396. Springs 397, seated in holes in the part 394, press the rollers at all times up the inclined parts of the recesses. When gear 393 is rotated in the direction of the arrow in Fig. 33, that is, during the operation of drawing back the cords into the feed unit, the rollers will become wedged between the gear and the inner part of the ratchet, firmly coupling the two for rotation together. Plates 398 fastened to the gear as by screws 399 serve to maintain the gear in alignment with the inner part of the ratchet and to keep the rollers 396 from falling out.

The part 394 turns freely upon the shaft 364 unless coupled thereto by a friction mechanism now to be described. The reason for the provision of this slipping connection is that, while the drive of the stock spool is through its central shaft, the diameter of the outer layer of cords wound thereon will constantly decrease as cords are withdrawn from it. The relation of the feed of the cords to the rotation of shaft 364 is therefore a variable, best compensated for by driving the spool through a friction tension so that no matter what the diameter of the stock wound upon the spool, the cords will always be maintained under tension. Keyed to shaft 364 at either side of parts 394 are friction-surfaced disks 400. A hand wheel 401, screwed upon the end of the shaft, bears against a plate 402 preferably keyed to the shaft so that it will rotate with disks 400, and holding between it and the adjacent disk a series of springs 403. By turning the hand wheel the amount of tension imparted to the cords during their drawing back may be regulated.

Pivoted on a shaft 405 secured in brackets 406 on the annular frame 151 are arms 407 carrying at their ends journals 408 for the shaft 409 of a friction-faced brake roller 410. A spring 411 secured to shaft 405 at one end and to one of arms 407 at the other, presses the roller yieldably against the surface of the stock spool. Fastened to one journal 408 as by a screw 412 is the outer part 413 of a roller ratchet similar in general operation to that shown in Fig. 33, the inner part being secured to shaft 409. The action of this ratchet is to maintain the roller 410 stationary when cords are being drawn off the stock spool, whereby a drag or braking action serving to keep the cords taut is exerted on the spool, and yet to permit the spool to be rotated freely during the winding up of the cords. The brakes on the lower units are mounted on the annular guide ring 150 rather than on the frame 151 in order to avoid interference with other parts, as will appear from Figs. 1 and 3, but this in no wise changes their method of operation.

The liner roll 375 upon which the liner delivered from the stock spool is wound up, is driven so as to keep the liner taut during the operations of feeding out and drawing back the cords. This mechanism is the same in all but one of the units, that unit being slightly varied from the standard for reasons which will appear. The standard form will be considered first. Upon the shaft of feed roll 373 is secured a gear 415 meshing with a gear 416 loose upon an idler shaft 417. Keyed to the shaft upon either side of the gear (Fig. 36) are friction-faced disks 418 which may be pressed together by turning a nut 419 connected to the adjacent disk by a spring 420. A lock nut 421 holds the parts in adjusted position. This slip coupling serves to compensate for the varying diameter of the liner spool as the liner is wound thereon. Upon shaft 417 is keyed a sprocket 422 connected by a chain 423 with a sprocket 424 connected to the shaft of the liner roll 375 by a roller ratchet 425 similar to those already described. This ratchet functions to couple the liner roll to the feed roll while the cords are being paid out (this being the time when the liner is being wound up) and to disconnect it for free rotation while the cords and liner are being wound upon the stock spool. Chain 423 passes over an adjustable tightener indicated at 426. In the case of the cord feeding unit illustrated at the left in Fig. 3, the liner is wound upon its roll in the reverse direction as indicated in dotted lines in Fig. 35 in order to make room for a gear later to be described, and to give the liner roll the necessary reversal of direction gears 415 and 416 are in this instance replaced by a chain and sprockets. Obviously this change could be made in all instances if desired.

This mechanism functions to pay out and draw back cords, controlled during the paying out by the motion of the core and during the drawing back by the rotation of annular gear 378. The means for rotating this gear in controlled relation to the movement of the core, and the devices provided for disconnecting the gear from its driving means during certain building operations will now be considered.

*Cord feed driving means.*

The annular gear 378 is mounted on rollers 430 within an annular recess formed by rings 431 and 432. These rings have shoulders guided upon rollers 433 running upon bearings formed by the frame 151. Rings 431 and 432 are connected together by screws 434. To gear 378 is secured by rivets 435 a ring gear 436, having teeth on its inner periphery (Fig. 37). Ring 431 is formed with a plurality of slots in which slide keys 437, provided with grooves 438 serving to hold a ring gear 439 having teeth on its outer periphery adapted to engage the teeth on gear 436. Having slots 440 in which fit bolts 441 secured to ring 431 is a clutch operating gear 442, having an inturned portion 443 underlying the keys 437 and provided with a plurality of cam grooves 444. In these cam grooves fit cam rollers 445, secured to the keys by screws 446. In order to rotate gear 442 a pinion 447 is journaled on a shaft 448 conveniently situated on the frame and having a slight endwise movement in its journal 449. This pinion is shown in Fig. 29 as in a position out of mesh with gear 442, but it will be clear that upon moving the pinion endwise it can be brought into mesh, it then being possible to rotate the gear by turning the handle 450 attached to the shaft of the pinion.

By rotating gear 442 as above described, the keys 437 are shifted to carry gear 439 into or out of mesh with gear 436, and hence to lock the annular gear 378 to ring 431 or unlock it therefrom. Ring 431 carries rolls 451 engaging a cam on shuttle 248 whereby it is rotated intermittently during the reciprocation of the shuttle cam. Uncoupling the gear from the ring by this clutch mechanism therefore results in rendering the cord feeding units temporarily inoperative whether the core is reciprocating or not. This is useful during certain of the operations of changing from the building of one tire to that of another, as will appear below.

The cam rolls 451 are arranged at intervals around the periphery of rings 431 (Fig. 3) so that as one of them leaves the range of the shuttle cam a succeeding one will have come into place. This is indicated by the position of the rolls in Fig. 87, the exact nature of the cam path being, however, better left for consideration in connection with the general operation of the machine. It will suffice here to state that the general effect upon ring 431 is to advance it in one general direction intermittently, with intervening periods of rotation in the opposite direction. This causes the cords to be paid out of the cord feeding units and drawn back into it at intervals, the amount paid out being always greater than that drawn back so as to furnish the necessary material for building the carcass.

*Cord guide.*

After the cords leave the feeding roll 373 they pass to the circular guide 150 which serves to direct them to the core. This guide is carried by a ring 455 secured to the brackets 361 in any suitable manner. To this ring is secured by bolts 456 a second ring 457 forming the body of the guide. The guide ring is thus made interchangeable for tires of different sizes. To this second ring are secured by bolts 458 side pieces 459 which, alternately on one side and the other of the ring 457, present spaces 460 (Fig. 35) which serve to permit the passage of the cords from the feeding units to the core. The staggered arrangement of these spaces is due to the similar staggered arrangement of the cord feeding units from space-saving reasons. In order to reduce the friction of the cords on this guide as much as possible the surfaces in contact with the cords may be made of polished metal or maple wood, or anti-friction rollers at the inner and outer sides of the spaces, may be used. If the latter construction is adopted a convenient manner of assembling the rollers is that illustrated in Figs. 41 and 42. In these views the side rings 459 have been shown as provided with corner grooves 461 in which lie rollers 462 preferably having their end faces curved so that they can lie closely adjacent each other and yet conform to the curve of the guide. The edges of the grooves preferably overhang the rollers somewhat to hold them in position, the rollers being inserted in the grooves through the space afforded by the removal of a plate 463 attached to the side pieces 459 by screws 464. To further hold the rollers in place they may, if desired, be strung upon a wire passing through holes 465 in the rollers.

If cords of a small diameter are used it is generally desirable, in order to reduce as far as possible the number of strands to be handled, to unite several cords into a flat band as previously pointed out. It is the flat band form of cord that has been illustrated in connection with the cord guide, but it will be understood that the description of the present apparatus, irrespective of the turning of the flat band to keep it in proper position, is equally applicable to round or other shaped cords.

To preserve the cords in their proper spaced relation, and in the case of flat bands to guide them so that they will lie flat upon the guide, they are passed after leaving feeding roll 373 through a comb composed in the present instance of a plurality of radially arranged rollers 466. These combs are staggered in the same manner as the feeding units. Each comb has a body piece 467 (Fig. 28) attached by screws 468 to the side piece 459 of the guide, a top piece 469 secured in any suitable way at its ends to the body piece, and the rollers 466 spaced between the two. A convenient way of holding the rollers is by passing pins axially through them and pieces 467 and 469.

From the combs the cords pass to the outer rolls 462 of the circular guide (Fig. 41) and thence through the guide to the inner rollers. It will be noted from Figs. 29 and 35 that the two sets of inner rollers are relatively close together and form between them a guiding aperture, so that as indicated in the various diagrammatic views, the cords may extend from the guide to the core in either direction as required by the core's position, being guided with a minimum of friction in any position. In the case of flat bands the described arrangement of the guide serves to hold the band at the guide with its greatest width paralleled to the plane of the core, a point of importance in the building of tire carcasses of flat cords in which the cords are to be reversely folded around bead anchorages as referred to above in the description of the method.

I prefer to provide an additional guiding and spacing device for the cords after they leave the annular guide; and have found it desirable, in order to insure a better laying of the cords upon the core, that this device should have a limited motion of rotation as the angle of the cords from the guide to the core changes. In the present instance this guiding device is shown as an annular grid or reed composed of wires 470 extending between holes in opposed rings 471, the latter having grooves 472 into which the ends of the wires project and are firmly held by solder. Rings 471 are supported in grooved rollers 473 (Figs. 28, 29, and 30) held in position upon side pieces 459 by screws 474 and spacing collars 475. By this support the reed is free to rotate as impelled by the motion of the cords. In order to prevent over-travel of the reed, with consequent displacement of the cords on the core out of their true position, a stop plate 476, having an aperture 477 straddling one of the rollers 473, is secured to one of rings 459, and serves to limit motion of the reed in either direction beyond a certain fixed amount.

Constricting means.

It was stated in the description of the method that it was preferable to employ some constricting devices to shift the minimum circumference of the cord defined surface nearer to the core, or to draw the cords down to the bead line of the core in case the manner in which the cords are laid does not produce a surface having a sufficiently small diameter. The constricting devices which I preferably employ will now be described. These devices are in duplicate, one on each side of the central frame 151, the two devices being adapted for operation upon opposite sides of each core during the building of a tire carcass. A description of one will suffice for both.

Each device comprises a series of wires numbered from 500 to 507 (Fig. 45, Sheet 10), arranged to function in a similar manner to an iris diaphragm. One end of each wire is connected to a ring 508 and the other end to a ring 509 spaced axially from the first. If the rings are rotated in opposite directions so as to separate the ends of the wires along the circumference of the rings there will be a tendency to straighten the wires and therefore to draw their middle portions closer to the axis of the rings. This motion is resisted by the circumferential series of cords upon which the constricting means acts, and the result is that the wires individually change their shape from one similar to the position in Fig. 46 (representing the constricting means in its expanded or inactive position) to one similar to the position of Fig. 47. The effect upon the whole series of wires will be to cause the area enclosed within them to decrease from that of an approximate circle such as shown in dotted lines in Fig. 45 to that of an approximate circle such as indicated in full lines. This serves to positively constrict the series of cords to the diameter desired with a force dependent upon the power used in rotating the rings, and with a minimum tendency to displace the cords from their correct relation.

The wires may be formed as shown in Fig. 48, with a plurality of small rollers 510 strung upon their central portions (the restriction of the rollers to the central portion of each wire being conveniently accomplished by soldering or otherwise securing extra end rollers to the wire) so as to reduce any friction between the wires and the series of cords. The ends of the wires may be looped as at 511 and held by a ferrule 512 assisted by soldering or brazing. A convenient manner of securing the ends of the wire to the operating rings is indicated in Figs. 49 and 50. The wires preferably lie in mating grooves 513 in the two rings so that when the constricting means is in its expanded position the greater part of each wire will be received by the grooves and the wire will lie out of harm's way. A screw 514 passing through a grommet 515 secured to the loop in the end of the wire passes loosely through a hole 516 in the ring and is threaded into a plug 517 fitting loosely in a recess in the ring. By this construction the screw will not become loosened due to the slight rotative movement given to it by the wires in their operation.

The two rings 508 and 509 are supported by rollers 520 rotatably mounted on studs 521, (Fig. 53) secured to a carrying ring 522. The rollers have flanges 523 on their outer sides to maintain the rings in position, and are themselves held in position on the studs by being located between spacing collars 524 and the heads 525 of the studs. The rings 508 and 509 are thus free to rotate individually with respect to the carrying ring 522. The carrying ring itself has enlarged portions 526 (Fig. 45) to which are secured brackets 527 having suitable journals enclosing rods 528 secured to the annular frame 151. Suitable ball or roller bearings may be provided between the rods 528 and the brackets 527 but these have not been shown as they could be provided by any skilled mechanic if desired. Flanged nuts 529 on the ends of rods 528 serve to limit motion of the brackets, and a thumb screw 530 may be provided on one or more of the journals to hold the carrying ring in adjusted position on the rods 528.

The mechanism for constricting the wires upon the cord surface comprises weights for rotating the rings 508 and 509 in opposite directions, and power operated means for raising the weights and rotating the rings back to their original positions. In order to connect the rings to this mechanism, four cables 531, 532, 533, and 534 are secured to the rings, lying in grooves 535 in their outer peripheries. The arrangement of these wires has been shown diagrammatically in Fig. 43. Cables 531 and 532 are attached respectively to rings 508 and 509, but extend in opposite directions around the peripheries of the rings so that as the wires are pulled the rings will be rotated in opposite directions. These cables pass around sheaves 536 and 537 located adjacent the rings in a swinging housing 538 (Fig. 51), pass around sheaves 539 located adjacent the pivot of the housing, and are attached to a weight 540 which constantly draws the cables in a direction to close the wires in upon the series of cords. By applying the closing-in force in the form of a weight, the tension imparted to the cords can be regulated, and will be uniform irrespective of the circumference to which the cords are constricted. To oppose the weight when the constricting means is in its outward or inactive position, and to raise the weight and move the constricting means back from its constricted to its inactive position, cables 533 and 534 are attached to the rings in a similar manner to cables 531 and 532. The two sets of cables, however, extend around the rings in opposite directions, so that their action is in opposition to each other. The second set of cables, 533 and 534, pass around the sheaves 541 and 542 respectively, located adjacent the rings, and sheaves 543 adjacent the pivot of housing 538. From the latter pair of sheaves the cables extend over sheaves 544 and are attached in any suitable way to drums 545 rotatable on a shaft 546 (Fig. 54), but controlled by mechanism which will be described. The location of the housing 538 and the various cables are different in the two constricting means, as indicated in Fig. 3, but they are otherwise similar.

The swinging housing 538 (Fig. 51) previously referred to extends through a slot 547 in the annular frame 151, and has at the end remote from the constricting wires a depending cylindrical bearing 548 free to turn in a bracket 549 secured to the frame. To hold the bearing against endwise movement a screw 550 is fitted in the bearing and holds a collar 551 overlapping the bracket 549. The inner end of the housing has bearing surfaces 552 which engage coacting surfaces on lugs 553 attached to the adjacent enlarged portion 526 of the carrying ring 522. The tension of the cables will keep the inner end of the housing in the proper relation to the rings 508 and 509, and the bearing surfaces 552 act substantially as a pivot but with greater flexibility.

*Clutch for constricting means.*

Shaft 546 (Figs. 4 and 54) is journaled in brackets 555 attached to the frame, and carries at one end a sprocket 556 connected by a chain 557 to a sprocket on a short shaft 558. This latter shaft is journaled in bearings on cross-pieces 559 of the frame, and is geared at 560 to a second shaft 561 also journaled in bearings on the cross-pieces. A motor 236 (Fig. 78) is secured to the under side of the cross-pieces 559 and carries a sprocket 562 connected by a chain 563 with a sprocket 564 on shaft 561. By this means the shaft 546 will be constantly rotated as long as the motor 236 is in operation, as it conveniently is during the operation of the machine.

Drums 545 and the clutch parts associated with them are similar so that a description of one will suffice for both. Each drum has a radial bore 565 (Fig. 60) in which slides a clutch dog 566 (see also Figs. 61 and 62) having its inner end squared off on three sides at 567. The dog is pressed inwardly by a spring 568 positioned in a hole 569 in the end of the dog and bearing against a cap 570 held in place as by screws 571 (Fig. 54). To guide the dog and present its squared end always in proper relation to the cooperating parts, a pin 572 is secured to the side of the dog and runs in a radial groove in the side of the bore. The dog is held in the inactive position of the clutch by a pin 573 guided in a longitudinal hole in the drum, and fitting in a shallow hole 574 in the side of the dog. This pin is normally pressed towards the dog by a spring 575 secured to the drum and bearing against a shoulder on the pin. The end of the pin remote from the dog is formed with a head 576 with which overhanging flanges 577 of a yoke 578 are adapted to engage. Movement of this yoke towards the left in Figs. 54 or 60 will withdraw pin 573 from the hole 574 and permit its spring to press the dog 566 radially inwardly.

As the dog is pressed inwardly it comes within the range of a driving sleeve 580, and also a disengaging cam 581 carried on the side of a bracket 582 illustrated separately in Fig. 58. The driving sleeve 580 is keyed to shaft 546, and possesses at each end for engagement with the clutch mechanism a ratchet-like portion having driving shoulders adapted to engage the squared surface 567 of the clutch dog. While the sleeve and dog are thus in engagement the drum 545 will be rotated, winding the cables 533 and 534 upon its surface in the guiding grooves provided. After the drum has been rotated by the shaft sufficiently to raise the weights and draw the wires forming the constricting means into their outer or inactive positions, the shoulder 583 adjacent the squared end of the clutch dog rides upon the disengaging cam 581, which raises it out of engagement with driving sleeve 580, and into position so that spring 575 once more projects pin 573 into the hole.

To hold the drum in this latter position, with the weights raised and the constricting wires in their outer or inactive positions, a pawl 585 (Fig. 57) having a holding face 586 and a beveled back face 587, contacts with a projection 588 on one side of the drum 545. This projection has a shoulder 589 on one side adapted to engage with the holding face 586 of the pawl, and with a beveled surface 590 with which the beveled face 587 of the pawl may contact, thus permitting the drum to rotate freely in one direction, but holding it in a definite position when it starts to rotate in the other. Pawl 585 has two motions away from the drum, a yielding motion to permit the beveled surfaces to slide over each other, and a positive motion to draw the pawl out of engagement and permit the drum to rotate. For these purposes the pawl is provided with a reduced portion 591 slidable in a sleeve 592, which in turn is slidable in a bracket 593 secured to the frame. The pawl is held in constant angular position, and at the same time permitted a slight axial motion relative to the sleeve, by a pin 594 secured in the reduced portion of the pawl and passing through slots 595 and 596 in the sleeve and bracket respectively. Sleeve 592 is connected by a coupling 597 to an offset rod 598 having sliding bearing in a bracket 599 secured to the frame. A collar 600 on the rod confines between itself and bracket 599 a spring 601, which functions to urge the rod constantly into position to hold the pawl 585 in its active position. At the end of rod 598 is a collar 602, against which the forked end of a lever 603 is adapted to bear. The lever is secured to a vertical shaft 604 journaled in bearings in the frame, and carrying at its upper end a lever 605, connected by a link 606 with a depending rocking arm 607 on a shaft 608. By a handle 609 on this latter shaft the shaft can be rotated in the direction of the arrow in Fig. 54 to draw the pawl 585 out of engagement with the shoulder 589. A stationary stop 610 cooperates with the shoulder 589 to prevent rotation of the drum past a point corresponding to the minimum diameter to which the constricting wires will be moved.

The yoke 578 is arranged to be moved a short distance to the right or left in Fig. 54 in order to engage one or the other of pins 573. For this purpose the yoke is mounted (Figs. 55 and 59) on a bar 611 slidable in guides 612 secured to the I-beam 153 which forms part of the main frame. Mechanism is preferably provided for accurately maintaining the yoke in its central position, and therefore out of engagement with the head of either pin 573, except when it is shifted by the operator to withdraw one of the pins from locking engagement with its clutch dog. The mechanism provided in the present instance utilizes the action of helical springs for returning the bar 611 to its central position after it has been displaced in either direction, and includes devices for rendering each spring inoperative after it has drawn the bar to central position, to thus more accurately position the parts. One spring 613 is attached at one end to one of the stationary guides, and at the other end to a screw on a short slide 614 having a slot 615 engaging a screw 616 secured to a stationary part of the machine. Slide 614 may conveniently be guided by a pin (not shown) secured to the slide and working in a hole formed in the end of the bar. A second spring 617 is also attached to the guide at one end, its other end being attached to a slide 618 similar to slide 614, and having a slot 619 engaging a screw 620 secured to a stationary part of the machine. This second slide is guided by a pin (not shown) working in a hole in a block 621 attached to the bar 611 as by screw 622.

The operation of this centering mechanism is as follows. Assuming the bar to be displaced toward the right in Fig. 59, the end of the bar will push the block 614 with it, such motion being permitted by slot 615. Spring 613 will consequently be tensioned, as it is secured at one end to the stationary guide 612 and at the other end to the moving block 614. During this movement the block 621 will move away from slide 618, motion of the latter being prevented by the end of slot 619 bearing against the screw 620. Consequently spring 617, being connected between stationary guide 612 and stationary slide 618, which is at this time not connected for movement with the bar, will not exert any force on the bar whatever. If now the displacing force on the bar be removed, the only force acting will be spring 613. This spring will act to shift the bar towards its central position until the end of slot 615 contacts with screw 616. This at once cuts off all force of the spring from the bar in the same manner as described in case of spring 617 above. The action in case the displacement of the bar is to the left instead of to the right is the same, except that the function of the springs is interchanged, spring 613 remaining idle while spring 617 exerts a centralizing force.

In order to shift the bar a rocking shaft 623 has fixed thereto an arm 624 which is forked as at 625 to enclose a pin 626 on the bar. The shaft is journaled in bearings 627 and 628 and carries oppositely extending arms 629 carrying at their ends foot treadles 630 extending upwardly to a position to be moved by the operator.

*Operation of constricting means.*

The operation of this clutch mechanism will now be described, starting with the constricting wires held in their outer or inactive position. The weights at this time are held raised. This state of the parts is illustrated in Fig. 65 and by the left-hand drum in Fig. 54. The shoulder 583 of the clutch dog is supported on the disengaging cam 581, and pin 573 is in the hole in the dog. If handle 609 is now momentarily turned so as to withdraw pawl 585 from engagement with the shoulder 589 on the drum, the drum will be released from all restraining force acting against the constant pull exerted by the weight on rings 508 and 509 tending to rotate them in opposite directions. Prior to the withdrawal of pawl 585 this tendency was resisted by the cables 533 and 534, attached to the then stationary drum 545. As this resisting force is removed by withdrawing the pawl the weight rotates the rings in opposite directions, causing the wires to be drawn in upon the series of cords as indicated in full lines in Fig. 45. This constriction will continue until the resistance of the cords overcomes the force of the weight, or until the shoulder 589 contacts with the stationary stop 610 as shown in Fig. 63. The cords will be held thus constricted under the tension caused by the weight while the operations are performed, such as placing an annular anchorage around the series of cords. When this operation is completed, the operator steps on the treadle 630 on the side of the machine adjacent the constricting means being used. This shifts the yoke 578 and withdraws pin 573 from the hole in the clutch dog, permitting spring 569 to force the dog inwardly so as to engage the driving sleeve 580 (Fig. 64). The rotation of the sleeve will carry the drum in the direction of the arrow in Fig. 64, winding up cables 533 and 534 on the drum and rotating the rings 508 and 509 so as to shift the constricting wires outwardly and, through cables 531 and 532, to raise weight 540. As the drum nears the position of Fig. 65, the pawl 585, the beveled side of which has ridden up the sloping surface 590 of the projection 588, drops over the shoulder 589. At approximately the same time the shoulder 583 of the clutch dog rides up on the inclined surface of the stationary disengaging cam 581, drawing the dog out of engagement with the driving sleeve and into a position where the pin 573 will be pressed by spring 575 into the hole in the dog. The pin has at this time passed beyond the range of yoke 578, so that no difference in operation will result whether or not treadle 630 has been released. This leaves the parts with the wires out of the way in grooves 513, and with the clutch mechanism held by pawl 585 until it is again desired to close the wires in upon the cords. The operation of either constricting means is the same except that the handle 609 and treadle 630 adjacent the means being used is employed.

*Automatic trip.*

In dotted lines in Figs. 4, 27, and 54 has been shown an automatic trip operating to release the constricting means upon the series of cords at the proper time without necessity of the operator swinging handles 609. Return of the constricting means to inoperative position is accomplished in the usual manner by depressing treadles 630. As pointed out in the description of the method, the constricting means is applied at the point of maximum separation of the core and guide (Fig. 95) and remains in engagement with the cords while the core is moved back towards the guide a distance sufficient to produce the necessary constriction. The automatic mechanism now to be described comprises a trip carried by the core slide and coacting with devices associated with the clutch mechanism of Fig. 54 to release dogs 585 from their respective drums when the core reaches the position of either Fig. 95 or Fig. 104. It will be understood that each core support carries a trip, and that each of these trips operates in the two extreme positions of its core. The main half revolution clutch is conveniently arranged in this instance to stop the machine in the positions of Figs. 98 and 105, this result being attained by varying the angular relation of clutch drum 195 to cam drum 193.

The trip mechanism comprises a shaft 635 extending longitudinally of the machine and having lugs 636 thereon cooperating with the couplings 597 of the two clutch mechanisms. If the shaft be moved to the right in Figs. 4 and 54, the pawl 585 of the right hand clutch will be released; if to the left, the left hand pawl will be released. Attached to each core slide 263 is a forked trip arm 637, each trip coacting with a collar 638 at the outer and a collar 639 at the inner end of the travel of the trip arm (Fig. 27). As the core slide reaches the end of its travel in either direction, the trip arm will contact with one of the collars, causing tripping of the appropriate constricting device in the same manner as if the operator had swung one of the handles 609. When either of the cores is not in use, it is positioned slightly within its outer limit of motion, so that its trip arm will not interfere with the collar 638. This automatic feature is optional, and equivalent functional results can be obtained by operating the constricting device controls by hand.

Pneumatic tension.

In the description of the method of building a tire carcass, it was pointed out that upon the removal of the constricting means after an anchorage has been positioned around the series of cords there is a tending to slackness in the cords. As stated, this results from the constriction of the cord defined surface to a circumference smaller than that of the anchorage. In the passage of the core through the circular guide the cords are paid out or drawn back through the circular guide in harmony with the change in length of the cords between the cord and guide caused by the travel of the core. At the time when the constricting wires are removed from the cords, however, it becomes desirable in order to keep the cords taut, that the cords be dealt with in a manner correcting this momentary departure from the harmony between the cord feed and the core travel. One manner of accomplishing this result is by the design of the cord feeding shuttle cam and the cam paths 255, 256, and 257 on the cam drum 193 which control the travel of the cord feeding shuttle and the core shuttle respectively. By this means the cords may be tensioned after the constricting means is removed and before the core starts its travel, but during the period when the constricting means is in the process of being removed there will be a temporary slackness in the cords. It would be possible to cause the cord feeding shuttle to have a short movement during the removal of the constricting means so as to maintain the cords taut, but I have found that a yielding tension rather than a positive cord feed is desirable at this point.

The pneumatic tension device now to be described is brought into operation while the core and guide are in the position of Fig. 98 and before the treadle 630 is depressed to remove the constricting means from the cord surface. It accomplishes both the purposes of maintaining the tautness of the cords during the removal of the constricting means and of keeping the cords under a yielding tension during the travel of the core. In the present embodiment it is constructed to act by rotating the core relative to the guide, thereby increasing the length of path of the cords between the core and guide.

The specific mechanism shown for accomplishing these results is constructed as follows. Within the rear end of cam drum 273 (Figs. 17 and 20) is secured, as by screws 650, a ring 651 bearing at intervals around its circumference a plurality of cam rolls 652. To pedestal 267 is fastened a bracket 653 formed with an air cylinder 654. Sliding in this cylinder is a piston formed in sections 655 and 656 holding between them suitable packing 657 and secured by a nut 658 to the end of a piston rod 659. This rod passes through the bracket 653 and into the interior of pedestal 267, at which point it has secured to it a cam bar 660 having its end formed as at 661 (Fig. 20) to bear against the cam rolls 652. A bracket 662 secured at 663 to the split top of the pedestal, serves to provide side bearing for the cam bar and maintain it in proper postion. The head 664 of the air cylinder is secured at 665 to the cylinder and is supported by a bracket 666 secured to a bracket 667 (Fig. 1) on the pedestal 267. A hole 668 passes through the head and connects to a pipe 669 having a three-way valve 670 (Fig. 2) of usual construction by which compressed air may be admitted to the cylinder from a main pipe 671, or exhausted therefrom.

If compresed air is admitted to the cylinder 654, the cam bar will be forced in the direction of the arrow placed upon it in Fig. 20, the end 661 of the cam bar being thus forced against whichever one of the rolls is in front of it. The pressure thus brought to bear will rotate the cam drum 273, and consequently the core, in the direction of the arrow at the right of Fig. 20. This turns the core in a direction to tighten the cords, the tension so imparted being yielding and steady during the removal of the constricting means.

Centering devices.

The cords being arranged in a balanced circumferential series, and the tension under which they are maintained being uniform, it follows that the anchorage will be centered with substantial accuracy by the cords themselves. In general it may be said that this centering action will be sufficient without the provision of any special apparatus for the purpose. In the drawings I have nevertheless shown devices arranged to underlie the anchorages in their position adjacent the building supports and insure that the anchorages as positioned by the tension of the cords will lie concentrically with the core. In the operation of transferring the cords from a built-up carcass to a fresh core, other mechanism to be later described is positioned close to those building flanges 129 between the cores, and it is for this reason desirable to mount the centering devices on that side of each core so that it can be moved, preferably automatically, out of interference with this mechanism as it is brought into operation. The centering device on the side of each core remote from the transfer mechanism is conveniently formed as a simple ledge 675 (Fig. 72) secured as by rivets to the inside of the building flange. The movable device on the other side of each core is somewhat more complex, and will now be considered.

Slidable in the hollow shaft 272 upon which each core rotating cam drum 273 is mounted, is a sleeve 676 secured at its forward end as by a set screw 677 to a disk 678 (Fig. 72). The other end of this sleeve passes through a slide 679 (Fig. 17) running in ways 680 in the bracket 667, and is secured thereto by split collars 681 and 682. Attached as by screws 683 to the outer periphery of disk 678 are slides 684 four in number as shown, mounted in ways 685 in the cam drum 273. These slides have ways 686 (Fig. 73) in their outer surfaces in which outer slides 687 may travel a distance limited by screws 688 secured to the inner slides 684 and lying in slots 689 in the outer slides. In the embodiment shown it is the outer slides, forming part of the transfer mechanism, by which the slides 684 are moved, and a description of their coaction may well be postponed until the transfer mechanism is taken up in detail. It will suffice at the present time to state that the apparatus is so arranged that the inner slides 684 will be moved a relatively short distance sufficient to position the centering rings 690 associated therewith either under the building flange as in Fig. 66 or in projecting relation as in Fig. 72.

The centering ring 690 preferably has a tapered surface 691 to facilitate the positioning of the bead anchorages thereon, and owing to the slight rotative movement imparted to the cords during the shifting of a bead anchorage adjacent the building flange, the latter may be mounted so as to permit it to rotate with the cords. Although this rotation of the centering ring is not necessary, it has been shown in the drawings to indicate a desirable refinement of this feature of the invention. As shown, the ring 690 is mounted on ball bearings on the outer periphery of an annular plate 692 provided with inwardly extending lugs 693 engaging slots in one side of each slide 684 (Fig. 70). The disk 678 into which the slides 684 are set is cut away at 694 to afford space for these lugs, so that if the plate is rotated slightly to free the lugs from their slots it may be removed bodily, carrying with it the centering ring 690. Attached to the plate adjacent one of the lugs 693 is a block 695 in which is mounted a pin 696 normally pressed toward the inner periphery of the plate by a spring. The inner end of this pin seats in a hole in the slide 684 from which it may be withdrawn by a handle 697. By this means the centering ring 690 may be held in position during the operation of the machine and yet removed readily when it is desired to remove a core after the carcass thereon has been built up.

Transfer mechanism.

The mechanism now to be described functions to hold the series of cords in place for cutting, and to turn back the cut ends of the cords after the severing operation is completed. The mechanism for severing the cords will be considered elsewhere. The holding and folding devices have been sketchily referred to and conventionally illustrated in describing the method of transferring, reference being made in that description to clamping rings 136 and inflatable annular bags 138. The construction and mounting of these parts will now be considered in more detail.

Passing through the hollow shaft 272 and the sleeve 676 of each core head is a shaft 700 carrying at its inner end a disk 701. The manner of securing these disks to the shaft has been varied in the two cases on account of the knife mechanism being associated with only one of the cores but this difference does not affect the functioning of the transfer devices. The core shown at the right on Fig. 66 (that one with which the knife mechanism is associated) has keyed to a reduced portion of its shaft 700 a hub 702 shouldered as shown to receive the disk 701 and permit of rotation of the shaft relative to the disk. A ring 703 is screwed to the hub and restrains the disk against lateral movement. A rotative mounting of substantially this character is necessary in the case of this core head, as the shaft 700 rotates during the cutting operation as will be described, while the disk 701 is so secured to other parts as to rotate only with cam drum 273. In the case of the core head at the left, however, this requirement is not present, and the disk 701 may be secured to the reduced end of the shaft 700 merely by a nut or stud.

To the periphery of each disk 701 is fastened the end of the outer slides 687 referred to in connection with the centering devices. These slides have ears 704 which, in three out of four slides, are formed with grooves 705 to guide and support an annular plate 706 (see the lower part of the core at the left in Fig. 66). The outer portion of these ears are made circular (see Fig. 67) so as to pass through enlargements 707 in slots in the plate, the narrower portions of the slots engaging the grooves in the ears to retain the plate in position. In the fourth slide the length of the ear is shortened and it carries a headed screw 708 (see Fig. 72), the ear and screw together functioning as the slots in the other slides but permitting the ring to be clamped in position by tightening the screw. By the described mounting the plate 706 and the parts mounted thereon can be removed from the core head to permit the removal and replacement of a core.

Ball bearings 709 at the outer periphery of each plate support rotatably a ring 710 formed with an outwardly extending cord positioning portion 711 and a beveled ledge 712 (Fig. 68). Fitting over this ledge, and having its inner surface beveled to match, is an expansible ring 713 adapted to grip between itself and the clamping ring 136 certain portions of the inflatable bag 138. This bag is conveniently formed of rubberized fabric having its circumferential edges 714 lapped between rings 136 and 713, and having the fabric joined transversely by a rubberized splice (not shown) so as to form a complete annular air tight tube. By driving ring 713 upon the tapered ledge 712 the clamping ring is centered and the edges 714 of the fabric tightly held. A wedge piece 715 fits with its beveled sides 716 in grooves to close the gap in the expansible ring (Fig. 75). After the parts are thus assembled, they are held in position by bolts 717, one of which passes through the wedge. The annular bag is preferably vulcanized with a fold 718 formed in it, so that when deflated it will normally assume the shape shown in Fig. 68 with the whole bag lying within the cord positioning portion 711 of ring 710. When the bag is expanded by the admission of compressed air, this fold straightens out, and the cut ends of the cords are by the movement of the bag folded back upon the cord material previously laid upon the core as shown in Fig. 76. A somewhat better control of the action of the bag is obtainable if the material of which it is constructed is substantially non-extensible, and the expansion accomplished by the straightening out of the folded portion. Other forms of fold may be employed, the one shown having been found convenient in practice. As pointed out in the description of the method of transferring, the illustrated difference in width of the two transfer devices is not essential.

Air is admitted to the interior of the bag through a pipe 720 passing through the several rings and terminating under the folded portion. A flexible tube 721 connects this pipe with the bent end of a pipe 722 extending through sleeve 676 between it and the shaft 700. The disk 678 is cut away in any suitable manner to permit the passage of the tube, a sufficient space being cut out to give room for the tube when the parts are moved from the position of Fig. 72 to that of Fig. 66. Pipe 722 is supported in the sleeve in any suitable manner, as by wires 723. Its end remote from tube 721 passes through the sleeve 676 at 724 (Fig. 18) where it may be sealed air tight to the sleeve as by soldering, into a cavity formed in slide 679. This cavity is conveniently sealed to the sleeve by packing 725 held in place by an end plate 726 of the slide. The reason for this construction will be apparent when it is considered that the cam drum 273, and consequently disk 701 and sleeve 676, revolves intermittently during the operation of the machine, while it is necessary that the pipe 727, through which air is admitted to cavity 676' remains stationary. This arrangement of parts permits rotation of the cam drum while maintaining a constant air tight connection between pipe 722 and the source of compressed air.

The outer end of each shaft 700 passes inside a cylinder 730 and has a portion of reduced diameter (Fig. 19) upon which a sleeve 731 is held by a nut 732 screwed to the shaft. The surface of the sleeve 731 is screw-threaded so as to receive adjustably a member 733 provided with a groove 734. To hold the member 733 in adjusted position it is split and clamped together by a screw 735. Slidable on the cylinder is a hand-wheel 736, to the hub of which are secured pins 737 passing through cam slots 738 in the cylinder and screwed to a collar 738' at the inside of the cylinder. Rollers 739 mounted on the inner ends of the pins travel in the groove 734, so that the hand-wheel may rotate freely relative to the shaft 700 but the shaft is constrained to move longitudinally upon shifting of the hand-wheel. The cam slots 738 have locking portions 740 and slanting portions 741.

If the parts are located in the positions shown in dotted lines in Fig. 17, the transfer mechanism is moved outwardly from the core a distance beyond interference with the cords or anchorages during the normal building of a tire carcass. When it is desired to press the cords and the anchorage about which they are folded closely against the building flange to hold them against displacement when the cords are severed, the hand-wheel is slightly rotated to free the pins from the locking portions 740 of the cam slots, pulled bodily towards the left in Fig. 17, and rotated so as to cause the pins to ride upon the slanting portions 741. The main movement of the hand-wheel, in which the pins travel along the straight parts of the cam slots, serves to move the transfer mechanism from the dotted line position to substantially the full line position shown at the right of Fig. 17. The final rotation, in which the pins travel up the slanting portions of the cam slots, firmly presses the clamping ring 136 against the adjacent building flange and holds it in that position during the severing operation.

In this motion of the transfer mechanism the ends of the slot 689 (Figs. 72 and 73) in which slide the screws 688 attached to the slides 684 carrying the centering mechanism, hit against the screw and impart at the ends of the motion of slide 687 a smaller motion to slide 684. The length and position of this slot is so adjusted that the centering ring will be in the extended position of Fig. 72 while the transfer mechanism is in its inactive position also shown in that figure, and in the retracted position of Fig. 66 when the transfer mechanism is moved to clamp against the bead.

Compressed air is supplied to each bag 138 by a pipe 745 attached to pipe 727 through a three way valve 747 serving to admit air into the bags or exhaust it therefrom. Pipe 745 in turn is connected to a main line 746 (Fig. 3) through a similar three way valve 749. By this arrangement, the bags can be readily turned on simultaneously and yet the air released from the bag associated with a built-up carcass while the pressure is retained by the bag associated with the carcass whose construction is being commenced.

*Knife mechanism.*

The knife mechanism, which is used to sever the circumferential series of cords between the two cores after they have been transferred to a bare core from the core on which a carcass has been built, is mounted on one of the core heads only. As shown in the drawings this mechanism is associated with the right hand core unit. In the case of this unit the shaft 700 which carries the transfer device as previously described, is utilized also to support and furnish rotating motion to the knife. Keyed near the end of the shaft is an arm 750, held in place by the nut 751, and shaped to clear the ring 703 previously referred to. Pivoted at 752 to the end of this arm is a knife bar 753 having a longitudinal guiding slot 754. Ring 703 has a flange 755 retaining a disk 756. A friction packing 757 is located between this disk and the transfer supporting disk 701, so that disk 756 is free to rotate relative to the shaft 700, but is always under slight friction. Secured to the disk 756 is a screw 758, passing through the guiding slot 754. The head of this screw and a spacing collar 759 hold the knife bar 753 slidably between them. Also secured to the disk 756 are stop screws 760 and 761 serving to position the knife when it is in its extended position shown in full lines in Fig. 67. A knife blade 762, preferably having a curved cutting edge as shown, may be secured in any suitable manner to the outer end of the knife bar.

When the knife is not in use the parts lie in the positions shown in dotted lines in Fig. 67, the knife bar being drawn inwardly and diagonally by the relative positions of pivot 752 and screw 758. To cause the knife to operate, shaft 700 is rotated in the direction of the arrow in Fig. 67. The first effect of this motion is to turn arm 750 from the dotted to the full line position in Fig. 67, thus sliding the knife bar along the guiding screw 758 until it is projected radially outwardly as shown. At this position arm 750 strikes against stop screw 760 and the knife bar strikes against stop screw 761, thus coupling arm 750 and disk 756 together for rotation with the knife bar held firmly in extended position. The friction exerted by packing 757 on disk 756 prevents rotation of the disk until the arm contacts with the stop screws as described. Shaft 700 in its continued rotation carries the extended knife around a full circle, cutting the circumferential series of cords extending over the flanges 711. After the severing of the cords is completed the rotation of the shaft 700 is stopped. In the usual operation of the machine, the momentum of the disk 756 will be sufficient in spite of the friction of the packing to carry guiding screw 758 to a position causing the knife bar to be drawn back to a position corresponding to that shown in dotted lines in Fig. 67. If the momentum of the disk is not sufficient to withdraw the knife to inactive position the disk can be given a slight manual rotation, the holes 763 which are provided to afford access to the core locking pinion 288 furnishing a convenient way of grasping it.

The knife mechanism described is claimed in my copending application Serial No. 634,733, filed April 26, 1923.

Knife drive.

In the present embodiment power operated mechanism has been provided to rotate the shaft 700 when desired. The source of power has been taken for convenience as the motor which returns the constricting means to its inactive position as previously described. Secured to the short shaft 558 (Figs. 4 and 78), referred to above in relation to the clutch for the constricting means, is a sprocket 770 connected by a chain 771 to a sprocket 772 attached to a clutch hub 773 freely rotatable on a shaft 774. The latter shaft extends longitudinally of the machine at one side and is journaled in a bearing on hanger 154 and a bearing 775 attached to the main frame. Collars 776 prevent endwise motion of the shaft in its bearings, and a collar 777 (Fig. 81) serves to hold the hub 773 in proper longitudinal position on the shaft. A sleeve 778 is keyed to the shaft and has a portion 779 projecting within a counterbore in the hub. This projecting portion is formed with a groove 780 into which the end of a clutch dog 781 is adapted to project to couple together the hub and the sleeve. The dog has ribs 782 sliding in radial guide-ways in the hub, and is constantly urged inwardly by a spring 783 seating in a hole 784 in the dog and bearing at its other end against a lug 785 secured to the hub as by a screw 786. As long as the dog engages the groove 780 the shaft 774 will be driven by motor 236 through the connections described, additional connections to be referred to below transmitting this rotatory motion to the knife. A band brake or friction member 787 acting on sleeve 778 prevents overtravel of the shaft 774 after the dog is withdrawn from the groove.

In order to control the operation of the knife a disengaging device is provided to keep the dog 781 out of groove 780 except when the device is shifted by the operator. A bent lever 790, carrying at one end a foot treadle 791, is pivoted at 792 to the hanger 154. The inner end of this lever is forked to receive a pin 793 on one side of a bar 794 slidable in guide-ways 795 on the hanger 154. The inner end of bar 794 is formed with a curved shield 796 of substantially the shape shown in Fig. 83. When the treadle is raised, the shield is lowered into the position of Fig. 79, in which position its top surface engages an oval pin 797 on the side of the clutch dog. When the treadle is depressed, the shield is raised to a position shown in Fig. 80, permitting the pin to pass under it.

With the treadle in its raised position and motor 236 in operation, the hub 773 will be constantly rotated, but as the dog 781 is held from dropping into the groove 780 by pin 797 riding over the shield 796 at each revolution the shaft 774, and consequently the knife mechanism, will remain stationary. If the treadle be depressed, the shield will be raised above the range of the pin and upon continued rotation of the hub, the dog will be brought over the groove and will be snapped into it by the action of its spring. The oval shape of the pin and the relative sharpness of the side of the shield prevent damage due to the pin striking against the shield while the latter is being moved by the treadle, as the shield will be cammed out of the way by the pin. The rotation of shaft 774 will continue until the operator takes his foot off the treadle. A single revolution of the knife mechanism being sufficient to sever the complete series of cords, the clutch mechanism described has additional utility in causing the knife to complete a single cycle and then stop, at the same time preventing the operator from interrupting the motion of the knife until the complete cutting cycle has been finished. For this method of control the operator needs only to depress the treadle momentarily, removing his foot immediately after the knife starts to move. This raises the shield and permits the dog to couple together the clutch member 773 and the shaft 774, but at once lowers the shield to withdraw the dog from the groove when the rotation of the parts have brought them around a complete revolution.

Shaft 774 is splined or squared as at 800 throughout the major portion of its length, and splined to it so as to be constantly coupled for rotation but free to slide axially is a bevel gear 801 journaled in a bracket 802 secured to the bottom of the core supporting slide. Also journaled in this bracket is a short shaft 803 carrying at its lower end a bevel gear 804 meshing with gear 801. The upper end of shaft 803 carries a universal joint 805 secured to one part of a telescoping shaft 806, the other part of which is secured to a universal joint 807. This latter joint is coupled to a stub shaft journaled in bracket 667 and carrying at its top a spiral gear 808 meshing with a spiral gear 809 journaled to the bracket. Through gear 809 the shaft 700 previously referred to passes, being squared or splined to the gear so that it is constrained to rotate therewith but is permitted a slight longitudinal movement. By this connecting mechanism rotation of the shaft 774 will be communicated to shaft 700 in whatever relative positions these may be. The telescoping shaft 806 permits the rotation of the right hand core support in Fig. 2 to an inactive position similar to that occupied by the left hand core in that figure without necessity of uncoupling the driving mechanism for the knife. The relation of the gears connecting shafts 774 and 700 is preferably such that for a single revolution of shaft 774, the shaft 700 will be given somewhat more than a single revolution. As appears from Fig. 67, the first part of the revolution of shaft 700 is utilized in projecting the knife into cutting position and is ineffective to perform any actual cutting, and for this reason the parts are arranged to give to the shaft 700 more than one revolution before it is stopped by the clutch mechanism.

The finished tire carcass.

In Figs. 122 and 123 has been illustrated a built-up carcass and a section of a completed tire respectively, in order to show more clearly the construction of the carcass which the described machine is adapted to produce. These figures clearly show the reverse folds of the circumferential series of cords, with an anchorage enclosed within each fold. Considering the two figures together, and considering the plies rather than the separate cords, the cord sheath is folded at 127 around an anchorage 128, passes across the crest of the tire, in a first ply 820. It then is folded around an anchorage 132 and passes back in a second ply 821. The sheath is then folded around an anchorage 822 and passes back over the tire in a third ply 823, around an anchorage 824 (shown as composed of two wires so that the number of wires in the two beads will be equal) and back across the tire to the initial side in a fourth ply 825. The reverse folding can be continued as long as desired, the final ply being folded at 826 around an anchorage 827. The cords are preferably laid at an angle, the cords in adjacent layers crossing each other as shown. This type of construction gives a tire in which the strain resisting elements are under substantially individually uniform tensions, which may be kept constant throughout the several plies. Strains are thus borne evenly by all the elements and the life of the tire greatly prolonged. Furthermore the individual elements can be laid more accurately and rapidly in their correct strain resisting positions than with any other tire-building method or machine of which I am aware.

In Fig. 123 I have shown the bead wires as covered with flipper strips 828 extending between the plies, but these strips may conveniently be omitted. If their use is desired, they may be applied according to the disclosure in my copending application Serial No. 432,696 filed Dec. 23, 1920. The tire casing may be completed by the application of suitable or usual covering material such as tread and side wall, indicated conventionally in Fig. 123.

Summary.

To assist in forming a complete grasp of the whole machine, the principal elements will be briefly summarized below and their relation indicated.

The annular housing 151, which carries the supplies and guiding devices for the cords and through which the two core supporting heads are adapted to travel, is arranged centrally across the machine. Reciprocating lengthwise of the machine directly under the housing, are the two shuttles 240 and 248 operated by the main cam drum. The upper shuttle carries a cam cooperating with cam rolls on the annular gear 431 to drive the cord feeding units, and the lower shuttle is connectible at its ends with either or both of the core carrying supports 267. Each core support is adapted to carry its core from one side to the other of the central plane of the cord guide carried in the housing, so that the cords are laid upon the core from one side to the other in a series of reverse folds. During this reciprocation of the core support, the cam roll 339 coacts with the cam drum 273 which is attached to the core to cause the latter to be rotated.

The constricting devices, one on each side of the annular housing, serve to constrict the series of cords between the core and the central guide, and are brought into operation either by the operator or by the automatic trip as desired. The two constricting devices are arranged to operate one on either side of either core, and are brought into operation one at a time by the clutch and trip mechanism described.

Each core support carries its own pneumatic tension device, by which the cords are held taut upon the withdrawal of the constricting devices; and its own transfer rings 136 and folding bags 138. Only one of the cores, however, is provided with the knife for severing the series of cords between the cores during the transfer, as the cores are always together when this step is performed.

Operation of the machine.

A description will now be given of the manner in which the machine is operated in building up a tire carcass and in transferring from the building of that carcass to the building of a succeeding one. The most convenient place to start in this description is with the core and guiding circumference in relative positions corresponding to Fig. 90. This exact position, of course, is not a normal stopping position of the machine, although by using control switch 233 (or clutch lever 185) the machine can be stopped at any desired point. It is, however, a good starting point for considering the building of a series of carcasses. The initial or first carcass is started by properly positioning the circumferential series of cords around the side of the core and folding them manually around a bead anchorage 128. Succeeding carcasses are started by the transfer operation described, no separate handing of the cords being necessary.

The core 126 is now run to the end of its stroke (a position corresponding to Fig. 93) by means of control switch 233. When the core has arrived at this position, the half-revolution clutch automatically stops it, and switch 233 is released by the operator. The natural shape of the cord defined surface may have sufficient curvature to permit the application of a bead anchorage without constriction, and in that case the machine may be started after the application of the anchorage without reference to the described constricting mechanism. If artificial constriction is desired, however, the operator swings the handle 609 adjacent the side of the machine at which the core is, thus causing the constricting wires to drop upon the series of cords, and handles 228 are turned to set the half-revolution clutch for motion in the opposite direction. The positions of the various cam rolls at this period are indicated on sheet 15 by using the letter A after the number of the roll.

The "inching" button 235 is now depressed and almost immediately released to shift the core towards the guide a distance sufficient to provide sufficient cord lengths for shifting the minimum circumference of the cord defined surface towards the side of the core, and if necessary reducing the circumference of the surface to that permitting the application of an anchorage. This latter position is indicated in Fig. 96 and by the letter B after the cam roll positions in Sheet 15. The operator now applies an anchorage about the cords in any suitable way and depresses treadle 630, causing the constricting wires to be expanded into their inactive positions. Switch 233 is then actuated to carry the core through the circular guide to the extreme position corresponding to Fig. 102. During this passage of the core, as pointed out in the description of the method, the first part of the motion is devoted to drawing back the excess lengths of cords paid out to permit of the ready application of a bead anchorage, and to a reverse rotation of the core serving to maintain the cords in their proper angular positions. The reasons for these conditions have been fully considered elsewhere, and need not be repeated here. As the point at which the reverse rotation ceases, and the point where the taking up of cords changes to a paying out, occur substantially at the same time, they have been indicated on Sheet 15 by the letter C placed after the cam roll numbers. The point at the end of the stroke (Fig. 102) corresponding to cam positions 451$^A$, have been indicated by the letter D. The operations described may be repeated until a carcass of the desired number of plies has been built up.

The type of motion given by the various cams will be easily understood from the cam developments shown in Figs. 85, 86, and 87. The cam path 257 on the large central cam drum 193 coacts with cam roll 243 (Fig. 85) to give back and forth travel to the core shuttle and hence to whichever core is connected to it. The motion of the core shuttle is shown as substantially uniform from one end of the stroke to the other except at the point B, where motion is temporarily halted to permit the cord feeding shuttle to have a slight relative advance. This position is the one at which the anchorage is applied, and the deviation from the simultaneous movement of the two shuttles serves to tighten up the cords before the core starts to move. Other mechanism can be substituted to accomplish the same result, as pointed out above. The movement of the annular gear 378 which controls the cord feeding units is illustrated in Fig. 87 by the dotted cam path, the cam rolls 451, of which there are a series acting successively, being fixed for movement with the gear during the operation of the machine. Fig. 87 clearly shows the interrupted advance of the cam roll 451 in one general direction, with alternated periods of lesser motion in the reverse direction, corresponding to the paying out and taking up of the cords respectively.

If the automatic trip for the constricting wires is used the procedure above will be varied by having the half-revolution clutch set to stop the core in the B rather than the A position, eliminating the stopping of the core at the end of the stroke and also the operation of handles 609. Treadle 630 and handles 228 are in this case operated before the motor is started to move the core from the B to the D position.

If the pneumatic tension is used the proper valve 670 is turned to admit air to the cylinder 654 at the point B before the constricting wires are removed. As the wires expand, the air will cause the core to be rotated slightly, cam straps 330 and 331 being spaced to permit of this, into a position indicated roughly on Fig. 86 by E. As the core is started in its passage through the guide the valve 670 is turned to the exhaust position, but the exhaust aperture is preferably made small enough so that a yielding air cushion will tension the cords during the first part of the stroke, the cam roll finally returning against strap 331 at a point indicated roughly by 339ᶠ.

It will be noticed from Fig. 85 that the cord feeding shuttle started moving directly after position B, whereas path 255 has a short period of rest at this point (see the cam path directly after position 243ᴮ. This permits the cords to be drawn back and tensioned after the constricting wires are expanded, before additional cord lengths are required to be taken up by the motion of the core towards the guide.

With a carcass completely built up on a core as shown at the right in Fig. 107, the series of cords are ready to be transferred to the core upon the other support. In Fig. 108 is shown the core shuttle 240 coupled to the right hand pedestal 267 by pins 323. The first step in the transfer is to disconnect ring 431 from gear 378 so that motion of the shuttle 248 will not affect the cord feed. Pins 323 are then disconnected from shuttle 240, the shuttle is run to the other side of the machine, and the pins 323 of the left hand core pedestal are coupled to it, as indicated in Fig. 111. During this period ring 137 of the left hand core is held in extended position by its pin 737 being in the locking portion 740 of the cylinder 730 (Fig. 109), while the ring 137 of the right hand core is positioned close to the core but not tightly clamped.

Pins 323 of the right hand core are now dropped, and the shuttle, with the left hand core connected to it, moved towards the right in Fig. 111 until the end of the shuttle contacts with the pins on the right hand core. The shuttle continues its motion, carrying both cores with it, until the position of Figs. 112 and 113 is reached, providing a sufficient length of cord for constricting. The constricting wires are then adjusted to their proper position and held by thumb screws 530, in this case rather nearer the cord guide than in the operation of building up a carcass, and are then released upon the cords by swinging handle 609. Pins 323 of the right hand core having been raised out of engagement with the end of the shuttle (conveniently before the release of the constricting wires) the right hand core slide is moved slightly towards the center of the machine by handle 326 to shorten the length of path of the cords and permit the constricting wires to draw the cord surface inwardly as indicated in Fig. 114. Fig. 116 indicates the corresponding positions of the two clamping ring cams. A bead anchorage 140 is then applied in the same way as in the building of a single carcass, and the constricting wires removed. The shuttle, still connected with the left hand core, is moved to the right until the pins 323 drop into recesses 245, and both cores are moved together to bring them to substantially the position of Fig. 117. This moves the left hand core into the surface of cords, and brings the two cores closely adjacent with the cords passing from the guide over the left hand core, under bead anchorage 140, over the disks 137, under the anchorage 135 (Fig. 117) and into the built-up carcass construction on the right hand core.

The cords are now securely anchored on both cores, and may be severed without danger of losing their conditions of tension or position. To further bind the cords in place, they are clamped against the flanges 129 by rotating hand wheels 736 (Fig. 119) and treadle 791 is depressed to cause the knife to sever the cords in the circumferential space 139. Air bags 138 are now inflated by opening valve 749, valves 747 in both units being previously opened. This turns back the cut ends of the cords (Fig. 120) which stick to the carcass material on account of their rubber coating, and completes the operations of the machine upon the right hand core.

The pins 323 of this core are now raised, and the core moved by handle 326 to a position near the end of its stroke but, in case the automatic trip is installed, with trip arm 637 sufficiently separated from collar 638 so as not to interfere with it. Handle 312 is now operated to unlock the pedestal 267, and the pedestal swung to the inactive position illustrated by the left hand core in Fig. 1.

The above sequence of operations are repeated, alternating upon the two core pedestals, as long as it is desired to build carcasses, without disturbing the cords or handling them separately during the building or transferring. When one of the stock spools runs out it may be readily replaced and the ends of the fresh cords joined to the ends of the old cords by a lap joint, the adhesiveness of the rubber making a sufficient bond for the purpose.

While I have described the mechanism rather in detail, I realize that the specific devices may be modified and departed from in many respects without changing the broader aspects of my invention, and I wish to protect by the appended claims my invention in its broad as well as in its detailed aspects as thoroughly and completely as the law will permit.

Having thus described my invention, I claim:

1. A method of building a tire carcass which comprises securing adjacent a circular building support a circumferential series of cords, guiding the cords in constantly taut condition from a circle of constant circumference greater than that of the support, axially separating and relatively rotating the support and the guided portions of the cords so that the cords extend between the support and the guiding circumference in a warped surface having a region of reduced circumference spaced from the support, constricting the series of cords between said region and the support so as to shift the region of reduced circumference towards the support, restricting the cords to the bead diameter by an anchorage, and transposing the planes of the support and the guided portions of the cords so as to draw the cords back upon the support.

2. A method of building a tire carcass which comprises carrying a circumferential series of cords diagonally across and to one side of a circular building support so that the individual cords are taut and the series lies in a trough-shaped warped surface having a region of reduced circumference spaced from the support, deflecting the series towards the axis of the support to shift the region of reduced circumference towards the support, and restricting the series of cords to the bead diameter by an anchorage.

3. A method of building a tire carcass which comprises securing adjacent a circular building support a circumferential series of flat cords with their flat sides against the support, guiding the flat members from a circle of constant circumference greater than that of the support with the flat sides of the cords guided in said circle parallel to the plane of the support, repeatedly transposing the planes of the support and the guided portion of the cords so as to lay the cords upon the support in a plurality of reversely folded layers, and enclosing an annular anchorage between each fold.

4. A tire building apparatus comprising a tire building support and means for laying simultaneously across the support a series of cords arranged about the circumference of the tire.

5. A tire building apparatus comprising a tire building support and means for laying simultaneously across the support and diagonally thereof a series of cords arranged about the circumference of the tire.

6. A tire building apparatus comprising a substantially tire shaped core, and means for drawing across the core and to points within the tire bead circumference a series of cords arranged about the circumference of the tire.

7. A tire building apparatus comprising a building support and means for drawing a circumferential series of cords back and forth across the core to lay on the support a plurality of reversely folded courses of such cords.

8. A tire building apparatus comprising a tire core, and means for drawing a circumferential series of cords back and forth across the core and to cause the cords to pass within the bead circumference of the core at each passage.

9. A tire building apparatus comprising a building support, and means for drawing a circumferential series of cords diagonally back and forth across the support with the cords in adjacent plies crossing each other.

10. A tire building apparatus comprising a circular building support, means for drawing a circumferential series of cords back and forth across the support first into positions which permit the restriction of the series of cords to a fixed diameter by an annular anchorage and then back across the support to position the anchorage adjacent the support, and means for maintaining the cords under individually uniform tensions.

11. A tire building apparatus comprising a building support for an annular tire structure, a supply for a plurality of cords, and means for laying the cords upon the support in a series extending about the major circumference of the tire structure.

12. A tire building apparatus comprising a building support for an annular tire structure, a supply for a plurality of cords, and means for laying the cords under tension upon the support in a series extending about the major circumference of the tire structure.

13. A tire building apparatus comprising means for supplying a circumferential series of cords in inwardly converging relation, a tire building support, and means for laying back and forth in reverse folds upon the support the inner portions of the converging cords.

14. A tire building apparatus comprising a building support for an annular tire structure, a supply for a plurality of cords, and means for laying the cords upon the support in a balanced system extending around the major circumference of the support.

15. In a tire building apparatus, a tire building support, means for supplying a circumferential series of cords, and means for laying the cords upon the support in a plurality of layers, the cords in each layer being continuations of cords in the layer immediately adjacent.

16. A building apparatus for multi-ply tires comprising a tire building support, a supply for a circumferential series of cords, and devices for laying continuous lengths of cords upon the support ply by ply under tension throughout the plies.

17. A tire building apparatus comprising a tire building support, devices for directing a circumferential series of cords to the support, and means for tensioning the series of cords around a bead anchorage.

18. A tire building apparatus comprising a tire building support, devices for directing a circumferential series of cords to the support, and means for tensioning the series of cords around a bead anchorage and back over the body of the tire.

19. A tire building apparatus comprising a tire building support, supplying devices for a circumferential series of cords, and a single mechanism for guiding and laying the cords in superposed layers upon the support with the cords in adjacent layers crossing.

20. In a tire building apparatus, a circular tire building support, devices for supplying to the support a circumferential series of cords, and means for drawing the cords back towards the support around an encircling annular anchorage.

21. In a tire building apparatus, a convex annular tire building support, means for laying upon the support a circumferential ply of tire material, and means for tensioning such material towards the center of the support from its anchorage in the bead edges of the tire.

22. In a tire building apparatus, a circular tire building support, guiding devices constructed and arranged to guide a circumferentially complete series of cords, and means for moving the support and the guiding devices relative to each other to lay upon the support a complete ply of the cords guided by said devices and attached adjacent the support.

23. In a tire building apparatus, a circular tire building support, guiding devices constructed and arranged to guide a circumferentially complete series of cords, and means for causing relative movement between the support and the guiding devices to lay diagonally upon the support portions of the cords guided by said devices and attached adjacent the support.

24. In a tire building apparatus, a tire building support, guiding means for a circumferential series of cords, mechanism for causing relative movement between the support and the guiding means whereby the cords are laid upon the support in reverse folds, and tension devices adapted to maintain the cords taut during such relative movement.

25. In a tire building apparatus, a circular tire building support, guiding devices constructed and arranged to guide a circumferentially complete series of cords, and means for causing relative movement between the support and the guiding devices in successively opposite directions, to lay in a plurality of courses across the support the cords guided by said devices and attached adjacent the support.

26. In a tire building apparatus, a circular tire building support, guiding devices constructed and arranged to guide a circumferentially complete series of cords, and means for causing relative movement between the support and the guiding devices, both in the general direction of the axis of the support and angularly thereabout, to lay upon the support in a plurality of courses with each cord extending back and forth across the support in a zig-zag path a series of cords guided by said devices and attached adjacent the support.

27. In a tire building apparatus, a circular tire building support, guiding devices constructed and arranged to guide a circumferentially complete series of cords, and means for causing relative movement between the support and the guiding devices to lay simultaneously upon the support in definite predetermined angular positions a complete ply of the cords guided by said devices and attached adjacent the core.

28. In a tire building apparatus, a circular tire-building support, guiding devices constructed and arranged to guide a circumferential series of flat cords with their planes substantially parallel to the plane of the building support, and means for causing relative movement between the support and the guiding devices to lay portions of the cords flat upon the support.

29. A tire building apparatus comprising in combination a tire cord and means to apply strain-resisting material to the core; said means including feeding means adapted to constantly present said material to the core in a circumferential sheath and means to cause relative axial and rotative movements with respect to the core whereby said sheath is applied to the core simultaneously over its entire circumference progressively from bead to bead.

30. A tire building apparatus comprising a core, a support therefor, cord supplying means adapted to be spaced from the plane of the core and to simultaneously tension all the cords of a carcass ply anchored to the core while said ply is being applied to the core, and means whereby said first mentioned means may be positioned for cord applying and tensioning operations on successive plies.

31. A tire building apparatus comprising a circular building support, cord supplying means adapted to be spaced axially from either side of the support to simultaneously tension all the cords of a carcass ply as it is being shaped on the support, and mechanism adapted to vary the relative positions of said means and support whereby the cords may be tensioned while being applied to said support.

32. A tire building apparatus comprising in combination a tire core, a cord guiding means adapted to present the cords in a circumferential series to the core, means adapted to relatively rotate and move the core and guiding means into the same or axially spaced planes whereby the cords may be progressively applied to the core by such movements, causing a warping of the cord surface to conform to the core as the latter meets said surface.

33. In a tire building apparatus, a generally convex building support of substantially the internal shape of the tire carcass, guiding devices constructed and arranged to guide a circumferential series of cords, and means for causing relative movement between the support and the guiding devices to lay portions of the cords across the crest and upon the side of the convex surface of the support.

34. In a tire building apparatus, a generally convex building support of substantially the internal shape of the tire carcass, guiding devices constructed and arranged to guide a circumferential series of cords, and means for causing relative movement between the support and the guiding devices to lay portions of the cords diagonally across the crest and upon the side of the convex surface of the support.

35. In a tire building apparatus, a generally convex building support of substantially the internal shape of the tire carcass, guiding devices constructed and arranged to guide a circumferential series of cords, means for causing relative movement between the support and the guiding devices to lay portions of the cords across the crest and down the sides of the convex surface of the support, and means for tensioning the cords down the side of the support.

36. In a tire building apparatus, a generally convex building support of substantially the internal shape of the tire carcass, guiding devices constructed and arranged to guide a circumferentially balanced series of cords, and means for causing relative movement between the support and the guiding devices to lay portions of the cords across the crest and down the sides of the convex surface of the support and to position the series of cords to receive an anchoring member.

37. In a tire building apparatus; a generally convex former of substantially the internal shape of the tire carcass; guiding devices constructed and arranged to guide a circumferentially balanced series of cords; and means for causing relative movement between the support and the guiding devices to lay portions of the cords across the crest and down the sides of the convex surface of the support, to position the series of cords to receive a circular anchoring member, and to draw the anchoring member adjacent the side of the support.

38. A tire building apparatus, comprising a circular tire building support, guiding devices adapted to guide cords at points at distances from the axis of the support always greater than the radius of the support, and means for causing relative movement between the support and the guiding devices to lay portions of the cords on the support.

39. In a tire building apparatus, a support for holding a tire carcass in process of construction, guiding means constructed to guide a circumferential series of cords and to permit the support to be passed therethrough, and a mounting for the support and guiding means whereby the support may be passed through the guiding means.

40. In a tire building apparatus, devices arranged about a central area and adapted to guide a series of cords sufficient in number to form a complete carcass ply when arranged side by side, cord receiving and supporting means of a size permitting reception within said central area, and a mounting for the guiding devices and the supporting means so that their relative positions may be changed in a manner to effect a transposition of the supporting means from one side to the other of the plane of the central area, whereby the series of cords when initially attached to said means may by the motion of transposition be drawn through the guiding devices and extended across the supporting means.

41. In a tire building apparatus, devices arranged about a central area and adapted to guide a series of cords sufficient in number to form a complete carcass ply when arranged side by side, cord receiving and supporting means of a size permitting reception within said central area, and means for causing relative helical movement between the guiding devices and the supporting means so as to change their relative positions in a manner to effect simultaneously a transposition of the supporting means from one side to the other of the plane of the central area and a relative angular displacement between the guiding devices and the supporting means, whereby the series of cords when initially attached to said supporting means may by the motion of transposition be drawn through the guiding devices and extended diagonally across the supporting means.

42. In a tire building apparatus, cord guiding devices held stationary in curved relation, and a cord receiving support having its surface formed on a curvature similar to that on which the guiding devices are arranged but spaced therefrom, the support being mounted for reciprocatory movement back and forth past the guiding devices.

43. In a tire building apparatus, cord guiding devices arranged in curved relation, a cord receiving support having its surface formed on a curvature similar to that on which the guiding devices are arranged but spaced therefrom, and means for passing the support past the guide with a helical motion causing cords to be drawn through the guide and extend diagonally across the support.

44. In a tire building apparatus, a circular tire building support, means for holding positioned about the support a circumferential series of cords extending across the plane of the support, and means for shifting towards the side of the support portions of the cords so positioned.

45. In a tire building apparatus, a circular tire-building support, a circular guide of constant circumference coaxial therewith constructed and arranged to guide a circumferential series of cords, and means for causing relative movement between the support and the guide to shift the support from one side to the other of the guide so as to lay upon the support a circumferential series of cords guided by said guide and attached adjacent the support.

46. In a tire building apparatus, a circular tire-building support, a circular guide of constant circumference coaxial therewith constructed and arranged to guide a circumferential series of cords, means for causing relative axial movement between the support and the guide so as to lay upon the support a circumferential series of cords guided by said guide and attached adjacent the support, and means for causing relative rotation between the support and the guide about their common axis so that the cords so laid will lie diagonally upon the support.

47. In a tire building apparatus, a circular tire-building support, a circular guide of constant circumference coaxial therewith constructed and arranged to guide a circumferential series of cords, and means for causing relative axial reciprocation between the support and the guide to place the support alternately on one side and the other of the guide so as to lay in successive courses upon the support a circumferential series of cords guided by said guide and attached adjacent the support.

48. In a tire building apparatus, a circular tire-building support, a circular guide of constant circumference coaxial therewith constructed and arranged to guide a circumferential series of cords, means for causing relative axial reciprocation between the support and the guide to place the support alternately on one side and the other of the plane of the guide so as to lay in successive courses upon the support a circumferential series of cords guided by said guide and attached adjacent the support, and means for causing relative rotation between the support and the guide about their common axis so that the cords so laid will lie upon the support in zig-zag paths through the successive courses.

49. In a tire building apparatus, guiding means constructed and arranged to guide a circumferential series of cords, and a circular tire building support mounted coaxially with the guide and constructed and arranged to be moved through the guide.

50. In a tire building apparatus, guiding means constructed and arranged to guide a circumferential series of cords, a circular tire building support mounted coaxially with the guide, and means to move the support through the guide.

51. In a tire building apparatus, guiding means constructed and arranged to guide a circumferential series of cords, a circular tire building support mounted coaxially with the guide, means to move the support through the guide, and means for rotating the support.

52. In a tire building apparatus, devices for supplying a circumferential series of cords, a circular guide constructed and arranged to receive and guide the cords from the supplying devices, and a tire-building support mounted for motion coaxially with the guide.

53. In a tire building apparatus, devices for supplying a circumferential series of cords, a circular guide constructed and arranged to receive and guide the cords from the supplying devices, a tire-building support mounted for motion coaxially with the guide, and means for actuating the supplying devices to maintain the cords in taut condition.

54. In a tire building apparatus, a circular guide having means for guiding a circumferential series of flat cords with their planes substantially parallel to the plane of the circular guide, and a building support coaxial with the guide and mounted for relative motion therethrough.

55. In a tire building apparatus, a tire-building support, and cord guiding means surrounding the support, said support and guiding means being adapted for relative reciprocation.

56. In a tire building apparatus, a tire-building support, and cord guiding means surrounding the support, said support and guiding means being adapted for relative reciprocation for the application of cords on opposite sides of the support.

57. In a tire building apparatus, a tire building support, means for guiding a series of cords, and means operable to cause relative movement between the support and the guiding means to cause the cords to be carried across the support in excess length whereby they may be anchored and then to cause such excess length to be taken up.

58. In a machine of the class described, a tire building support, a supply for tire building material, a guide for the material located between the support and the supply, means for causing relative movement between the support and the guide, and means for operating the supply to pay out or take up the material to keep it taut during the relative movement between the guide and the support.

59. In a machine of the class described, a circular tire building support, a supply for a circumferential series of tire building elements, a guide located between the support and the supply for guiding the series, means for causing relative movement between the support and the guide in a direction axially of the support to lay portions of the elements upon the support, and means for operating the supply to pay out or take up the elements to keep them taut during the relative movement between the guide and the support.

60. In a tire building apparatus, a circular tire-building support, a circular guide coaxial therewith constructed and arranged to guide a circumferential series of cord members, and means for causing relative reciprocation between the support and the guide first in one direction to draw portions of the cord members across the support in excess length whereby they may be anchored adjacent the support, and then in the reverse direction to permit the excess length to be taken up and the cord members drawn across the support in the opposite direction.

61. In a tire building apparatus, a circular tire-building support, a circular guide coaxial therewith constructed and arranged to guide a circumferential series of cord members, means for causing relative reciprocation between the support and the guide first in one direction to draw portions of the cord members across the support in excess length whereby they may be anchored adjacent the support, and then in the reverse direction to permit the excess length to be taken up and the cord members drawn across the support in the opposite direction, and means for keeping the cord members taut during such movements.

62. In a tire building apparatus, a circular tire-building support, a circular guide coaxial therewith constructed and arranged to guide a circumferential series of cord members, means for causing relative reciprocation between the support and the guide first in one direction to draw portions of the cord members across the support in excess length whereby they may be anchored adjacent the support and then in the reverse directions to permit the excess length to be taken up and the cord members drawn across the support in the opposite direction, means for supplying the cord members to the guide, and means for drawing the members back into the supply during the operation of taking up the excess length.

63. In a tire building apparatus, a circular tire-building support, a circular guide concentric therewith constructed and arranged to guide a circumferential series of cord members, means for causing relative reciprocation between the support and the guide first in one direction to draw portions of the cord members across the support in excess length whereby they may be anchored adjacent the support and then in the reverse direction to permit the excess length to be taken up, means to cause relative rotation between the support and the guide in one direction during the cord laying stroke and in the opposite direction during the taking up of the excess length of the cord members, and means for keeping the cord members taut during such movements.

64. In a tire building apparatus, a circular tire-building support, a circular guide concentric therewith constructed and arranged to guide a circumferential series of cord members, means for causing relative reciprocation between the support and the guide first in one direction to draw portions of the cord members across the support in excess length whereby they may be anchored adjacent the support and then in the reverse direction to permit the excess length to be taken up and the cord members drawn across the support in the opposite direction, means to cause relative rotation between the support and the guide in one direction during the first-named cord laying stroke, in the opposite direction during the taking up of the excess length of the cord members, and in the original direction during the second named laying stroke, and means for keeping the cord members taut during such movements.

65. In a tire building apparatus a circular tire-building support, a circular guide concentric therewith and constructed and arranged to guide a circumferential series of cord members, means for causing relative axial reciprocation between the support and the guide to lay portions of the cord members in a circumferential layer upon the support at each stroke and to provide at the end of each stroke an excess length of the cord members between the support and the guide to permit of the members being anchored, means for causing relative rotation between the support and the guide intermittently in one direction to cause the cord members to lie in zig-zag paths around the support but with retrograde rotations at the beginning of each stroke to permit the excess length of the cord members to be taken up without affecting the angular disposition of the cord members on the support, and means for supplying the cord members in taut condition through the guide during these movements.

66. In a tire building apparatus, a circular tire-building support, means for supplying a circumferential series of cords, and means for drawing the cords diagonally across the support in a surface having a region of reduced circumference at least as small as the circumference of the bead line of the support.

67. In a tire building apparatus, a circular tire-building support, means for supplying a circumferential series of cords, and means for drawing the cords diagonally across the support and in straight lines to a circumference spaced axially to one side thereof, whereby the cords are caused to lie in a surface having a region of reduced circumference at least as small as the circumference of the bead line of the support.

68. In a tire building apparatus, a circular tire-building support, means for supplying a circumferential series of cords, means for drawing the cords diagonally across the support and to one side thereof in a surface having a region of reduced circumference at least as small as the circumference of the bead line of the support, whereby the cords may be restricted by an anchorage to the bead diameter, and means for drawing the cords back across the support after they have been so restricted to the bead diameter in said region.

69. In a tire building apparatus, a circular tire-building support, means for supplying a circumferential series of cords, means for drawing the cords diagonally across the support and to one side thereof in a surface having a region of reduced circumference at least as small as the circumference of the bead line of the support, whereby the cords may be restricted by an anchorage to the bead diameter, means for drawing the cords back across the support after they have been so restricted to the bead diameter in said region, and means for maintaining the cords in taut position.

70. In a tire building apparatus, a circular tire-building support, means for supplying a circumferentially balanced series of cords, means for drawing the cords diagonally across the support and to one side thereof in a surface having a region of reduced circumference at least as small as the circumference of the bead line of the support, whereby the cords may be restricted to the bead diameter by an encircling annular anchorage, means for drawing the cords back around the anchorage to position it adjacent the support, and means for maintaining the cords substantially under individually uniform tension.

71. In a tire building apparatus, a circular tire-building support, means for supplying a circumferential series of cords, means for drawing the cords diagonally across the support and to one side thereof in a warped or curved surface, and means for gradually changing the position of the cords relative to the support so that the contour of the surface defined by the cords is caused to conform to the support.

72. In a tire building apparatus, a generally convex circular building support, a circular guide of constant circumference larger than the support and coaxial therewith constructed and arranged to guide a circumferential series of cords, and means for causing relative movement between the support and the guide both axially and rotatively about their common axis as to draw across the convex surface of the support and to one side thereof, in a surface having a region of reduced circumference at least as small as that of the bead line of the support, a series of cords guided by said guide and attached adjacent the support.

73. In a tire building apparatus, a generally convex circular building support, a circular guide of constant circumference larger than the support and coaxial therewith constructed and arranged to guide a circumferential series of cords, means for causing relative axial reciprocation between the support and the guide and causing relative rotation between them about their common axis to draw across the convex surface of the support and to one side thereof, in a surface having a region of reduced circumference at least as small as that of the bead line of the support, a series of cords guided by said guide and attached adjacent the support, whereby the series of cords may be secured to the bead diameter by an encircling anchorage, and to then draw the cords back towards the support to carry the anchorage adjacent the support and lay the cords across the support in a second course, and means for maintaining the cords in taut condition.

74. In a tire building apparatus, guiding means constructed and arranged to guide a circumferential series of cord members, and a plurality of building supports adapted for alternate cooperation with the guiding devices.

75. In a tire building apparatus, guiding means constructed and arranged to guide a circumferential series of cord members and a pair of circular building supports each mounted for movement coaxially with the guide.

76. In a tire building apparatus, a circular guide constructed and arranged to guide a circumferential series of cord members, a pair of circular building supports each mounted for movement coaxially with the guide, and means for moving either support through the guide to lay upon that support portions of the cord members.

77. In a tire building apparatus, guiding means constructed and arranged to guide a circumferential series of cords, a pair of tire building supports arranged normally one on either side of the guide and mechanism adapted to cause either of said building supports to cooperate with the cord guiding means for tire building operations.

78. In a tire building apparatus, guiding means constructed and arranged to guide a circumferential series of cords, a pair of tire building supports arranged normally one on either side of the guide, each of said supports being mounted for movement coaxially with the guide, and means for moving either support through the guide to lay upon that support portions of the cord members.

79. In a tire building apparatus, guiding means constructed and arranged to guide a circumferential series of cords, a pair of tire building supports arranged normally one on either side of the guide, and mechanism for moving either or both of the supports coaxially with the guide whereby a tire structure may be built upon either of them or the cord members transferred from one to the other.

80. In a tire building apparatus, a circular guide constructed and arranged to guide a circumferential series of cord members, a pair of circular building supports each mounted for movement coaxially with the guide, each support also being mounted so that it may be moved out of axial alignment with the guide, means for securing either of the supports in axial alignment with the guide, and means for moving the support so secured through the guide to lay upon it portions of the cord members.

81. In a tire building apparatus, a circular guide constructed and arranged to guide a circumferential series of cord members, a pair of circular building supports each mounted for movement coaxially with the guide, a reciprocable shuttle, means for connecting either of the supports to the shuttle, and means for reciprocating the shuttle to carry the support connected to it through the guide to lay upon it portions of the cord members.

82. In a tire building apparatus, guiding devices for a circumferential series of cords, a circular tire-building support, means for causing relative motion between the support and said devices, and mechanism for automatically stopping said means at predetermined periods of its operation.

83. In a tire building apparatus guiding devices for a circumferential series of cords, a circular tire-building support, means for causing relative motion between the support and said devices, clutch mechanism for automatically stopping the operation of said means at predetermined periods, and a device controllable by the operator for restarting said means after it has been stopped by the clutch mechanism.

84. In a tire building apparatus, guiding devices for a circumferential series of cords, means for supplying cords under tension to said devices, a circular tire-building support, mechanism for causing relative movement of the support through the guiding devices, irreversible driving means for said supplying means and said mechanism operating to maintain the tension when the driving means is stopped, and means for disconnecting the driving means to release the tension.

85. In a tire building apparatus, guiding devices for a circumferential series of cords, means for supplying cords under tension to said devices, a circular tire-building support, mechanism for causing relative movement of the support through the guiding devices and for operating the cord supplying means, a source of power, a worm gear drive connecting the source of power to said mechanism, and a releasable friction clutch interposed between the worm gear drive and said mechanism.

86. In a tire building apparatus, guiding devices for a circumferential series of cords, a circular tire-building support, means for causing relative motion of the support through the guiding devices, and a device controllable by the operator for causing the actuation of said means.

87. In a tire building apparatus, guiding devices for a circumferential series of cords, a circular tire-building support, means for causing relative motion of the support through the guiding devices, a clutch mechanism for automatically stopping the operation of said means at predetermined periods, and a device controllable by the operator for stopping or starting said means at any point.

88. In a tire building apparatus, a circular guide for circumferential series of cords, a reciprocable slide, a core support rotatably mounted on said slide, means for locking the support in fixed angular position on the slide, and means for reciprocating the slide to carry the core through the guide.

89. In a tire building apparatus, a circular guide for circumferential series of cords, a pair of circular core supports, a reciprocable shuttle, a pin carried by each support, abutments on the shuttle for engaging each pin, means for moving either pin into or out of engagement with an abutment, and means for reciprocating the shuttle to move that core support so secured to it in such a manner as to move its core coaxially through the guide.

90. In a tire building apparatus, guiding devices for a circumferential series of cords, a tire-building support, means for causing relative motion between the guiding devices and the building support, and means operable independently of the motion of the support to maintain the cords under tension.

91. In a tire building apparatus, a circular tire-building support, a circular guide coaxial therewith, means for reciprocating the support in the direction of its axis, and mechanism operable to impart rotation to the support during its reciprocation.

92. In a tire building apparatus, a circular tire-building support, a circular guide coaxial therewith, means for reciprocating the support in the direction of its axis, and cam mechanism operable to impart rotation to the support during its reciprocation, said cam mechanism being provided with a cam roll and with cam tracks proceeding in a zigzag manner and with switches to direct the cam roll into successive tracks.

93. In a tire building apparatus, a circular tire-building support, a circular guide coaxial therewith, means for reciprocating the support in the direction of its axis, and cam mechanism operable to impart rotation to the support during its reciprocation, said cam mechanism being provided with a cam roll and with a series of spaced angular cam tracks and switches arranged to direct the cam roll into successive tracks after it has traversed and retraced a portion of the preceding track, whereby on reciprocation the support will be given a series of intermittent rotations in one general direction interrupted by retrograde rotations of less magnitude.

94. In a tire building apparatus, guiding devices constructed and arranged to guide a circumferential series of cords, a circular tire-building support releasably held coaxially with said devices, means for reciprocating the support relative to said devices, means for rotataing the support during its reciprocation including cam mechanism carried in part by the support, and means for disconnecting the cam mechanism to permit movement of the support out of axial alignment with the guiding devices.

95. In a tire building apparatus; guiding devices constructed and arranged to guide a circumferential series of cords; a circular tire building support releasably held coaxially with said devices, means for reciprocating the support relative to said devices; and means for rotating the support during its reciprocation including a cam drum carried by the support, a cam roll, a slide supporting the cam roll either in position to cooperate with the cam drum or in an inoperative position permitting the support being moved out of axial alignment with said guiding devices, and devices controllable by the operator for holding the silde in either position.

96. In a tire building apparatus, guiding devices for a circumferential series of cords, a circular tire-building support coaxial therewith, means for constricting the series of cords between the guide and the support, and means for maintaining the cords taut during the removal of the constricting means.

97. In a tire building apparatus, a circular guide for a circumferential series of cords, a circular tire-building support, means for moving the support axially and angularly with respect to the guide to draw the series of cords diagonally in straight lines between the guide and the support, means for constricting the series of cords between the guide and the support to a circumference less than that which the cords assume in their normal straight line positions, and means for yieldingly rotating the support to maintain the cords taut during the removal of the constricting means.

98. In a tire building apparatus, a circular tire-building support, means for supplying building material thereto, and means to rotate the support comprising a member movable axially of the core and provided with a cam portion, coacting cam means secured for rotation with the support, and pneumatic means to move the member against the cam means to rotate the support.

99. In a tire building apparatus, guiding devices for a circumferential series of cords, a circular tire-building support arranged for movement coaxially therewith, means operable in a definite relation to the position of the support for supplying cords to the guide, and means for yieldingly tensioning the cords.

100. In a tire building apparatus, guiding devices for a circumferential series of cords, a circular tire-building support, means for moving the support axially and angularly with respect to the guide, and means for imparting a yielding supplemental rotation to the support.

101. In a tire building apparatus, a circular guide for a circumferential series of cords, a circular tire-building support, means for moving the support axially and angularly with respect to the guide, and pneumatically operated means for imparting a yielding supplemental rotation to the support.

102. A tire building apparatus comprising a building support, means for laying a series of cords across the support, and means for tensioning the cords after they have been so laid.

103. In a tire building apparatus; a circular guide for a circumferential series of cords; a circular tire-building support; means for moving the support axially and angularly with respect to the guide; and means for imparting a yielding supplemental rotation to the support including a plurality of cam rolls carried by the support, a cam member adapted to contact with any of the cam rolls to cause rotation of the support and pneumatically operated devices for urging the cam member against a roll.

104. A device for constricting circumferentially arranged material which comprises a contractile circular structure constructed to engage the material continuously throughout a circumference, and means for contracting the structure.

105. A device for constricting circumferentially arranged material which comprises a contractile circular structure, a weight, connecting means between the weight and the structure whereby lowering of the weight contracts the structure, and means for releasably holding the weight in raised position.

106. A device for constricting circumferentially arranged material which comprises a contractile circular structure, a weight, connecting means between the weight and the structure whereby lowering of the weight contracts the structure, power operated mechanism for raising the weight, and means for releasably holding the weight in raised position.

107. A device for constricting circumferentially arranged material which comprises a plurality of wires shaped to enclose a substantially circular area, and means for moving the ends of the wires to cause the size of the enclosed area to be varied.

108. A device for constricting circumferentially arranged material which comprises two rotatable rings, a plurality of wires each having one end attached to one ring and the other end to the second ring, and means for rotating the rings in opposite directions to vary the area enclosed within the wires.

109. A device for constricting circumferentially arranged material which comprises two rotatable rings, a plurality of wires each having one end attached to one ring and the other end to the second ring, weight means for rotating the rings in opposite directions to decrease the area enclosed by the wires, means for reversely rotating the rings to increase said area and for raising the weight, and means for releasably holding the weight in raised position.

110. A device for constricting circumferentially arranged material which comprises two rotatable rings, a plurality of wires each having one end attached to one ring and the other end attached to the second ring, a weight, a pair of cables each of which is attached at one end to a ring, said cables being attached at their other ends to the weight and being so attached to the rings that lowering of the weight will rotate the rings in opposite direction and contract the area enclosed within the wires, a second pair of cables each of which is attached at one end to a ring in such a manner that a pull on these cables will rotate the rings in the reverse of the directions caused by lowering the weight, a rotatable drum to which the other ends of said second pair of cables are attached, means for rotating the drum to raise the weight, and means for releasably holding the drum in position to retain the weight raised.

111. A device for constricting circumferentially arranged material which comprises two rotatable rings, a plurality of wires each having one end attached to one ring and the other end attached to the second ring, a weight, a pair of cables each of which is attached at one end to a ring, said cables being attached at their other ends to the weight and being so attached to the rings that lowering of the weight will rotate the rings in opposite direction and contract the area enclosed within the wires, a second pair of cables each of which is attached at one end to a ring in such a manner that a pull on these cables will rotate the rings in the reverse of the directions caused by lowering the weight, a rotatable drum to which the other ends of said second pair of cables are attached, a constantly rotatable shaft, clutch means for coupling the shaft to the drum to rotate the latter and raise the weight, means for automatically uncoupling the shaft from the drum after the latter has been rotated sufficiently to raise the weight and enlarge to the degree desired the area enclosed within the wires, and means for releasably holding the drum in the last named position.

112. A device for constricting circumferentially arranged material which comprises two rotatable rings, a plurality of wires each having one end attached to one ring and the other end attached to the second ring, a weight, a pair of cables each of which is attached at one end to a ring, said cables being attached at their other ends to the weight and being so attached to the rings that lowering of the weight will rotate the rings in opposite directions and contract the area enclosed within the wires, a second pair of cables each of which is attached at one end to a ring in such a manner that a pull on these cables will rotate the rings in the reverse of the directions caused by lowering the weight, a rotatable drum to which the other ends of said second pair of cables are attached, a constantly rotatable shaft, clutch means for coupling the shaft to the drum to rotate the latter and raise the weight, means for automatically uncoupling the shaft from the drum after the latter has been rotated sufficiently to raise the weight and enlarge to the degree desired the area enclosed within the wires, means for releasably holding the drum in the last named position, and a stop for limiting the rotation of the drum after said holding means has been released to prevent excessive motion of the weight.

113. In a tire building apparatus, a circular tire-building support, means for drawing across the support and to a circumference to one side thereof a circumferential sheath of tire building material, and means for constricting the material towards the axis of the support in a region between the support and said circumference.

114. In a tire building apparatus, a circular tire-building support, means for drawing a circumferential sheath of tire building material across the support to a circumference separated from the support a distance sufficient to permit application of a bead anchorage, and means for constricting the material to the bead diameter of the support between the support and said circumference.

115. In a tire building apparatus, a circular tire-building support, means for drawing a circumferential sheath of tire building material diagonally across the the support to a circumference separated from the support a distance sufficient to permit application of a bead anchorage with the material defining a surface having a region of reduced circumference approximating that of the bead line of the support, and means for constricting the material between the support and said region to shift towards the support the minimum circumference of the material defined surface.

116. In a tire building apparatus, cord guiding devices arranged in curved relation, a cord receiving support having its surface formed on a curvature similar to that on which the guiding devices are arranged but of smaller radius, means for causing relative movement of the support and the guiding devices so as to cause cords initially passing through the guiding devices and attached to the support to be drawn out through the guiding devices and to extend across the support, and means for forcing the series of cords locally into a surface of smaller curvature than that in which they lie when first drawn across the support.

117. In a tire building apparatus, a circular tire-building support, a circular guide of constant circumference coaxial therewith constructed and arranged to guide a circumferential sheath of tire building material, means for causing relative axial movement between the support and the guide so as to lay upon the support a circumferential ply of material attached to the support and so guided, and means for constricting towards the axis of the support a portion of the material between the support and the guide.

118. In a tire building apparatus, a circular guide constructed and arranged to guide a circumferential sheath of tire building material, a circular tire-building support relatively movable through the guide, means located on each side of the guide for constricting the material between the guide and the support, and separately operable means for actuating each of said constricting means.

119. In a tire building apparatus, a circular guide constructed and arranged to guide a circumferential sheath of tire-building material, a circular tire-building support relatively movable through the guide, means located on each side of the guide and adjustable axially with relation thereto for constricting the material between the guide and the support, and separately operable means for actuating each of said constricting means.

120. In a tire building apparatus, a circular guide constructed and arranged to guide a circumferential sheath of tire building material, a circular tire-building support relatively movable through the guide, and means on each side of the guide for constricting the material between the guide and the support, each means comprising a plurality of wires shaped to enclose a substantially circular area and means for moving the ends of the wires to vary the size of the enclosed area.

121. In a tire building apparatus; a circular guide constructed and arranged to guide a circumferential sheath of tire building material; a circular tire-building support relatively movable through the guide; and devices located on each side of the guide for constricting the material, each device comprising two rotatable rings, a plurality of wires each having one end attached to one ring and the other end attached to the second ring, a weight, a pair of cables each of which is attached at one end to a ring, said cables being attached at their other ends to the weight and being so attached to the rings that lowering of the weight will rotate the rings in opposite directions and contract the area enclosed within the wires, a second pair of cables each of which is attached at one end to a ring in such a manner that a pull on these cables will rotate the rings in the reverse of the directions caused by lowering the weight, and a rotatable drum to which the other ends of said second pair of cables are attached; a constantly rotatable shaft; clutch means for coupling the shaft to the drum of either device to rotate the later and raise the weight; means for automatically uncoupling the shaft from such drum after the latter has been rotated sufficiently to raise the weight and enlarge to the degree desired the area enclosed within the wires; and means for releasably holding each drum in the last named position.

122. In a tire building apparatus, a circular guide constructed and arranged to guide a circumferential sheath of tire building material; a circular tire-building support relatively movable through the guide; devices located on each side of the guide for constricting the material, each device comprising two rotatable rings, a plurality of wires each having one end attached to one ring and the other end attached to the second ring, a weight, a pair of cables each of which is attached at one end to a ring, said cables being attached at their other ends to the weight and being so attached to the rings that lowering of the weight will rotate the rings in opposite directions and contract the area enclosed within the wire, a second pair of cables each of which is attached at one end to a ring in such a manner that a pull on these cables will rotate the rings in the reverse of the directions caused by lowering the weight, and a rotatable drum to which the other ends of said second pair of cables are attached; means for mounting each device adjustably with respect to the guide; a movable guide for directing the cables to the rings in all adjusted positions of the latter; means for rotating either drum to raise the weight connected therewith; and means for releasably holding each drum in position to hold the weight raised.

123. In a tire building apparatus, guiding devices for a circumferential sheath of tire building material, a tire building support, means for causing relative movement between the devices and the support, means for constricting the material between the devices and the support, and means operable at predetermined periods in said relative movement to actuate said constricting means.

124. In a tire building apparatus, a tire-building support, a guide for tire-building material, a material supplying device from which the material is fed through the guide to the support, means for causing relative movement between the support and the guide to cause the material to be laid upon the building support, means for permitting material to be drawn from the supply under tension by the relative movement of the support and the guide, and means for drawing back into the supply material drawn out by such relative movement in excess of that laid on the support.

125. In a tire building apparatus, a tire-building support, a guide for tire-building material, a spool adapted to carry material and supply it to the guide, a take-up roll interposed between the spool and the guide, means for causing relative motion between the support and the guide to cause the material to be laid upon the support, means for positively driving the take-up roll during a part of the motion between the support and the guide to draw back excess material drawn out during another part of the motion, and means for driving the spool during the taking-up operation at a speed varying according to the amount of material on the spool.

126. In a tire building apparatus, a tire-building support, a guide for tire-building material, a spool adapted to carry tire-building material with sheet lining material between the convolutions and to supply such tire-building material to the guide, a take-up roll interposed between the spool and the guide, a liner wind-up roll, means for causing relative motion between the support and the guide to cause the building material to be laid upon the support, means for positively driving the take-up roll during a part of the motion between the support and the guide to draw back excess material drawn out during another part of the motion, and means for driving the spool and the liner wind-up roll during the taking-up operation at speeds varying according to the amount of material on them.

127. In a tire building apparatus, a tire-building support, a guide for tire-building material, a spool adapted to carry tire-building material and supply it to the guide, a take-up roll interposed between the spool and the guide, means for causing relative motion between the support and the guide to cause the material to be laid on the support, means for positively driving the take-up roll during a part of the motion between the support and the guide to draw back excess material drawn out during another part of the motion, means permitting the take-up roll to turn freely during the part of the motion between the support and the guide when material is being drawn out through the supply, means for driving the spool during the taking-up operation only at a speed varying according to the amount of material on the spool, and additional tension means for exerting tension on the material during the drawing out operation.

128. In a tire building apparatus, a tire-building support, a guide for tire-building material, a spool adapted to carry tire-building material and supply it to the guide, a take-up roll over which the material passes between the spool and the guide, a liner wind-up roll, means for causing relative motion between the support and the guide to cause the material to be laid on the support, means for positively driving the take-up roll during a part of the motion between the support and the guide to draw back excess material drawn out during another part of the motion, and connections between said take-up roll driving means and the spool and the liner wind-up including a slippable friction drive whereby the spool and the liner take-up are driven during the taking-up operation at speeds varying according to the amount of material on them.

129. In a tire building apparatus, a tire-building support, a supply for tire-bulding material, a guide for the material located between the support and the supply, means for causing relative movement between the support and the guide, and means for operating the supply to pay out or take up the material to keep it taut during the relative movement between the guide and the support.

130. In a tire building apparatus, a circular tire-building support, a supply for a circumferential series of cords, a guide located between the support and the supply for guiding the series, means for causing relative movement between the support and the guide axially of the support to lay portions of the cords upon the support, and means for operating the supply to pay out or take up the elements to keep them taut during the relative movement between the guide and the support.

131. In a tire building apparatus, a tire-building support, a supply for tire-building material, a guide for the material located between the support and the supply, means for causing relative movement between the support and the guide, means for operating the supply to pay out or take up the material to keep it taut during the relative motion between the guide and the support, and means to render the supply operating means inactive.

132. In a tire building apparatus, a circular tire-building support, guiding means constructed and arranged to guide a circumferential series of cords, a plurality of supplying devices for cords arranged to supply them to the guiding means, means for causing relative movement between the support and the guiding means, and means for operating all the supplying devices comprising an annular gear, gearing on each supplying device meshing with the annular gear, a ring, means for releasably connecting the annular gear with the ring, and means for rotating the ring.

133. In a tire building apparatus, a circular tire-building support, guiding means constructed and arranged to guide a circumferential series of cords, a plurality of supplying devices for cords arranged to supply them to the guiding means, means for causing relative movement between the support and the guiding means, and means for operating all the supplying devices comprising an annular gear, gearing on each supplying device meshing with said annular gear, a ring, a slidable gear secured to the ring, gear teeth on the annular gear meshing with said slidable gear, whereby the annular gear is coupled to the ring throughout its circumference, and means for rotating the ring.

134. In a tire building apparatus, a circular tire-building support, a circular guide coaxial with and of greater circumference than the support and constructed and arranged to guide a circumferential series of cords, a plurality of cord feeding devices arranged to feed the cords to the guide, and a detachably mounted cord supply mounted in conjunction with each feeding device.

135. In a tire building apparatus, a circular tire-building support, a circular guide coaxial with and of greater circumference than the support and constructed and arranged to guide a circumferential series of cord members, means for causing relative axial reciprocation and rotation between the support and the guide, and a supplemental guide coaxial with the first-named guide and rotatively mounted with respect thereto.

136. In a tire building apparatus, a circular tire-building support, a circular guide coaxial with and of greater circumference than the support and constructed and arranged to guide a circumferential series of cord members, means for causing relative axial reciprocation and rotation between the support and the guide, a supplemental guide coaxial with the first-named guide and rotatively mounted with respect thereto, and means to limit the rotative movement of the supplemental guide.

137. In a tire building apparatus, a circular building support, an annulus coaxial therewith, and devices carried by the annulus for separately guiding a circumferential series of cords.

138. In a tire building apparatus, a circular tire-building support, and circumferentially arranged devices for separately guiding thereto a circumferential series of cords.

139. In a tire building support, a circular tire building support, a plurality of cord supplies arranged about the support, each supply furnishing a distinct group of cords. and means for laying on the support the cords from the several groups simultaneously so as to form at one cord laying operation a complete circumferential layer.

140. A tire building apparatus having a combination of circular guide, means to draw a circumferential series of cords under tension over an edge of said guide and antifriction devices at said edge over which said cords travel while being drawn through the guide.

141. A guiding device for a circumferential series of cords which comprises an annulus having a circumferential guiding aperture therein and bearing surfaces adjacent the aperture upon which the cords may bear when the latter extend inwardly and in either axial direction from the annulus.

142. A guiding device for a circumferential series of cords which comprises an annulus having a circumferential guiding aperture therein, and bearing surfaces adjacent the aperture upon which the cords may bear when the latter extend inwardly and in either axial direction from the annulus, said bearing surfaces being provided with anti-friction rollers to reduce the friction of the cords.

143. A guiding device for a circumferential series of cords which comprises an annulus having a circumferential guiding aperture, and a circumferential series of radially disposed guides disposed outwardly of the aperture.

144. A guiding device for a circumferential series of cord members, comprising an annulus having a circumferential guiding aperture, a plurality of anti-friction rolls substantially circumferentially with respect to the annulus, and a plurality of radially disposed guides to direct the cords to the aperture.

145. In a tire building apparatus, an annulus having circumferential guiding means for a circumferential series of cord members, and a plurality of supplying devices adapted to supply cord members to the annulus and arranged alternately on one side or the other of the plane of the annulus.

146. In a tire building apparatus, a circular tire-building support, means for drawing across the support a circumferential series of cords into positions permitting the restriction of the series of cords to a fixed diameter by an annular anchorage, means to draw the cords simultaneously back towards the support to position the anchorage adjacent the support, and means to center the anchorage as it is being so positioned.

147. In a tire building apparatus, a circular tire-building support, means for drawing across the support a circumferential series of cords into positions permitting the restriction of the series of cords to a fixed diameter by an annular anchorage, means to draw the cords simultaneously back towards the support to position the anchorage adjacent the support, and a ledge arranged to underlie the anchorage as it is being so positioned to center it with respect to the support.

148. In a tire building apparatus, a circular tire-building support, means for drawing across the support a circumferential series of cords into positions permitting the restriction of the series of cords simultaneously back towards the support to position the anchorage adjacent the support, and a tapered ledge arranged to underlie the anchorage as it is being so positioned to progressively center it with respect to the support.

149. In a tire building apparatus, a circular tire-building support, means for drawing across the support a circumferential series of cords into positions permitting the restriction of the series of cords to a fixed diameter by an annular anchorage, means to draw the cords simultaneously back towards the support to position the anchorage adjacent the support, an abutment against which the anchorage is positioned, and a ledge adapted to underlie the anchorage as it is being so positioned to center it with respect to the support, said ledge being arranged for movement into operative position underlying the anchorage or into inoperative position underneath the abutment.

150. In a tire building apparatus, a circular tire-building support, means for drawing across the support a circumferential series of cords into positions permitting the restriction of the series of cords to a fixed diameter by an annular anchorage, means to draw the cords simultaneously back towards the support to position the anchorage adjacent the support, an abutment against which the anchorage is positioned, a ledge adapted to underlie the anchorage as it is being so positioned, a device for pressing the anchorage against the abutment, and means for operating said device and simultaneously moving the ledge to an inoperative position.

151. In a tire building apparatus, an annular convex core and flanges secured at either side thereof presenting smooth slanting surfaces adapted to support the bead portions of a tire carcass during its construction so that the beads will extend well beyond the plane of the sides of the core.

152. In a tire building apparatus, an annular convex core having a centrally extending portion, flanges on either side thereof adapted to support the bead portions of a tire carcass during its construction so that the beads will extend well beyond the plane of the sides of the core, centrally extending portions on said flanges adapted to lie against the centrally extending portion of the core, and means to secure together said centrally extending portions of the core and flanges.

153. In a tire building apparatus, an annular convex core having a centrally extending portion, flanges on either side thereof adapted to support the bead portions of a tire carcass during its construction, centrally extending portions on said flanges adapted to lie against the centrally extending portion of the core, and pins passing through elongated holes in the core and flanges and having segmental heads whereby rotation of the pins will lock the flanges and core together.

154. In a tire building apparatus, an annular convex core having a centrally extending portion, flanges on either side thereof presenting smooth slanting surfaces adapted to support the bead portions of a tire carcass during its construction so that the beads will extend well beyond the plane of the sides of the core, centrally extending portions on said flanges adapted to lie against the centrally extending portion of the core, and pins passing through elongated holes in the core and flanges and having segmental heads whereby rotation of the pins will lock the flanges and core together.

155. A tire building apparatus comprising in combination a circular guide, a tire core of less circumference than the guide, means to position the core axially in the plane and upon each side of the plane of said guide, means to relatively rotate the guide and core about said axis, all constructed and arranged so that when the cords are fastened adjacent said core, said movements will cause the core to progressively contact with the cords along a series of circumferences.

156. In a tire building apparatus, mechanism arranged to successively build tire carcasses, including a pair of tire building supports, means to take the carcass-building material from a built-up carcass on one building support and position it in circumferentially complete arrangement adjacent a second building support to start another carcass, and a device for holding the material in place to start the second carcass until the latter is sufficiently started to retain the material.

157. In a tire building apparatus, mechanism arranged to successively build tire carcasses under uniform tension conditions, including a pair of tire building supports, means to take the carcass-building material under tension from a built-up carcass on one building support and position it in circumferentially complete arrangement adjacent a second building support to start another carcass, and a device for holding the material in place to start the second carcass and to resist the tension of the material imparted by said mechanism until the second carcass has been sufficiently started to preserve the tension conditions of the material.

158. In a tire building apparatus, mechanism arranged to successively build tire carcasses, including a pair of tire building supports, means to take the carcass-building material from a built-up carcass on one building support and position it in circumferentially complete arrangement adjacent a second building support to start another carcass, means for severing the material between the carcasses, and a device for holding the material in place to start the second carcass during and after the severance and until the second carcass is sufficiently started to preserve the tension conditions of the material.

159. In a tire building apparatus, two circular tire building supports, a guide for a circumferential series of cord members, and positioning means for holding the supports coaxially with and adjacent each other and in such relation to the guide that the cord members may extend from the guide to a circumference adjacent one support and thence to the other support.

160. In a tire building apparatus, two circular tire building supports, a guide for a circumferential series of cord members, positioning means for holding the supports coaxially with and adjacent each other and in such relation to the guide that the cord members may extend from the guide to a circumference adjacent one support and thence to the other support, and means for severing the series of cord members between the supports.

161. In a tire building apparatus, two circular tire building supports, a guide for a circumferential series of cord members, positioning means for holding the supports coaxially with and adjacent each other and in such relation to the guide that the cord members may extend from the guide to a circumference adjacent one support and thence to the other support, and means for holding the cord members adjacent the first-named support so that they may be severed between the supports without losing their position.

162. In a tire building apparatus, two circular tire building supports, a guide for a circumferential series of cord members, positioning means for holding the supports coaxially with and adjacent each other and in such relation to the guide that the cord members may extend from the guide adjacent one support and thence to the other support, and means for folding back the free ends of the series of members resulting from the severing of the members between the supports.

163. In a tire building apparatus, two circular tire building supports, a guide for a circumferential series of cord members, positioning means for holding the supports coaxially with and adjacent each other and in such relation to the guide that the cord members may extend from the guide to a circumference adjacent one support and thence to the other support, means for holding the cord members adjacent the first-named support so that they may be severed between the supports, and means for severing the series of cord members between the supports.

164. In a tire building apparatus, two circular tire building supports, a guide for a circumferential series of cord members, positioning means for holding the supports coaxially with and adjacent each other and in such relation to the guide that the cord members may extend from the guide to a circumference adjacent one support and thence to the other support, means for holding the cord members adjacent the first-named support so that they may be severed between the supports, means for severing the series of cord members between the supports, and means for folding back the free ends of the members resulting from the severance.

165. In a tire building apparatus, the combination of two circular tire building supports arranged coaxially with each other and a transfer device including means for holding in condition for severing material extending in circumferentially complete arrangement between the supports.

166. In a tire building apparatus, the combination of two circular tire building supports arranged coaxially with each other, a holding device for retaining in condition for severing material extending in circumferentially complete arrangement between the supports, and a cutting mechanism operable to sever the material between the supports.

167. In a tire building apparatus, the combination of two circular tire building supports arranged coaxially with each other, a holding device for retaining in condition for severing material extending in circumferentially complete arrangement between the supports, a cutting mechanism operable to server the material between the supports, and means to fold back against the material on the supports the free side edges of the material formed by the severance.

168. In a tire building apparatus, the combination of two circular tire building supports arranged coaxially with each other, means for severing material extending in circumferentially complete arrangement between the supports, and means to fold back against the material on the supports the free side edges of the material formed by the severance.

169. In a tire building apparatus, the combination of two circular tire building supports arranged coaxially with each other, means to clamp and hold adjacent each support an annular bead anchorage and material extending between the supports in circumferential arrangement and looped through the anchorages, and means to sever the material between the anchorages.

170. In a tire building apparatus, the combination of two circular tire building supports arranged coaxially with each other, means to clamp and hold adjacent each support an annular bead anchorage and material extending between the supports in circumferential arrangement and looped through the anchorages, means to sever the material between the anchorages, and means to fold around the anchorages and back against the material on the supports the free ends of the material formed by the severance.

171. In a tire building apparatus, two circular tire building supports, means for supplying in taut condition a circumferential series of cord members, means for positioning the supports coaxially with and adjacent each other and in such relation to the supply that the cord members will extend in taut condition from the supply to one support and thence to the other support, and means to hold the members adjacent the first-named support and to preserve their taut condition while they are being severed between the supports.

172. In a tire building apparatus, two circular tire building supports, means for supplying in taut condition a circumferential series of cord members, means for positioning the supports coaxially with and adjacent each other and in such relation to the supply that the cord members will extend in taut condition from the supply to one support and thence to the other support, means to sever the series of cord members circumferentially between the supports, and means operable to hold the members adjacent the first-named support and to preserve their taut condition while they are being severed between the supports.

173. In a tire building apparatus, a circular tire building support adapted to support a tire carcass in process of construction, a folding device constructed and arranged to fold around a bead anchorage the free side portion of a ply of tire building material carried on the support, and means to operate the folding device automatically in sequence to first turn the material about the bead anchorage and then hold the folded part pressed against the unfolded part.

174. In a tire building apparatus, a circular tire building support adapted to support a tire carcass in process of construction, an inflatable annular member arranged to underlie the free side portion of a ply of tire building material carried on the support, and means for conducting fluid under pressure to the member to inflate it so as to fold the free side portion of the tire building material back against the material on the support.

175. In a tire building apparatus, a circular tire building support adapted to support a tire carcass in process of construction, an annular member inflatable within substantially definite limits and arranged to underlie the free side portion of a ply of tire building material carried on the support, and means for conducting fluid under pressure to the member to inflate it so as to fold the free side portion of the tire building material back against the material on the support.

176. In a tire building apparatus, a circular tire building support adapted to support a tire casing in process of construction, annular clamping means constructed and arranged to grip adjacent the support a folded-over side portion of a ply of tire building material carried on the core, an inflatable annular member, and means for conducting fluid under pressure to said member to press the side portions of the material back upon itself.

177. In a tire building apparatus, a folding device comprising a circular member having an annular recess on its outer periphery, and a laterally folded annular bag contained in the recess adapted upon the admission of fluid under pressure therein to straighten out its folds and project beyond the recess.

178. In a tire building apparatus, a clamping ring, an outwardly opening annular bag receiving container located radially outwardly of the ring, and an expansible annular bag located in the container and adapted when expanded to fold tire building material outwardly around a bead anchorage.

179. In a tire building apparatus, a clamping device to engage simultaneously throughout a circumference a circumferential ply of tire building material and hold it against an annular bead anchorage, and means acting simultaneously throughout a circumference to turn the material back against the side of the tire.

180. In a tire building apparatus, two circular tire building supports, positioning means for holding the supports coaxially with and substantially adjacent each other, and means to turn back onto the supports the free edges of layers of the building material on the supports.

181. In a tire building apparatus, the combination of a pair of axially spaced circular building supports, a supply for a circumferential series of cord members, and a device interposed between the supports for simultaneously completing the building of a carcass on one support and starting the building of a carcass on the second support from the same series of cord members.

182. In a tire building apparatus, two circular tire building supports, a holding device for retaining in condition for severing tire-building material extending in circumferentially complete arrangement between the supports, and a cutting mechanism operable to sever the material between the supports comprising a rotatable knife, means for projecting the knife into cutting position, and means to rotate the knife while it is so projected.

183. In a tire building apparatus, two tire building supports adapted to be positioned adjacent each other so that tire building material may extend in circumferentially complete form from one support to the other, a knife carried by one support, and means to operate the knife to sever the material between the supports.

184. In a tire building apparatus, a circular guide for circumferentially arranged material, two circular tire building supports each reciprocable through the guide, a shaft extending axially through one support, means under the control of the operator for rotating the shaft, a knife carried by the shaft in a position between the supports when these are located coaxially adjacent each other, and means for projecting the knife outwardly during the initial rotation of the shaft and holding it projected during continued rotation thereof.

185. A tire building apparatus comprising devices for laying a circumferential series of cords in a plurality of reversely folded layers, and means for trimming off the cords at the termination of the laying of the desired number of plies.

186. A tire building apparatus comprising devices for laying a circumferential series of cords in a plurality of reversely folded layers, means for trimming off the cords at the termination of the laying of the desired number of plies, and means for folding over the trimmed edges.

187. In a tire building apparatus, guiding means constructed and arranged to supply in inwardly converging form a circumferential sheath of tire building material, and a tire building support mounted for movement coaxially through the guide.

188. In a tire building apparatus, guiding means constructed and arranged to supply in inwardly converging sheath form a ply of tire building material, a tire building support mounted for movement coaxially with the guide, means to move the support through the guide, and means for rotating the support.

189. In a tire building apparatus, a tire building support, and guiding means surrounding the support and constructed and arranged to supply in inwardly converging sheath form a ply of tire building material, said support and guiding means being adapted for relative reciprocation for the application of the material on opposite sides of the support.

190. In a tire building apparatus, a tire building support, guiding means surrounding the support and constructed and arranged to supply in inwardly converging sheath form a ply of tire building material, said support and guiding means being mounted for axial separation to draw the material to one side of the support, and a contractile circular structure constructed to engage the material around a circumference and contract it locally to a smaller circumference, thereby permitting the application of a bead anchorage to the material.

191. In a tire building apparatus, a plurality of material supplies, each adapted to furnish a section of a complete ply, an annular guide receiving the sections and gathering them into a circumferential sheath, and a tire building support movable through the annular guide to receive the sheath of material therefrom.

192. A tire building apparatus comprising a tire building support, means for laying across the support a circumferential sheath of tire building material initially attached to one side thereof, and means for constricting the sheath of material to the other side of the support.

193. In a tire building apparatus, a circular tire building support, a circular guide of constant circumference coaxial therewith constructed and arranged to guide tire building material in circumferential arrangement, and means for causing relative movement between the support and the guide to shift the support from one side to the other of the guide so as to lay upon the support a circumferential ply of such material when guided by the guide and attached adjacent the support.

194. In a machine for building cord tires, devices for assembling a series of cord groups, each group consisting of a plurality of cords and composing a section of a complete lamination, and means for placing the assembled cord groups simultaneously upon a tire forming core to form a single continuous annular layer of cords.

195. In a machine for building cord tires, a supply for a series of sections of a tire lamination, devices for assembling the sections simultaneously to form in their entirety a single circumferentially continuous lamination, and means for shaping this lamination in conformity to the cross-sectional contour of a tire.

196. In a machine for building laminated cord tires, a supply for a series of cord groups, devices for assembling the cord groups simultaneously to form a circumferentially complete discontinuous sheath, and means for applying lengths of said sheath to a tire building core to form successive laminations.

THOMAS MIDGLEY.